US007202917B2

(12) United States Patent
Katoh et al.

(10) Patent No.: US 7,202,917 B2
(45) Date of Patent: Apr. 10, 2007

(54) PROJECTION TYPE IMAGE DISPLAY DEVICE

(75) Inventors: Hiromi Katoh, Nara (JP); Hiroshi Nakanishi, Yawata (JP); Hiroshi Hamada, Nara (JP); Akihito Jinda, Nara (JP); Tadashi Kawamura, Tenri (JP); Takashi Shibatani, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 766 days.

(21) Appl. No.: 10/311,467

(22) PCT Filed: Jun. 13, 2001

(86) PCT No.: PCT/JP01/05041

§ 371 (c)(1),
(2), (4) Date: Dec. 16, 2002

(87) PCT Pub. No.: WO01/96932

PCT Pub. Date: Dec. 20, 2001

(65) Prior Publication Data

US 2003/0090597 A1 May 15, 2003

(30) Foreign Application Priority Data

| Jun. 16, 2000 | (JP) | ............................. 2000-181223 |
| Jun. 16, 2000 | (JP) | ............................. 2000-181290 |
| Jun. 16, 2000 | (JP) | ............................. 2000-181302 |
| Nov. 17, 2000 | (JP) | ............................. 2000-351635 |
| Mar. 5, 2001 | (JP) | ............................. 2001-059644 |
| May 30, 2001 | (JP) | ............................. 2001-163301 |

(51) Int. Cl.
*H04N 9/12* (2006.01)
*H04N 9/31* (2006.01)

(52) U.S. Cl. ...................... 348/742; 348/791; 348/761; 348/762

(58) Field of Classification Search ................ 348/742, 348/739, 743, 766, 759–762, 767, 790, 791; 353/98; *H04N 9/12, 9/30, 9/31*
See application file for complete search history.

(56) References Cited

U.S. PATENT DOCUMENTS 5,161,042 A 11/1992 Hamada (Continued)

FOREIGN PATENT DOCUMENTS

JP 59-230383 A 12/1984

(Continued)

OTHER PUBLICATIONS

Shimizu, "Single Panel Reflective LCD Optics", Philips Research, 345, Scarborough Road, Briarcliff Manor, NY 10510, USA, 1999, pp. 989-992.

*Primary Examiner*—Sherrie Hsia
(74) *Attorney, Agent, or Firm*—Birch, Stewart, Kolasch & Birch, LLP

(57) ABSTRACT

A light source, an image display panel including multiple pixel regions, each of which modulates light, light control means for focusing light from the light source onto associated pixel regions according to their wavelength ranges, and optical systems that form an image on a projection plane by the light that has been modulated by the panel are provided. A circuit for generating data representing multiple image subframes from data representing each image frame as a component of the image and getting the subframes displayed by the panel time-sequentially, and an image shifter for shifting a selected one of the subframes on the projection plane are further provided. The same area on the projection plane is sequentially irradiated with light rays that have been modulated by different pixel regions of the panel and that fall within respectively different wavelength ranges.

24 Claims, 59 Drawing Sheets

U.S. PATENT DOCUMENTS

| | | | |
|---|---|---|---|
| 5,506,701 A | 4/1996 | Ichikawa | |
| 5,969,832 A | 10/1999 | Nakanishi et al. | |
| 6,061,103 A | 5/2000 | Okamura et al. | |
| 6,729,734 B2 * | 5/2004 | Childers et al. | 348/742 |
| 2003/0095092 A1 | 5/2003 | Kume et al. | |
| 2003/0128321 A1 | 7/2003 | Nakanishi | |

FOREIGN PATENT DOCUMENTS

| | | |
|---|---|---|
| JP | 62-194221 A | 8/1987 |
| JP | 4-60538 A | 2/1992 |
| JP | 4-113308 A | 4/1992 |
| JP | 5-249318 A | 9/1993 |
| JP | 6-208345 A | 7/1994 |
| JP | 6-222361 A | 8/1994 |
| JP | 6-343178 A | 12/1994 |
| JP | 9-214997 A | 8/1997 |
| JP | 10-3057 A | 1/1998 |
| JP | 10-20242 A | 1/1998 |
| JP | 10-55025 A | 2/1998 |
| JP | 10-55026 A | 2/1998 |
| JP | 10-55027 A | 2/1998 |
| JP | 10-55029 A | 2/1998 |
| JP | 2001-51231 A | 2/2001 |
| JP | 2001-91894 A | 4/2001 |
| JP | 2001-174913 A | 6/2001 |

* cited by examiner

FIG.8

FIG.55
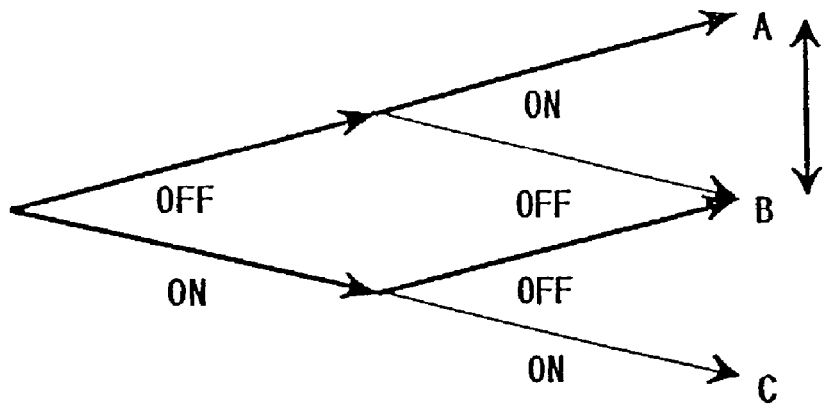
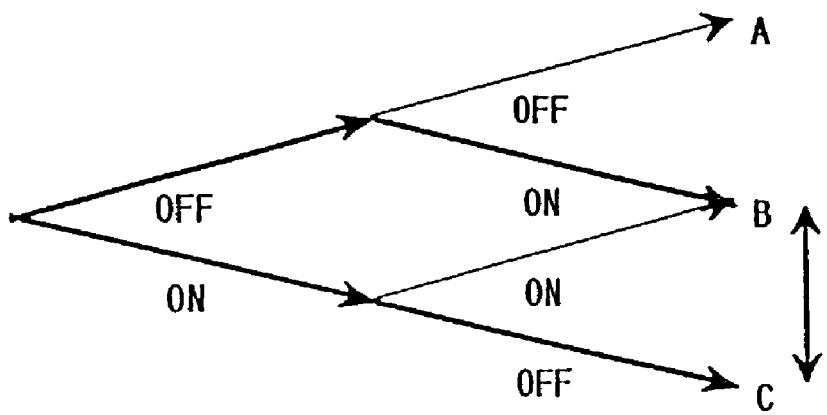

FIG.58
LIGHT INCOMING SIDE    LIGHT OUTGOING SIDE
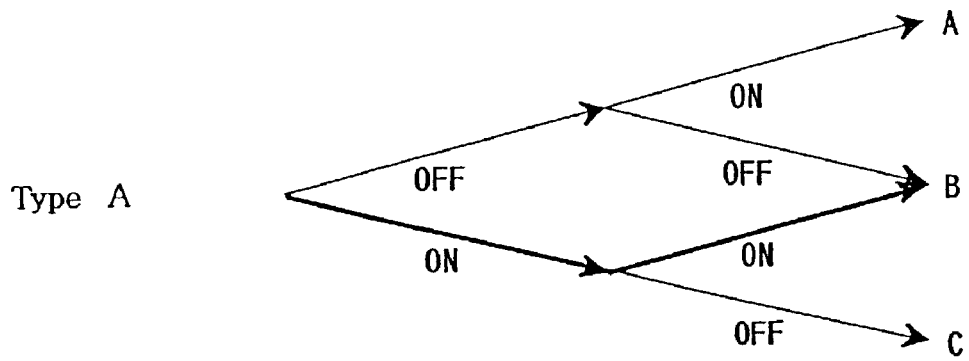
Type A
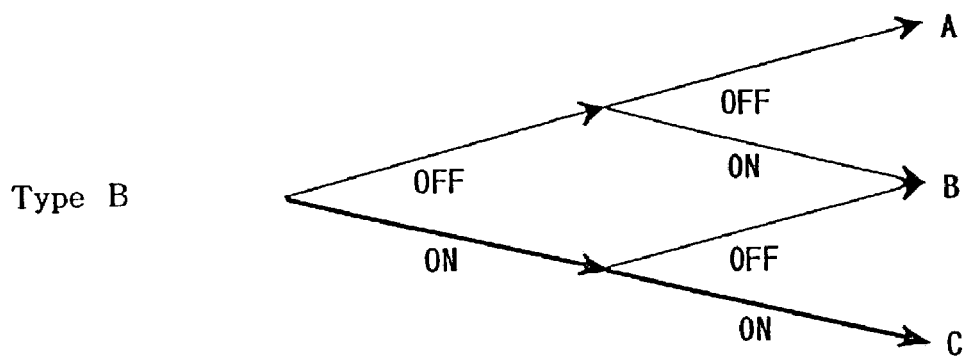
Type B
FIG.59
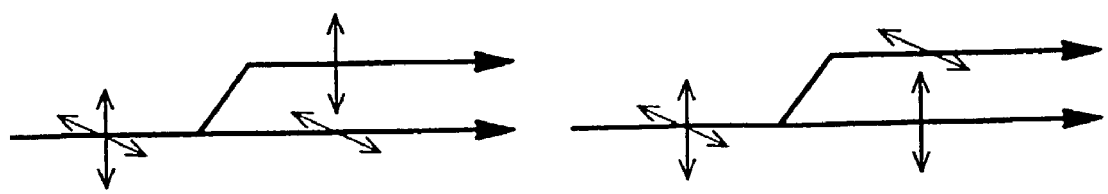

GIVEN PIXEL

GIVEN PIXEL

FIG.65
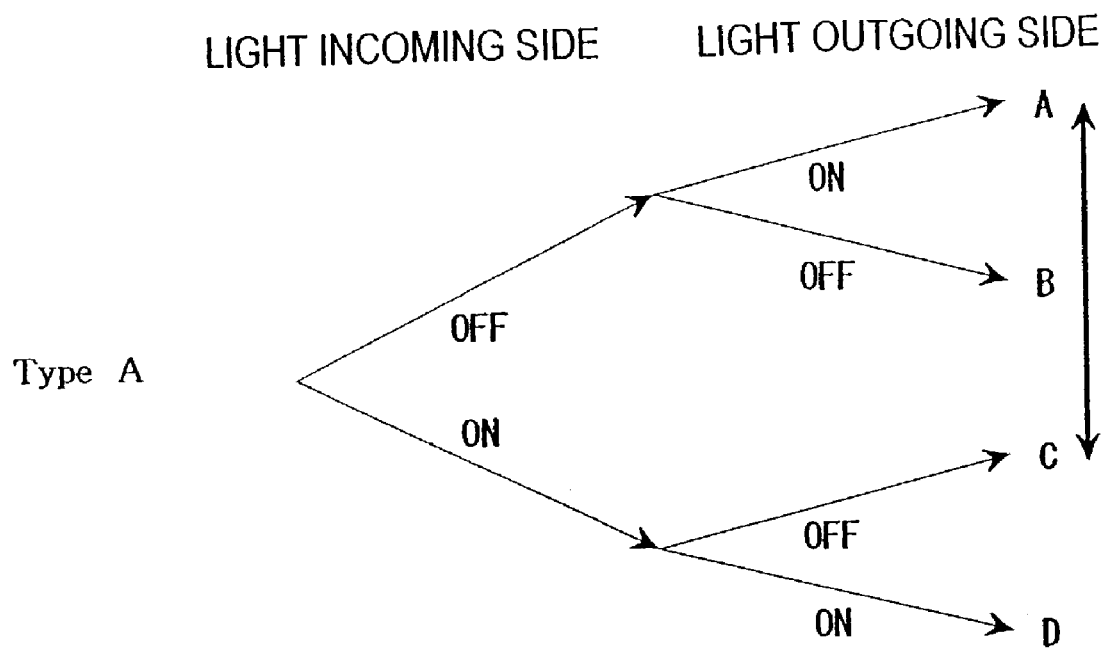
Type A
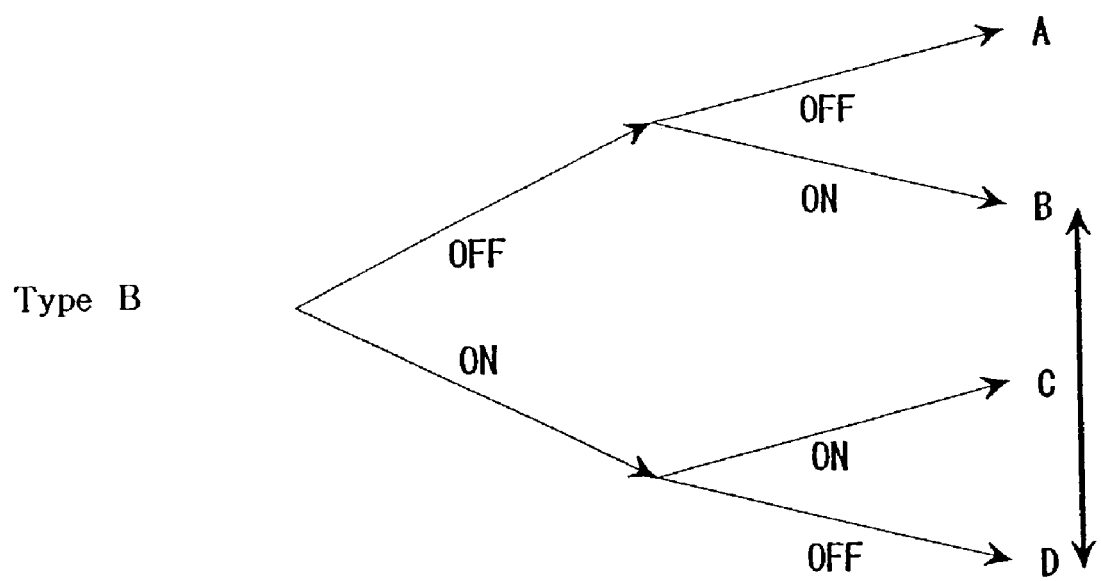
Type B

FIG.66
Type A
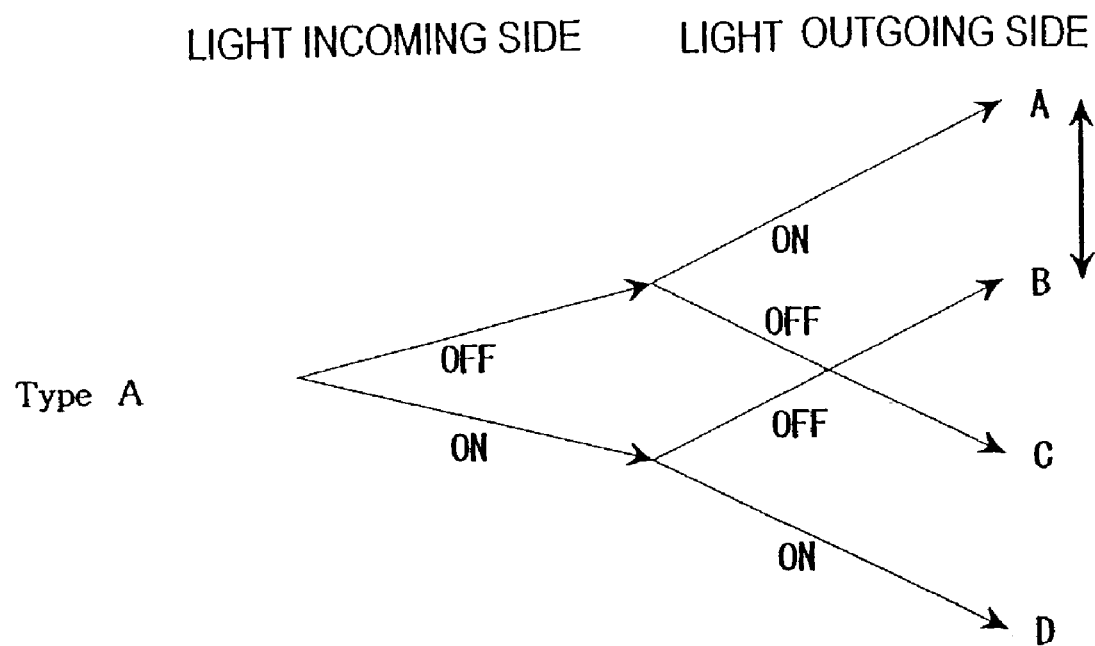
Type B
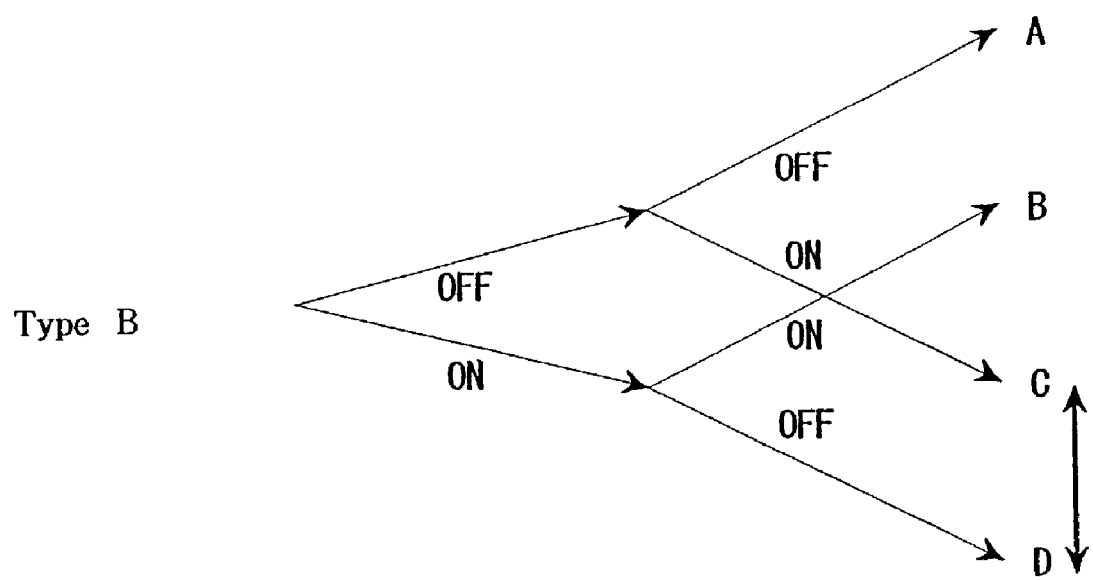

FIG.67
LIGHT INCOMING SIDE　　　LIGHT OUTGOING SIDE
Type A
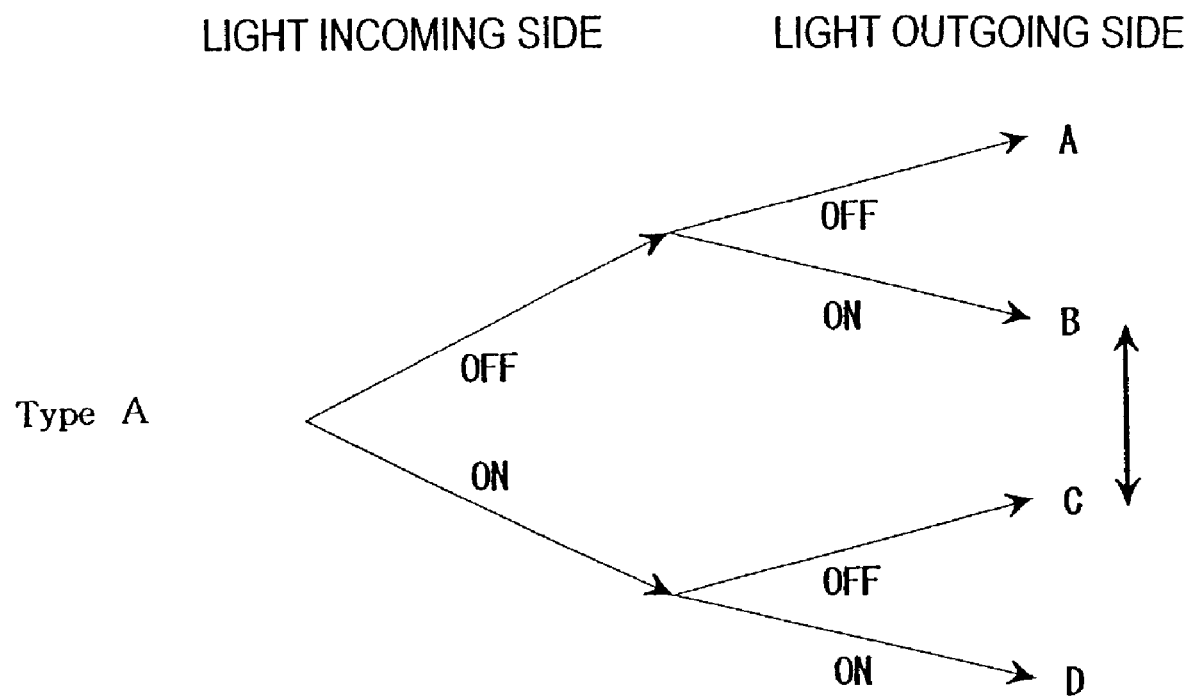
Type B
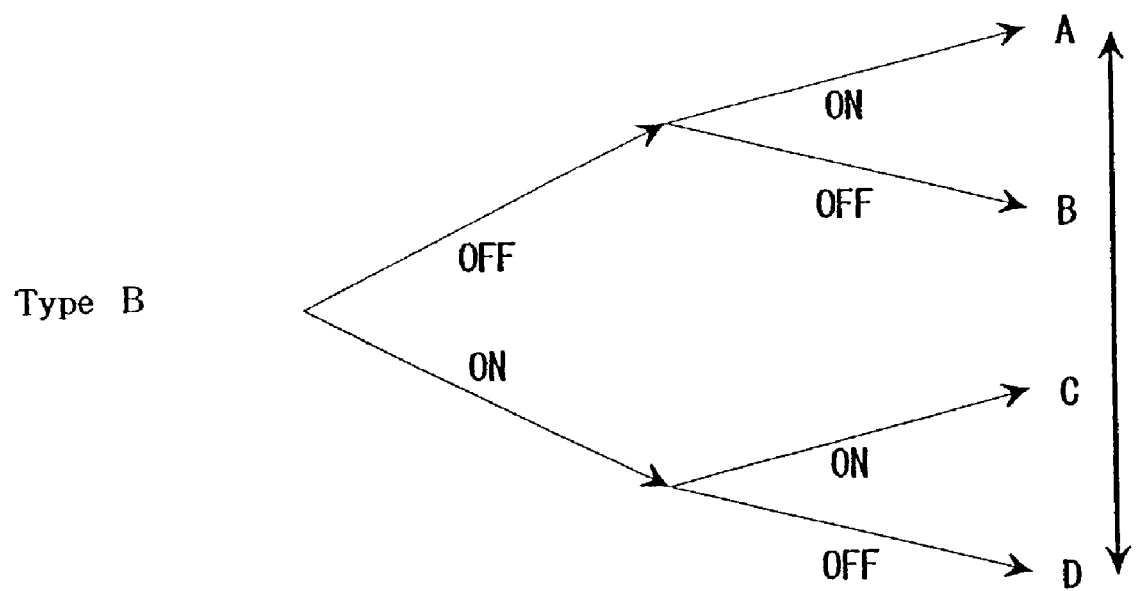

PROJECTION TYPE IMAGE DISPLAY DEVICE

This application is the national phase under 35 U.S.C. § 371 of PCT International Application No. PCT/JP01/05041 which has an International filing date of Jun. 13, 2001, which designated the United States of America.

BACKGROUND OF THE INVENTION

1. Field of the Invention

The present invention generally relates to an image display device, and more particularly relates to a single-panel projection type image display device, which can conduct a display operation in full colors with a single image display panel and without using color filters. The present invention is effectively applicable for use in a compact projection type color liquid crystal TV system or information display system.

2. Description of the Related Art

A conventional projection type image display device that uses a liquid crystal display (LCD) panel will be described.

Such a projection type image display device needs to be separately provided with a light source because the LCD panel itself emits no light. However, the projection type image display device using an LCD panel is advantageous over a projection type image display device using a CRT because the display device of the former type realizes a broader color reproducible range, has a smaller size and a lighter weight, and needs no convergence correction.

A projection type image display device may conduct a full-color display operation either by a three-panel method (i.e., with three LCD panels used for the three primary colors) or by a single-panel method (i.e., with just one LCD panel used).

A three-panel projection type image display device uses an optical system for splitting white light into three light rays representing the three primary colors of red (R), green (G) and blue (B) and three LCD panels for modulating the R, G and B light rays and thereby forming three image components. By optically superimposing the R, G and B image components one upon the other, the three-panel projection type image display device can create an image in full colors.

The three-panel projection type image display device can efficiently utilize the light that is radiated from a white light source but needs a complicated optical system and a greater number of components. Thus, the three-panel projection type image display device is normally less advantageous than the single-panel projection type image display device in respects of cost and size.

The single-panel projection type image display device uses a single LCD panel including multiple R, G and B color filters that are arranged in a mosaic or striped pattern, and gets a full-color image, displayed on the LCD panel, projected onto a projection plane (e.g., a screen) by a projection optical system. Such a single-panel projection type image display device is described in Japanese Laid-Open Publication No. 59-230383, for example. The single-panel type uses only one LCD panel, and needs an optical system that is much simpler than that of the three-panel type. Thus, the single-panel method can be used effectively to provide a small-sized projection type image display device at a reduced cost.

In the single-panel type that uses color filters, however, light is absorbed into the color filters. Accordingly, compared to a three-panel type that uses a similar light source, the brightness of the image decreases to about one-third in the single-panel type. In addition, one pixel should be displayed by a set of three pixel regions of the LCD panel that correspond to R, G and B, respectively. Thus, the resolution of the image also decreases to one-third as compared to the three-panel type.

One of possible measures against that decrease in brightness is using a brighter light source. However, the use of a light source with great power dissipation for a consumer electronic appliance is not preferred. Also, when color filters of absorption type are used, the light that has been absorbed into the color filters changes into heat. Accordingly, if the brightness of the light source is increased excessively, then not only the temperature of the LCD panel increases but also the discoloration of the color filters is accelerated. For that reason, to increase the utility value of the projection type image display device, it is very important how to make full use of the given light.

To increase the brightness of an image displayed by a single-panel projection type image display device, a liquid crystal display device for conducting a display operation in full colors without using any color filter was developed (see Japanese Laid-Open Publication No. 4-60538, for example). In this liquid crystal display device, the white light that has been radiated from a light source is split into R, G and B light beams by dielectric mirrors such as dichroic mirrors. The light beams are then incident onto a microlens array at mutually different angles. The microlens array is disposed on one side of an LCD panel that is closer to the light source. These light beams that have been incident onto a microlens are transmitted through the microlens so as to be focused onto their associated pixel regions in accordance with the respective angles of incidence. Thus, the R, G and B split light beams are modulated by mutually different pixel regions and then used for a full-color display.

A display device, which uses transmissive hologram elements for the R, G and B light rays instead of the dielectric mirrors to utilize the light as efficiently as possible, is disclosed in Japanese Laid-Open Publication No. 5-249318. On the other hand, a device, which includes a transmissive hologram element having a periodic structure defined by a pixel pitch and functioning as the dielectric mirrors or microlenses, is disclosed in Japanese Laid-Open Publication No. 6-222361.

The low resolution is another problem of the single-panel type. As for this problem, however, by adopting a field sequential technique, even just one LCD panel can achieve a resolution comparable to that of the three-panel type. The field sequential technique utilizes the phenomenon that when the colors of a light source are switched at too high a rate to be recognized by the human eyes, respective image components to be displayed time-sequentially have their colors mixed by an additive color mixture process. This phenomenon is called a "continuous additive color mixture process".

A projection type image display device for conducting a full-color display operation by the field sequential technique may have a configuration such as that shown in FIG. 76, for example. In this display device, a disk, made up of R, G and B color filters, is rotated at a high velocity that is equivalent to one vertical scan period of an LCD panel, and image signals, corresponding to the colors of the three color filters, are sequentially input to the driver circuit of the LCD panel. Thus, a synthesized image of three image components corresponding to the respective colors is recognized by human eyes.

In the display device of such a field sequential type, the R, G and B image components are displayed time-sequentially by each pixel of the LCD panel unlike the single-panel type. Thus, the resolution thereof is comparable to that of the three-panel type.

A projection type image display device that irradiates mutually different regions of an LCD panel with the R, G and B light beams is disclosed as another display device of the field sequential type in IDW '99 (pp. 989–992). In this display device, the white light that has been radiated from a light source is split by dielectric mirrors into R, G and B light beams, which will then irradiate mutually different regions of the LCD panel. The portions of the LCD panel to be irradiated with the R, G and B light beams are sequentially switched by rotating a cubic prism.

Furthermore, a projection type image display device as disclosed in Japanese Laid-Open Publication No. 9-214997 uses a liquid crystal display device similar to that disclosed in Japanese Laid-Open Publication No. 4-60538 identified above. The former display device also splits the white light into light beams in respective colors and then makes these light beams incident onto their associated pixel regions at mutually different angles by similar methods. To increase the optical efficiency and the resolution at the same time, this projection type image display device divides each image frame into multiple image subframes time-sequentially and periodically switches the angles of incidence of the light beams every time one vertical scan period of the LCD panel passes.

However, the devices disclosed in Japanese Laid-Open Publications Nos. 4-60538, 5-249318 and 6-222361 identified above can increase the brightness but the resolution thereof remains one-third of that of the three-panel type. The reason is that three spatially separated R, G and B pixels are used as a set to represent one pixel (or dot).

In contrast, the normal field-sequential type can increase the resolution to a level comparable to that of the three-panel type. However, the brightness of the image achieved by the normal field-sequential type is no more satisfactory than the conventional single-panel type.

In the display device disclosed in IDW '99 on the other hand, the points of incidence of the R, G and B light beams should not overlap with each other. For that purpose, illuminated light having a very high degree of parallelism is needed. Accordingly, the optical efficiency also decreases as being constrained by the degree of parallelism of the illuminated light.

Thus, none of the conventional techniques described above can increase the brightness and the resolution at the same time or solve the problems of the single-panel type.

The applicant of the present application discloses a projection type image display device, which should solve the problems described above, in Japanese Laid-Open Publication No. 9-214997. In the display device disclosed in Japanese Laid-Open Publication No. 9-214997, the angles of incidence of light beams entering an LCD panel need to be switched sequentially synchronously with the end of each vertical scan period of the LCD panel. In this device, a special space needs to be provided between the LCD panel and the light source and two sets of hologram elements or mirrors need to be driven there to realize such switching.

Such a display device needs a plurality of movable members to switch the angles of incidence of the incoming light beams, thus requiring a complicated control. Also, each pixel of the LCD panel displays all three colors one after another, and color-by-color adjustment cannot be carried out by the LCD panel.

In order to overcome the problems described above, the present invention is provides a projection type image display device that realizes the display of a bright and uniform image at a high resolution and that can effectively contribute to downsizing and cost reduction.

SUMMARY OF THE INVENTION

A projection type image display device according to the present invention includes: a light source; an image display panel including multiple pixel regions, each of which is able to modulate light; light control means for focusing light, which has been emitted from the light source, onto associated ones of the pixel regions according to the wavelength ranges thereof; and an optical system for forming an image on a projection plane by utilizing the light that has been modulated by the image display panel. The display device further includes: a circuit for generating data representing multiple image subframes from data representing each image frame as a component of the image and getting the image subframes displayed by the image display panel time-sequentially; and an image shifter for shifting, on the projection plane, a selected one of the multiple image subframes being displayed by the image display panel. The same area on the projection plane is sequentially irradiated with light rays that have been modulated by mutually different ones of the pixel regions of the image display panel and that fall within mutually different wavelength ranges.

In one embodiment, a direction in which the image subframes that make up an $n+1^{st}$ image frame (where n is a positive integer) are shifted on the projection plane is the same as a direction in which the image subframes that make up an $n^{th}$ image frame are shifted on the projection plane.

In another embodiment, a direction in which the image subframes that make up an $n+1^{st}$ image frame (where n is a positive integer) are shifted on the projection plane is opposite to a direction in which the image subframes that make up an $n^{th}$ image frame are shifted on the projection plane. The first image subframe of the $n+1^{st}$ image frame is not shifted from the last image subframe of the $n^{th}$ image frame.

In another embodiment, the number of image subframes that make up each image frame is two, and the image subframes are sequentially displayed at two different locations on the projection plane.

In another embodiment, the number of image subframes that make up each image frame is two, the image subframes are sequentially displayed at three different locations on the projection plane, and a period in which the image subframes are shifted is 1.5 times as short as a frame period.

In another embodiment, the number of image subframes that make up each image frame is four or more, the image subframes are sequentially displayed at three different locations on the projection plane, and at least two of the four or more image subframes that make up each image frame are displayed at the same location on the projection plane.

In another embodiment, the at least two image subframes that are displayed at the same location on the projection plane include an image subframe to be displayed in black.

In another embodiment, the at least two image subframes that are displayed at the same location on the projection plane include an image subframe with a reduced brightness.

In another embodiment, a motion pattern of the subframes that are shifted on the projection plane is periodic, and one period of the motion pattern includes a displacement of an approximately two-pixel pitch at least twice.

In another embodiment, one period of the motion pattern of the subframes is defined by a combination of multiple subsets that are selected from six types of subsets, each being defined by displacements of three subframes to be displayed sequentially. Each of the six types of subsets belongs to one of two groups that are symmetrical to each other about directions of displacements.

In another embodiment, one period of the motion pattern of the subframes includes two subsets alternately, which are selected from the two groups, respectively.

In another embodiment, one period of the motion pattern of the subframes is defined by displacements of eighteen subframes to be displayed sequentially, and the one period includes six subsets that are alternately selected from the two groups.

In another embodiment, one period of the motion pattern of the subframes is defined by displacements of six subframes to be displayed sequentially, and the one period includes two subsets that are selected from the two groups, respectively.

In another embodiment, a motion pattern of the image subframes that are shifted on the projection plane is periodic, and the motion pattern includes shifting the image subframe to four or more different locations that are arranged in line.

In another embodiment, the amount of shifting between two image subframes to be displayed consecutively is approximately twice or less as long as one pixel pitch as measured on the projection plane in the shifting direction.

In another embodiment, one period of the motion pattern of the image subframes is made up of twelve image subframes to be displayed sequentially, and the amount of shifting between two image subframes to be displayed consecutively is approximately twice or less as long as one pixel pitch as measured on the projection plane in the shifting direction.

In another embodiment, one period of the motion pattern of the image subframes is made up of six image subframes to be displayed sequentially, and the amount of shifting between two image subframes to be displayed consecutively is approximately twice or less as long as one pixel pitch as measured on the projection plane in the shifting direction.

The shift amount of the subframes on the projection plane is preferably approximately an integral number of times as long as one pixel pitch as measured on the projection plane in the shifting direction.

In another embodiment, when the image subframe displayed by the image display panel is switched into the next subframe, the light that has been modulated by the image display panel is cut off so as not to reach the projection plane.

In another embodiment, the light control means reflects the light from the light source in multiple different directions, which are included in the same plane, according to the wavelength ranges thereof, and the image shifter shifts the image subframes in a direction that is parallel to the plane.

In another embodiment, the direction in which the image subframes are shifted by the image shifter is aligned with a shorter side direction of a display screen of the image display panel.

An image display device according to the present invention includes an image display panel that has multiple pixel regions, each being able to modulate light, and forms an image by utilizing the light that has been modulated by the image display panel. The display device further includes: a circuit for generating data representing multiple image subframes from data representing each image frame as a component of the image and getting the image subframes displayed by the image display panel time-sequentially; and an image shifter for shifting the optical paths of selected ones of the multiple image subframes being displayed by the image display panel. The display device synthesizes light rays, which have been modulated by mutually different pixel regions of the image display panel and which fall within respectively different wavelength ranges, by shifting the subframes. The circuit includes: a first storage area for storing data about a first color as a component of the image frame; a second storage area for storing data about a second color as another component of the image frame; and a third storage area for storing data about a third color as still another component of the image frame. The data that have been read out from the first, second and third storage areas are selectively combined together in a predetermined order, thereby generating the data representing the respective subframes.

Another image display device according to the present invention includes an image display panel that has multiple pixel regions, each being able to modulate light, and forms an image by utilizing the light that has been modulated by the image display panel. The display device further includes: a circuit for generating data representing multiple image subframes from data representing each image frame as a component of the image and getting the image subframes displayed by the image display panel time-sequentially; and an image shifter for shifting the optical paths of selected ones of the multiple image subframes being displayed by the image display panel. The display device synthesizes light rays, which have been modulated by mutually different pixel regions of the image display panel and which fall within respectively different wavelength ranges, by shifting the subframes. The circuit includes multiple storage areas for storing the data representing the multiple image subframes. Data about a first color as a component of the image frame, data about a second color as another component of the image frame, and data about a third color as still another component of the image frame are stored in the multiple storage areas.

Still another image display device according to the present invention includes an image display panel that has a light modulating section, in which a pixel region for a first color belonging to a first wavelength range, a pixel region for a second color belonging to a second wavelength range, and a pixel region for a third color belonging to a third wavelength range are arranged periodically. The display device further includes an image shifter that is able to periodically shift the optical path of light that has been modulated by the light modulating section. The color of a first pixel on a virtual plane that crosses the optical path is defined by a light ray that was modulated by the first color pixel region in a first period, a light ray that was modulated by the second color pixel region in a second period and a light ray that was modulated by the third color pixel region in a third period. The color of a second pixel, which is adjacent to the first pixel on the virtual plane, is defined by a light ray that was modulated by the second color pixel region in the first period, a light ray that was modulated by the third color pixel region in the second period and a light ray that was modulated by the first color pixel region in the third period. The color of a third pixel, which is adjacent to the second pixel on the virtual plane, is defined by a light ray that was modulated by the third color pixel region in the first period, a light ray that was modulated by the first color pixel region in the second period and a light ray that was modulated by the second color pixel region in the third period.

A circuit component according to the present invention includes: a first storage area that stores data about a first color as a component of an image frame to be displayed by an image display device including an image display panel;

a second storage area that stores data about a second color as another component of the image frame; and a third storage area that stores data about a third color as still another component of the image frame. The data that have been read out from the first, second and third storage areas are combined together in a predetermined order, thereby generating data representing multiple subframes to be displayed time-sequentially.

In one embodiment, data about the first color of one pixel as a component of the image, data about the second color thereof, and data about the third color thereof are allocated to the multiple image subframes, respectively.

In another embodiment, selected ones of the multiple image subframes are shifted on a plane, thereby getting the same area on the plane irradiated sequentially with light rays that have been modulated by mutually different pixel regions of the image display panel and that fall within respectively different wavelength ranges.

Another circuit component according to the present invention includes multiple storage areas that store multiple subframes therein. The subframes include data about a first color as a component of an image frame to be displayed by an image display device including an image display panel, data about a second color as another component of the image frame and data about a third color as still another component of the image frame. The data about the first color, the data about the second color and the data about the third color are written in a predetermined order on the multiple storage areas. The data are sequentially read out from the respective storage areas, thereby generating data representing multiple image subframes to be displayed time-sequentially.

An image shifter according to the present invention gets the optical path of an image subframe, which has been modulated by an image display panel, shifted periodically, thereby selectively displacing the image subframe to one of three or more locations that are arranged in line within a plane and that are spaced apart from each other by at least one pixel pitch. The image shifter includes: a refracting member for refracting and shifting the optical path; and a driver for changing periodically the location of the refracting member relative to the optical path. The refracting member is made up of multiple regions that shift the optical path in mutually different amounts.

In one embodiment, the refracting member is implemented as a rotational plate including multiple transparent regions that have mutually different refractive indices and/or mutually different thicknesses. The refracting member is supported in a rotatable position so as to cross the optical path obliquely. The driver rotates the rotational plate such that the multiple transparent regions of the rotational plate cross the optical path one after another.

In another embodiment, the refracting member is implemented as a transparent plate including multiple transparent regions that have mutually different refractive indices and/or mutually different thicknesses and is supported in a movable position so as to cross the optical path obliquely. The driver moves the transparent plate such that the multiple transparent regions of the transparent plate cross the optical path one after another.

Another image shifter according to the present invention gets the optical path of an image subframe, which has been modulated by an image display panel, shifted periodically, thereby selectively displacing the image subframe to one of three or more locations that are arranged in line within a plane and that are spaced apart from each other by at least one pixel pitch. The image shifter includes at least two pairs of first and second elements that are arranged in series on the optical path. Each of the first elements changes the polarization direction of the image subframe that has been modulated by the image display panel, while each of the second elements exhibits one of mutually different refractive indices according to the polarization direction of incoming light. When the image subframe is shifted to an adjacent one of the three or more locations, a voltage application state to be selected for the first element on a light incoming side changes with a direction in which the image subframe is shifted next time.

Still another image shifter according to the present invention gets the optical path of an image subframe, which has been modulated by an image display panel, shifted periodically, thereby selectively displacing the image subframe to one of three or more locations that are arranged in line within a plane and that are spaced apart from each other by at least one pixel pitch. The image shifter includes at least two pairs of first and second elements that are arranged in series on the optical path. Each of the first elements changes the polarization direction of the image subframe that has been modulated by the image display panel, while each of the second elements exhibits one of mutually different refractive indices according to the polarization direction of incoming light. When the image subframe is shifted to a central one of the three or more locations, a voltage application state of the first element disposed on a light incoming side is the same as a voltage application state of the first element disposed on a light outgoing side.

Yet another image shifter according to the present invention gets the optical path of an image subframe, which has been modulated by an image display panel, shifted periodically, thereby selectively displacing the image subframe to one of three or more locations that are arranged in line within a plane and that are spaced apart from each other by at least one pixel pitch. The image shifter includes first and second image shifting sections that are arranged on the optical path. Each of the first and second image shifting sections includes: a first element for changing the polarization direction of the image subframe that has been modulated by the image display panel; and a second element that exhibits one of mutually different refractive indices according to the polarization direction of incoming light. The image subframe is shifted by the first and second image shifting elements in mutually different amounts.

In one embodiment, the amount in which the image subframe is shifted by one of the two image shifting sections that is located at such a position on the optical path as to receive the incoming light earlier than the other image shifting section is twice as much as the amount in which the image subframe is shifted by the other image shifting section that is located at such a position on the optical path as to receive the incoming light later than the former image shifting section.

In another embodiment, no combination of voltages to be applied to drive the elements includes an ON-to-OFF transition and an OFF-to-ON transition at the same time.

Yet another image shifter according to the present invention gets the optical path of an image subframe, which has been modulated by an image display panel, shifted periodically, thereby selectively displacing the image subframe to one of multiple locations that are arranged in line within a plane and that are spaced apart from each other by at least one pixel pitch. The image shifter includes: a first element for changing the polarization direction of the image subframe that has been modulated by the image display panel; and a second element that exhibits one of mutually different refractive indices according to the polarization direction of incoming light. The first element includes a liquid crystal cell that is able to switch polarization states of the light in response to a voltage applied thereto. The second element includes a light birefringent element that shifts the optical axis of the light according to the polarization state thereof. Each of multiple levels of voltages to be applied to the liquid crystal cell to switch the polarization states of the light has a non-zero value.

In one embodiment, upon the application of a first one of the multiple levels of voltages, the liquid crystal cell outputs first polarized light. Upon the application of a second one of the multiple levels of voltages, the liquid crystal cell outputs second polarized light with a plane of polarization that has rotated 90 degrees from that of the first polarized light.

In another embodiment, the first voltage has an offset value to be controlled in accordance with the temperature of the liquid crystal cell.

In another embodiment, the first voltage has an offset value that is defined by a voltage-transmittance characteristic of visible radiation to be transmitted through the liquid crystal cell.

In another embodiment, the first voltage has an offset value that is defined by a voltage-transmittance characteristic of a green light ray to be transmitted through the liquid crystal cell.

In another embodiment, the first voltage has an offset value that is optimized by voltage-transmittance characteristics of red, green and blue light rays to be transmitted through the liquid crystal cell.

Yet another image shifter according to the present invention gets the optical path of an image subframe, which has been modulated by an image display panel, shifted periodically, thereby selectively displacing the image subframe to one of multiple locations that are arranged in line within a plane and that are spaced apart from each other by at least one pixel pitch. The image shifter includes: a first type of elements for changing the polarization direction of the image subframe that has been modulated by the image display panel; and a second type of elements that exhibit one of mutually different refractive indices according to the polarization direction of incoming light. The first type of elements include a first polarization modulator and a second polarization modulator while the second type of elements include a first birefringent element and a second birefringent element. The first polarization modulator outputs an ordinary ray or an extraordinary ray to the first birefringent element. The second polarization modulator outputs an ordinary ray or an extraordinary ray to the second birefringent element. The first birefringent element shifts the image for a distance "a" in a direction that defines an angle of θ degrees with a reference plane including the optical axis. The second birefringent element shifts the image for a distance "b" in a direction that defines an angle of θ' degrees with the reference plane tan θ=a/b is satisfied.

In one embodiment, θ' degrees=θ degrees+90 degrees is satisfied.

In another embodiment, θ' degrees=θ degrees is satisfied.

In another embodiment, θ is 45.

Yet another image shifter gets the optical path of an image subframe, which has been modulated by an image display panel, shifted periodically, thereby selectively displacing the image subframe to one of three or more locations that are arranged in line within a plane and that are spaced apart from each other by at least one pixel pitch. The image shifter includes: a liquid crystal layer that exhibits two or more different refractive indices against polarized light; and two substrates that sandwich the liquid crystal layer. A micro prism or diffraction grating is provided on one surface of one of the two surfaces so as to face the liquid crystal layer.

In one embodiment, the micro prism or the diffraction grating is made of a material having a refractive index that is substantially equal to at least one of the two or more refractive indices.

In another embodiment, the image shifter includes not only the liquid crystal layer and the two substrates as a set but also at least one more liquid crystal layer and at least two more substrates as another set. These sets are arranged in series on the optical path. The image subframe is shifted to an adjacent one of the three or more locations just by selecting a voltage to be applied to the image shifter that is disposed on a light outgoing side.

Yet another image shifter according to the present invention includes at least two image shifting sets that are arranged in series on an optical path. Each of the image shifting sets includes two displacing elements. Each of the displacing elements includes: a liquid crystal layer that exhibits two or more different refractive indices against polarized light; and two substrates that sandwich the liquid crystal layer. A micro prism or a diffraction grating is provided on one surface of one of the two substrates so as to face the liquid crystal layer. The micro prisms or the diffraction gratings that are provided for the substrates belonging to the same set have the same angle of refraction. The angle of refraction, which is caused by the micro prisms or the diffraction gratings that are provided for the substrates belonging to one of the two sets that is located at such a position on the optical path as to receive incoming light earlier than the other set, is twice as great as the angle of refraction, which is caused by the micro prisms or the diffraction gratings that are provided for the substrates belonging to the other set that is located at such a position on the optical path as to receive the incoming light later than the former set.

Yet another image shifter according to the present invention includes at least two image shifting sets that are arranged in series on an optical path. Each of the image shifting sets includes two displacing elements. Each of the displacing elements includes: a liquid crystal layer that exhibits two or more different refractive indices against polarized light; and two substrates that sandwich the liquid crystal layer. A micro prism or a diffraction grating is provided on one surface of one of the two substrates so as to face the liquid crystal layer. The micro prisms or the diffraction gratings that are provided for the substrates belonging to the same set have the same angle of refraction. A distance between the substrates belonging to one of the two sets that is located at such a position on the optical path as to receive incoming light earlier than the other set is twice as long as a distance between the substrates belonging to the other set that is located at such a position on the optical path as to receive the incoming light later than the former set.

Yet another image shifter according to the present invention gets the optical path of an image subframe, which has been modulated by an image display panel, shifted periodically, thereby selectively displacing the image subframe to one of four locations that are arranged in line within a plane and that are spaced apart from each other by at least one pixel pitch. The image shifter includes a first shifting element and a second shifting element that are arranged in series on the optical path. The amount in which the image subframe is shifted by the first shifting element is defined to be twice as much as the amount in which the image subframe is shifted by the first shifting element.

BRIEF DESCRIPTION OF DRAWINGS

FIG. 8 shows how a number of image subframes are synthesized together.

FIG. 48(a) is a graph showing a localized point of a frequency spectrum in a Fourier space corresponding to the pixel arrangement shown in FIG. 46, while

FIG. 55 shows how state transitions may occur in the image shifter shown in FIG. 53.

FIG. 58 shows how state transitions may occur in the image shifter shown in FIG. 54.

FIG. 59 shows polarization directions in the image shifter shown in FIG. 53.

FIG. 65 shows how state transitions may occur in an image shifter that is obtained by further modifying the image shifter shown in FIG. 54.

FIG. 66 shows how state transitions may occur in the image shifter that is obtained by further modifying the image shifter shown in FIG. 54.

FIG. 67 shows how state transitions may occur in the image shifter that is obtained by further modifying the image shifter shown in FIG. 54.

DETAILED DESCRIPTION OF THE INVENTION

Figure 1:
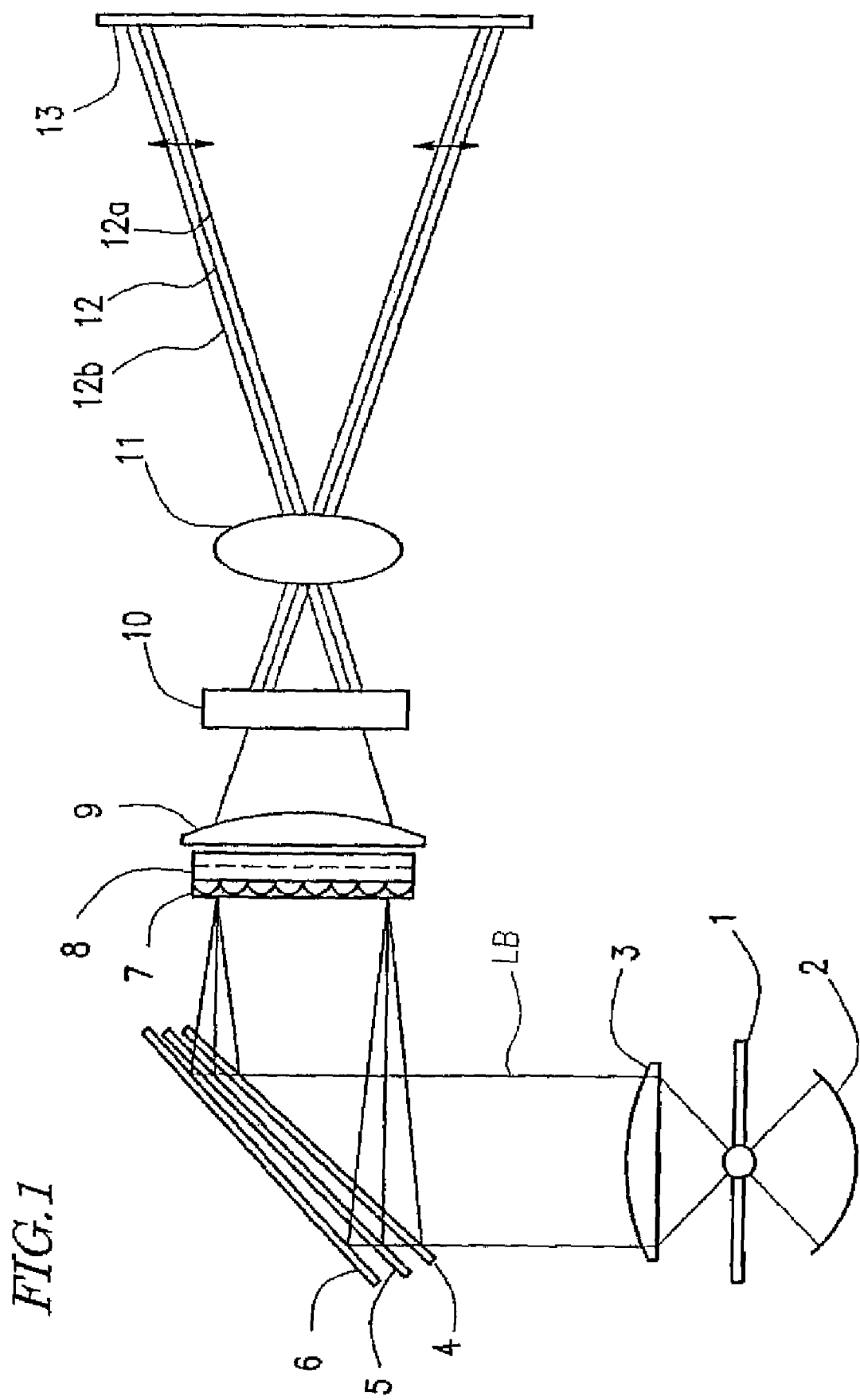
FIG. 1 is a schematic representation illustrating a projection type image display device according to the present invention.

According to the present invention, in a single-panel projection type image display device including no color filters, for example, data representing a plurality of image subframes are generated from data representing each image frame as an image component. Then, the image subframes are displayed by an image display panel time-sequentially. Thereafter, by sequentially shifting these image subframes on a projection plane, the same area on the projection plane is sequentially irradiated with multiple light rays that have been modulated by mutually different pixel regions of the image display panel and that fall within respectively different wavelength ranges (which will be herein referred to as "R, G and B light rays"), thereby realizing a high-resolution full-color display.

For example, take a particular area on the projection plane, which corresponds to one pixel. In the present invention, the particular area may be irradiated with a red (R) light ray in a period during which a subframe is being displayed (which period will be herein referred to as a "subframe period"). In that case, the particular area may be irradiated with a green (G) light ray in the next subframe period and with a blue (B) light ray in the following subframe period, respectively. In this manner, according to the present invention, the color of each pixel on the projection plane is defined by the time-sequential irradiation of the R, G and B light rays.

There is a significant difference between the conventional projection type color image display device of field sequential type and the present invention.

Specifically, in the conventional field sequential method, the image display panel is alternately irradiated with the R, G and B light rays. Accordingly, in one subfield period, all pixel regions of the image display panel are irradiated with one of the R, G and B light rays. As a result, each image subframe on the projection plane is made up of pixels representing the color of the R, G or B light ray. However, the R, G and B image subframes are displayed time-sequentially at very short time intervals, which are even shorter than the time resolution of the human visual sense. Consequently, a color image is recognized by the human eyes as an afterimage.

In contrast, according to the present invention, each image subframe is formed by combining the R, G and B light rays with each other as will be described in detail later. That is to say, in a subframe period, the projection plane is irradiated with the R, G and B light rays that have been modulated by the image display panel. Each of the R, G and B light rays that have been modulated by the image display panel irradiates one position on the projection plane in one subframe period but irradiates another position on the projection plane in the next subframe period. Then, those light rays are synthesized together with time, thereby displaying a full-color image frame thereon.

According to the present invention, such a time-sequential synthesis of the R, G and B light rays is performed by an image shifter. The image shifter is disposed between the image display panel and the projection plane to change the optical path of the light ray, which has been modulated by the image display panel, periodically and regularly.

The present invention is not limited to a projection type image display device but is also effectively applicable for use in a direct viewing type image display device such as viewer or head mounted display. In the following description, however, embodiments of the present invention will be described as being applied to such a projection type image display device.

Hereinafter, an exemplary arrangement of a display device according to a first specific embodiment will be described with reference to FIG. 1.

Embodiment 1

The projection type image display device of this embodiment includes a light source 1, an LCD panel 8, light control means and a projection optical system. The light control means is provided to focus the light, emitted from the light source 1, onto associated pixel regions of the LCD panel 8 in accordance with the wavelength ranges thereof. The projection optical system is provided to project the light rays, which have been modulated by the LCD panel 8, onto a projection plane.

This projection type image display device further includes a spherical mirror 2, a condenser lens 3 and dichroic mirrors 4, 5 and 6. The spherical mirror 2 reflects the (white) light, which has been emitted backward from the light source 1, forward. The condenser lens 3 collimates the light, which has come from the light source 1 and the spherical mirror 2, into a parallel light beam LB. Then, the light beam LB is split by the dichroic mirrors 4, 5 and 6 into a plurality of light rays according to the wavelength ranges thereof. The light rays that have been reflected by the dichroic mirrors 4, 5 and 6 are then incident onto a microlens array 7 at mutually different angles in accordance with their wavelength ranges. The microlens array 7 is attached to one of the two substrates of the LCD panel 8 that is located closer to the light source 1. The light rays, which have been incident onto the microlens array 7 at their respective angles, will be focused on their associated pixel regions that are located at mutually different positions.

In this projection type image display device, the projection optical system includes a field lens 9 and a projection lens 11 to project light beam 12, which has been transmitted through the LCD panel 8, onto a screen (i.e., the projection plane) 13. In this embodiment, an image shifter 10 is disposed between the field lens 9 and the projection lens 11. FIG. 1 illustrates light rays 12a and 12b that have been shifted parallelly to the projection plane by the image shifter 10. To get these light rays shifted, however, the image shifter 10 may be disposed anywhere between the LCD panel 8 and the screen 13. For example, the image shifter 10 may be disposed between the projection lens 11 and the screen 13.

Next, the respective members of this projection type image display device will be described one by one.

In this embodiment, a metal halide lamp having an optical output power of 150 W, an arc length of 5 mm and an arc diameter of 2.2 mm is used as the light source 1 and is disposed such that the arc length direction thereof is parallel to the paper sheet. Examples of other preferred light sources 1 include a halogen lamp, an extra-high voltage mercury lamp and a xenon lamp. The light source 1 used in this embodiment radiates white light including light rays falling within three wavelength ranges corresponding to the three primary colors.

The spherical mirror 2 is disposed behind the light source 1. The condenser lens 3, having an aperture of 80 mm φ and a focal length of 60 mm, is disposed in front of the light source 1. The spherical mirror 2 is positioned so as to have its center aligned with the center of the emitting portion of the light source 1, while the condenser lens 3 is positioned so as to have its focal point aligned with the center of the light source 1.

In this arrangement, the light emitted from the light source 1 is collimated by the condenser lens 3 so that the LCD panel 8 is illuminated with the collimated light. The degree of parallelism of the light that has passed through the condenser lens 3 may be about 2.2 degrees in the arc length direction (i.e., a direction parallel to the paper of FIG. 1) and about 1 degree in the arc diameter direction.

The LCD panel 8 used in this embodiment is a transmission type liquid crystal display in which the microlens array 7 is disposed on one of its two transparent substrates that is located closer to the light source. Any liquid crystal material or any operation mode may be selected but the LCD panel 8 is preferably able to operate at a sufficiently high speed. In this embodiment, the panel 8 operates in a twisted nematic (TN) mode. The LCD panel 8 includes a plurality of pixel regions for modulating the incoming light. As used herein, the "pixel regions" refer to respective light modulating portions of the image display panel that are spatially separated from each other. In this LCD panel 8, a voltage is applied from a pixel electrode, associated with one of those pixel regions, to an associated portion of the liquid crystal layer, thereby changing the optical properties of that portion and modulating the light.

In this LCD panel 8, 768 (H)×1,024 (V) scan lines may be driven by a noninterlaced scanning technique. The pixel regions of the LCD panel 8 are arranged two-dimensionally on the transparent substrates. In this embodiment, the pitch of the pixel regions measures 26 μm both horizontally and vertically. Also, in this embodiment, the R, G and B pixel regions are arranged so as to form a striped pattern in the horizontal direction of the screen, and each of the microlenses is allocated to one of multiple sets of three pixel regions (i.e., the R, G and B pixel regions).

Figure 2:
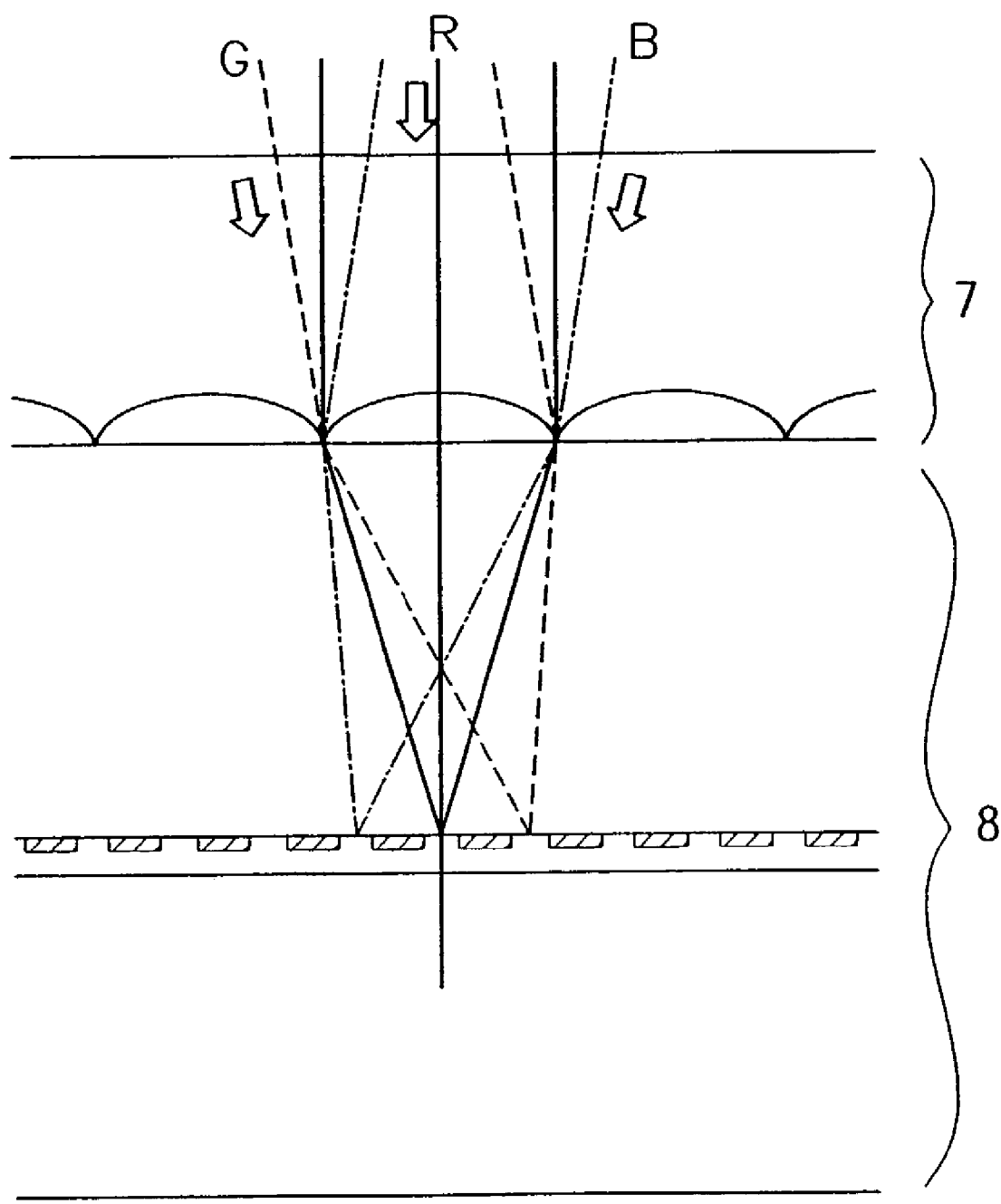
FIG. 2 is a cross-sectional view schematically illustrating an LCD panel.

As shown in FIG. 1, the R, G and B light rays, impinging on the LCD panel 8, have been produced by getting the white light, radiated from the light source 1, split by the dichroic mirrors 4, 5 and 6. The R, G and B light rays are incident onto the microlens array 7 on the LCD panel 8 at mutually different angles. Accordingly, by appropriately setting the angles of incidence of these R, G and B light rays, these light rays may be distributed through one of the microlenses 7 to respective pixel regions corresponding to the three wavelength ranges as shown in FIG. 2. In this embodiment, the microlenses 7 have a focal length of 255 μm so that an angle of 5.8 degrees is formed between two of these light rays. More specifically, the R light ray is incident vertically onto the LCD panel 8, while each of the B and G light rays is incident thereon so as to define an angle of 5.8 degrees with the R light ray.

Figure 3:
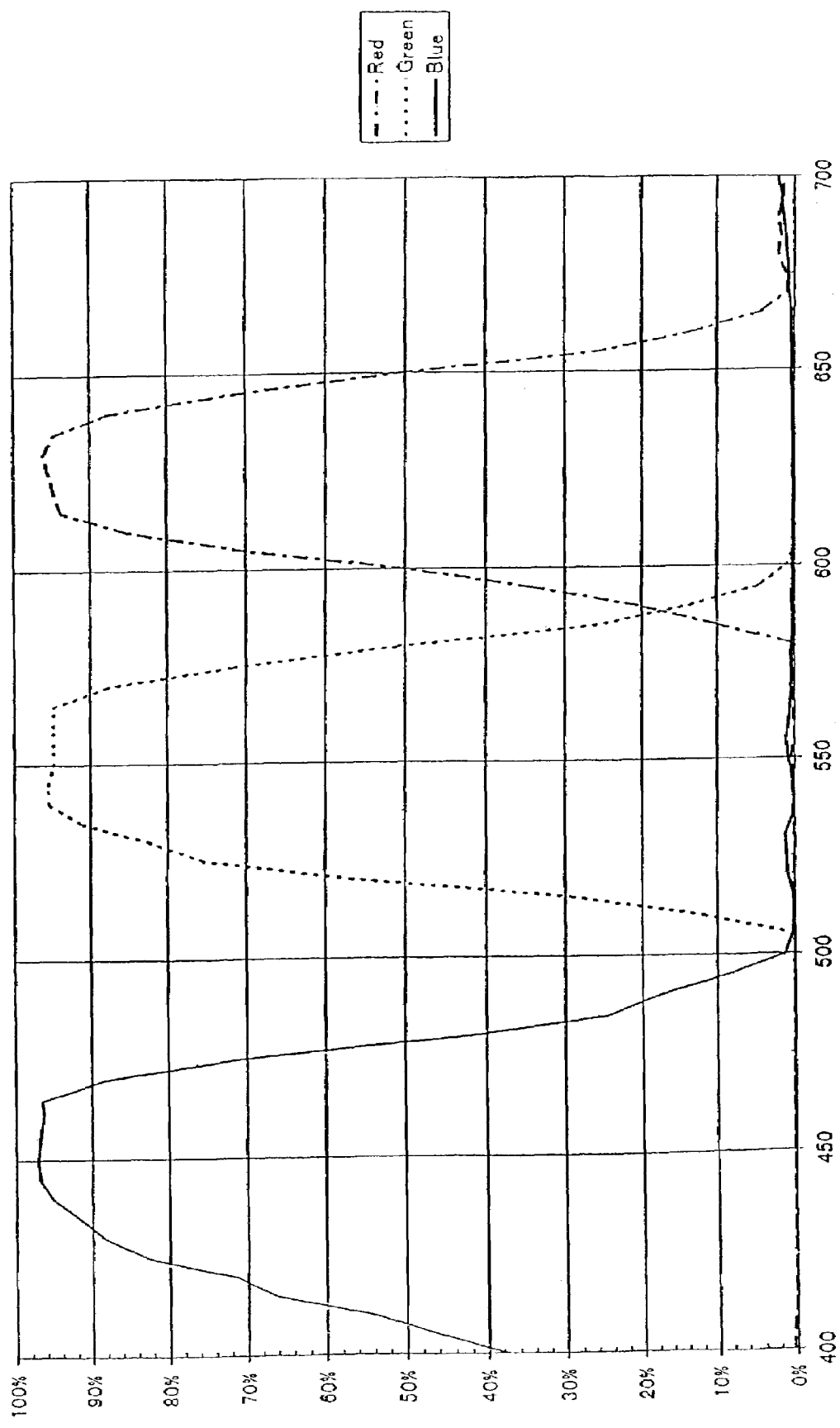
FIG. 3 is a graph showing the spectral characteristics of dichroic mirrors.

The dichroic mirrors 4, 5 and 6 may have spectral characteristics such as those shown in FIG. 3 and selectively reflect the green (G), red (R) and blue (B) light rays, respectively. The G light ray has a wavelength falling within the range of 520 nm to 580 nm, the R light ray has a wavelength falling within the range of 600 nm to 650 nm, and the B light ray has a wavelength falling within the range of 420 nm to 480 nm.

In this embodiment, the dichroic mirrors 4, 5 and 6 and the microlens array 7 are used to focus the light rays representing the three primary colors onto the respective pixel regions. Alternatively, any other optical element (e.g., a transmission type hologram having diffraction and spectral functions) may also be used.

As described above, the LCD panel 8 is driven by a noninterlaced scanning technique. Accordingly, the panel 8 displays 60 image frames per second. Thus, the time allotted to each frame (i.e., a frame time period T) is ⅙₀ second. That is to say, T=⅙₀ seconds≈16.6 milliseconds.

It should be noted that if the panel 8 is driven by an interlaced scanning technique, the scan lines on the screen are grouped into even-numbered lines and odd-numbered lines. In the interlaced scanning, either all of these even-numbered scan lines or all of these odd-numbered scan lines are alternately activated. Accordingly, T=1/30 second≈33.3 milliseconds. Also, the time allotted to each of the even- and odd-numbered fields that make up one frame (i.e., one field time period) is 1/60 second≈16.6 milliseconds.

In this embodiment, the information (or data) about the respective image frames that make up one complete image is sequentially stored in frame memories. In accordance with the information that has been selectively read out from the frame memories, multiple image subframes are formed one after another. Hereinafter, it will be described in detail how to form the image subframes.

Figure 4:
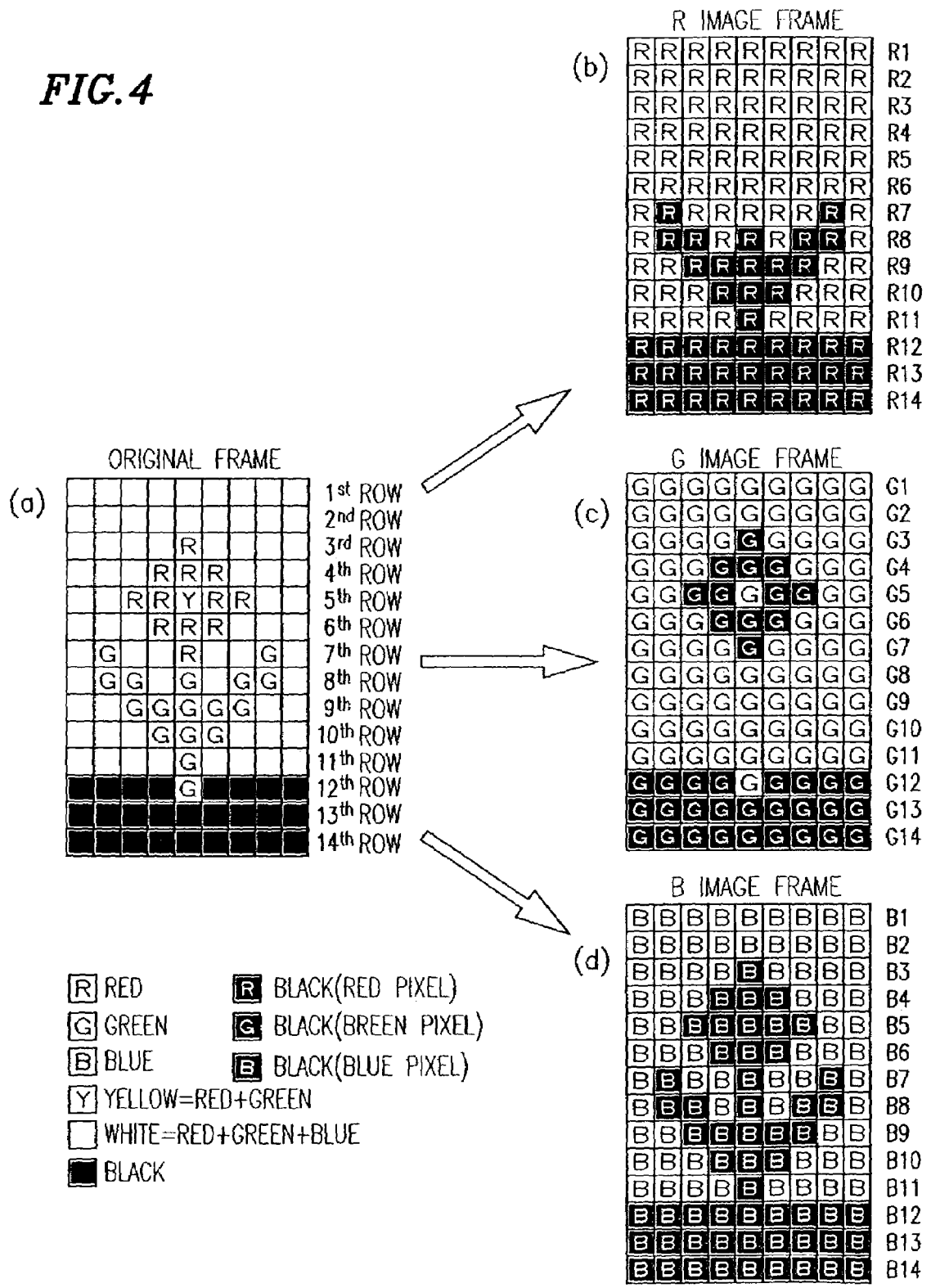
FIG. 4 shows how to produce color-by-color image frames from an original image frame.

For example, suppose an image represented by a frame (i.e., an image frame) is as shown in (a) of FIG. 4. This image frame should be displayed in full colors, and the colors of the respective pixels are determined in accordance with the data defining this image frame. It should be noted that in the interlaced scanning technique, an image represented by a field may be processed similarly to an "image frame" as used herein.

Figure 5:
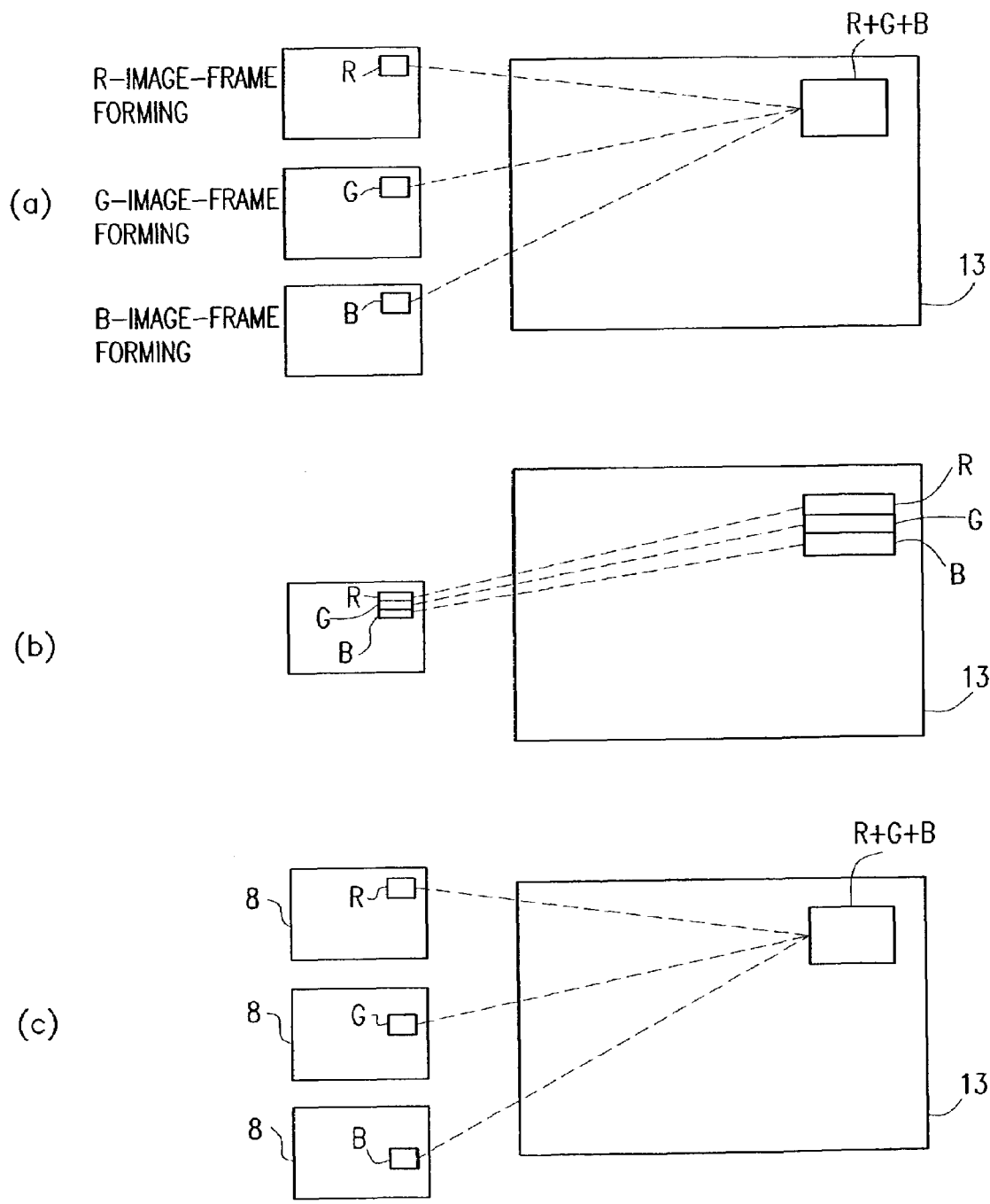
FIG. 5 shows how the color display principle of the present invention is different from the conventional color display principles.

The conventional three-panel projection type image display device separates the data into three data subsets corresponding to the R, G and B light rays for the respective pixels, thereby generating three data subsets representing the R, G and B image frames as shown in (b), (c) and (d) of FIG. 4. Then, the R, G and B image frames are displayed simultaneously by three R, G and B image display panels so as to be superimposed one upon another on the projection plane 13. FIG. 5(a) schematically shows how the R, G and B image frames are superimposed one upon another for a particular pixel on the projection plane 13.

In a conventional single-panel projection type image display device on the other hand, pixel regions for the R, G and B light rays are provided at mutually different positions inside the single display panel. In accordance with the data that should represent the R, G and B image frames, the R, G and B light rays are modulated by their respective pixel regions, thereby forming a color image on the projection plane. In this case, an area on the projection plane that has a size smaller than the spatial resolution of the human visual sense is illuminated with the R, G and B light rays. Accordingly, even though the R, G and B light rays are actually separated from each other spatially, the human eyes sense as if a single pixel had been formed on the projection plane. FIG. 5(b) schematically shows how virtually one particular pixel on the projection plane 13 is illuminated with the R, G and B light rays.

In contrast, unlike any of these conventional techniques, the single-panel projection type image display device of this embodiment sequentially illuminates the same area on the projection plane 13 with the R, G and B light rays that have been modulated by mutually different pixel regions of the single image display panel 8, thereby forming a pixel on that same area. That is to say, taking an arbitrary pixel on the projection plane 13, the pixel is displayed by a method similar to the known field sequential technique. However, the method of this embodiment is entirely different from the conventional field sequential technique in that the R, G and B light rays that make up one pixel have been modulated by mutually different pixel regions of the single image display panel. FIG. 5(c) schematically shows how the R, G and B light rays that are irradiated time-sequentially are combined for a particular pixel on the projection plane 13 in one frame period. The three images shown on the left-hand side of FIG. 5(c) correspond to the three mutually different image subframes produced by the single image display panel 8.

As can be easily seen from FIGS. 5(a) through 5(c), even though just one display panel is used in this embodiment, a full-color image can be displayed at high resolution and brightness as those realized by the three-panel type.

Next, it will be described in detail with reference to FIG. 6 how the image subframes are formed.

Figure 6:
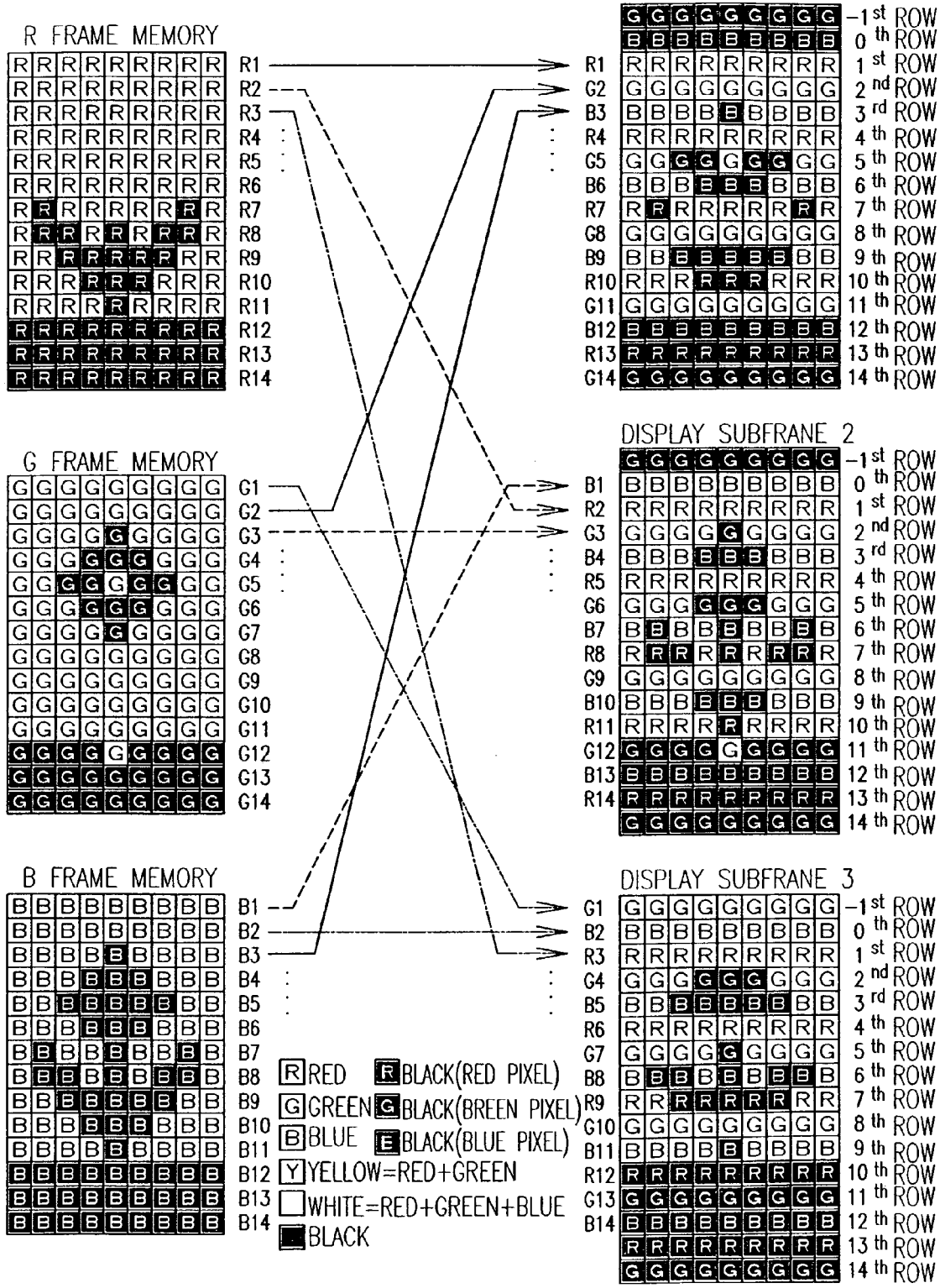
FIG. 6 shows how to generate three subframe data from color-by-color image frame data.
Figure 7:
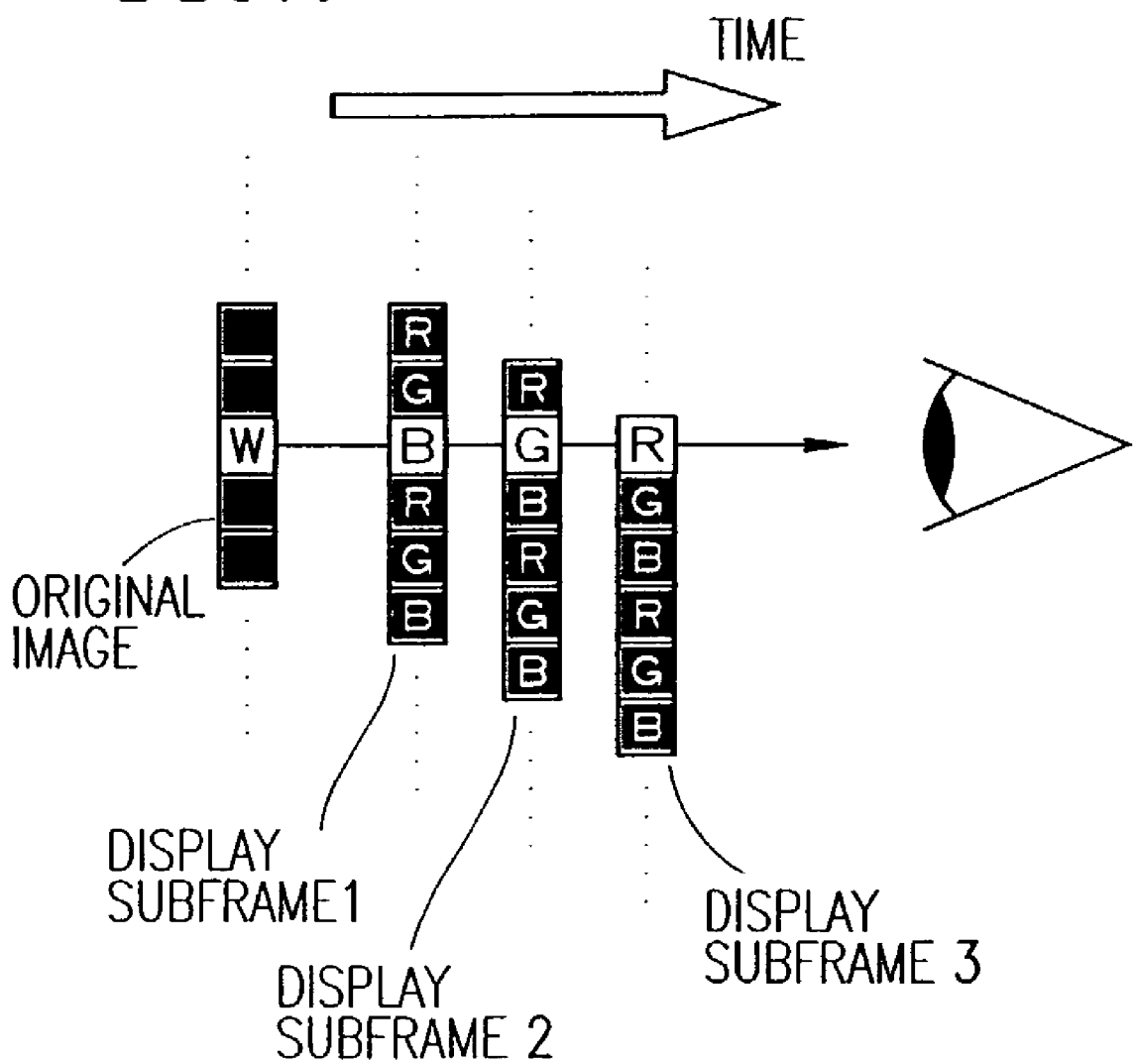
FIG. 7 shows a mode to shift image subframes (i.e., image shifting).

The left-hand side of FIG. 6 illustrates the three data sets representing R, G and B image frames that are stored on R, G and B frame memories, respectively. On the other hand, the right-hand side of FIG. 6 illustrates display subframes Nos. 1, 2 and 3. In this embodiment, an image represented by a display subframe No. 1 is displayed on the projection plane during the first one-third of a frame period (i.e., a first subframe period). During the next one-third (i.e., second subframe period), an image represented by a display subframe No. 2 is displayed. And during the last one-third (i.e., third subframe period), an image represented by a display subframe No. 3 is displayed. In this embodiment, these three image subframes are displayed while being shifted from each other as shown in FIG. 7 and are combined together time sequentially. As a result, an original image such as that shown in (a) of FIG. 4 is recognized by the viewer's eyes.

Next, it will be described in detail how the data is arranged in an image subframe by taking display subframe No. 1 as an example.

As shown in FIG. 6, the data representing the first row of the pixel region for display subframe No. 1 is the data about pixels on the first row R1 that is stored in the R frame memory. The data representing the second row of the pixel region for display subframe No. 1 is the data about pixels on the second row G2 that is stored in the G frame memory. The data representing the third row of the pixel region for display subframe No. 1 is the data about pixels on the third row B3 that is stored in the B frame memory. And the data representing the fourth row of the pixel region for display subframe No. 1 is the data about pixels on the fourth row R4 that is stored in the R frame memory. The data representing the remaining rows of display subframe No. 1 will be made up in the same manner after that.

The data representing display subframe No. 2 or 3 is also collected as in display subframe No. 1. As for display subframe No. 2, for example, the data representing the zeroth row of its pixel region is the data about pixels on the first row B1 that is stored in the B frame memory. The data representing the first row of the pixel region for display subframe No. 2 is the data about pixels on the second row R2 that is stored in the R frame memory. The data representing the second row of the pixel region for display subframe No. 2 is the data about pixels on the third row G3 that is stored in the G frame memory. And the data representing the third row of the pixel region for display subframe No. 2 is the data about pixels on the fourth row B4 that is stored in the B frame memory.

In this manner, the data subsets that have been read out from the R, G and B frame memories are combined in a predetermined order, thereby compiling data representing each of the subframes to be displayed time-sequentially. Thus, the data representing each subframe contains information about all of the three primary colors of R, G and B. However, as for each of these colors R, G and B, the information contained is about just one-third of the entire screen, spatially speaking. More specifically, as can be easily seen from FIG. 6, the R information contained in display subframe No. 1 is concerned with just the first, fourth, seventh, tenth pixel rows, etc. of the image frame to be formed. The R information about the other pixel rows of the image frame is allocated to display subframes Nos. 2 and 3.

In this embodiment, information about the same color is always displayed in each pixel region of the image display panel. However, shifting and projecting the respective subframes synthesizes the subframes to form a full image frame. It should be noted that the total number of pixel rows in a pixel region of the image display panel is larger by two than the number of pixel rows that make up one subframe image as shown in FIG. 6. These two additional rows are provided as a margin for image shifting.

Figure 8:
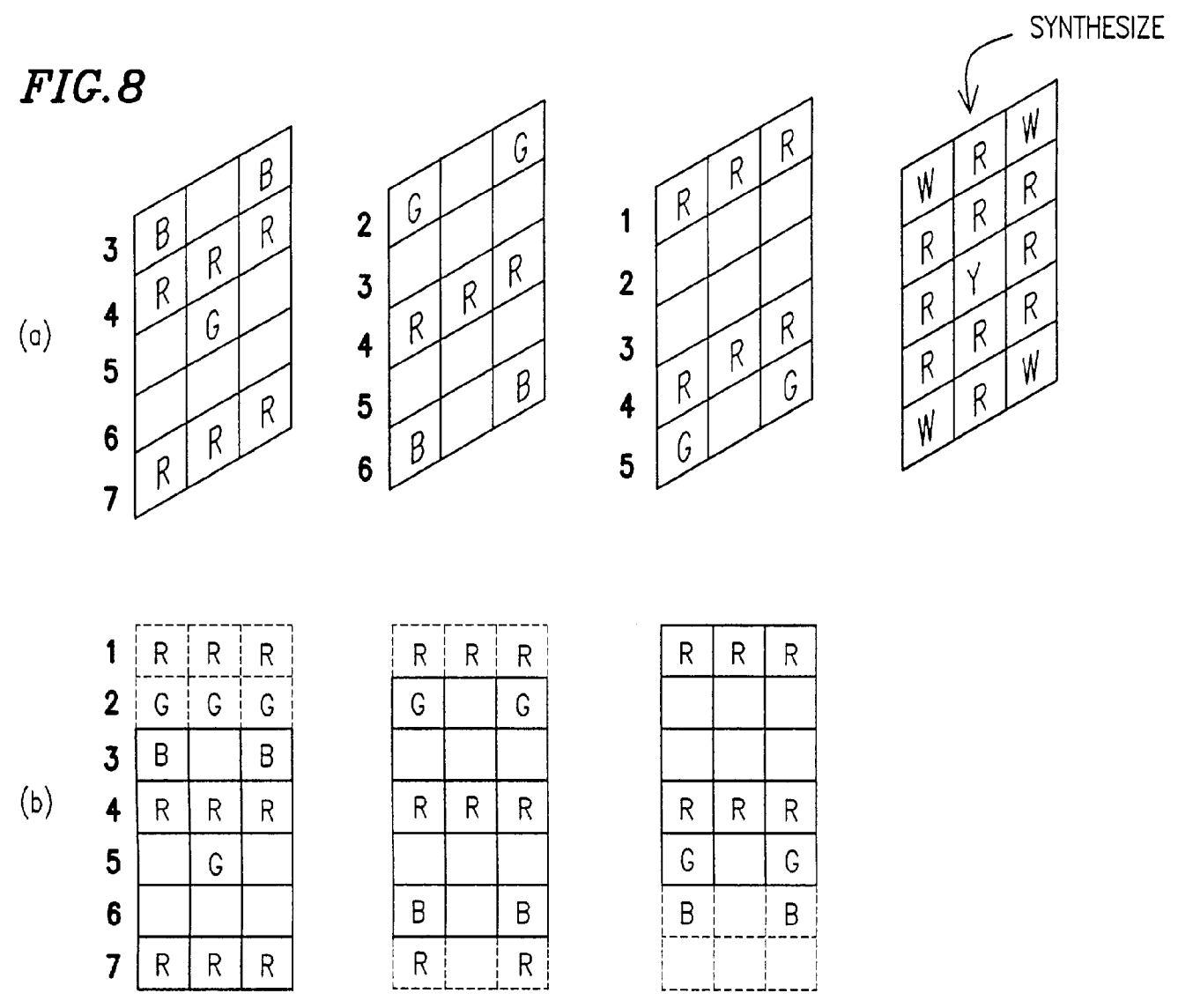

Next, it will be described with reference to FIGS. 8 and 9 how those image subframes mutually shifted are synthesized together into one image frame.

Referring to FIG. 8(a), illustrated is a perspective view showing respective parts of three image subframes that have been projected onto a projection plane such as a screen. In FIG. 8(a), display subframes Nos. 1, 2 and 3 and synthesized image frame are schematically illustrated from left to right. A portion of the display subframe No. 1 including the third through seventh rows thereof, a portion of the display subframe No. 2 including the second through sixth rows thereof, and a portion of the display subframe No. 3 including the first through fifth rows thereof are spatially superimposed one upon another on the projection plane although these portions are projected there at mutually different points in time. As a result, a single image frame is formed.

The pixel regions for the R, G or B portions are fixed on the image display panel as shown in FIG. 8(b). However, the optical paths of the image subframes are shifted by the image shifter provided between the image display panel and the projection plane, thereby realizing the synthesis of the image subframes as shown in FIG. 8(a).

Hereinafter, it will be described how to shift the image subframes.

Figure 9:
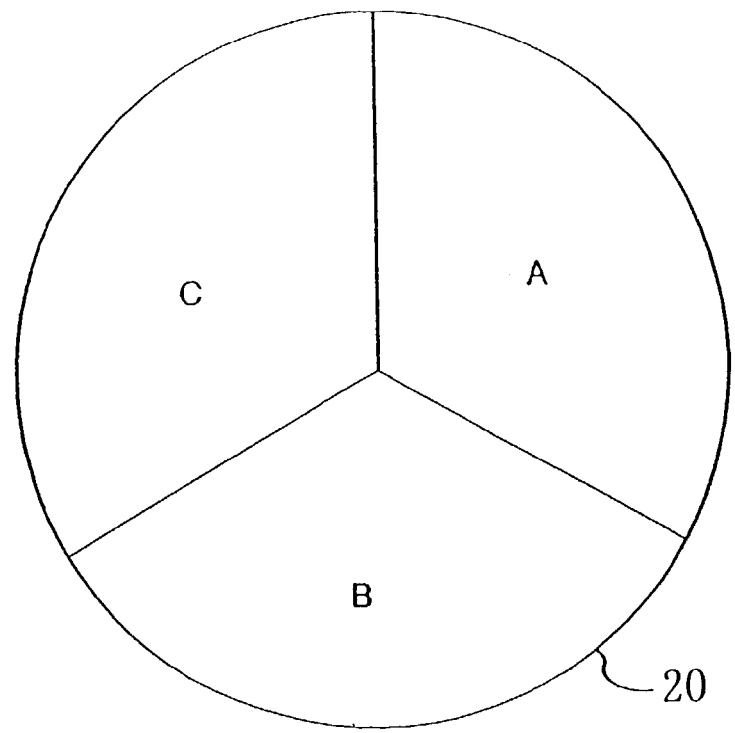
FIG. 9 is a front view of a rotational plate as an image shifter.
Figure 10:
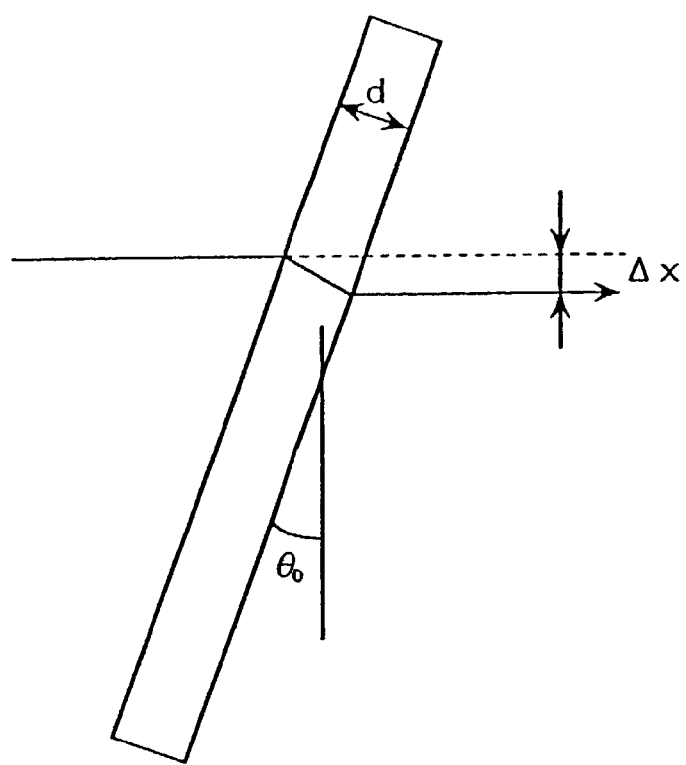
FIG. 10 is a cross-sectional view of the rotational plate as an image shifter.

In this embodiment, a disklike glass plate (i.e., refracting member) 20 having three transparent regions A, B and C as shown in FIG. 9 is used as an image shifter. This disklike glass plate 20 is made of BK7 glass having a refractive index of 1.52. The transparent regions A, B and C have thicknesses of 0.7 mm, 1.1 mm and 1.5 mm, respectively. This glass plate is supported so as to rotate around the center of the disk, and is disposed such that the principal surface of the glass plate defines an angle of 70.2 degrees with the optical axis. FIG. 10 schematically illustrates a portion of a cross section of the glass plate that crosses the optical axis. Supposing the angle defined between a plane that is perpendicular to the optical axis and the principal surface of the glass plate is $\theta_0$, the thickness of the glass is d and the refractive index of the glass is $n_g$, the shift amount $\Delta x$ of the optical axis due to refraction is given by $$\Delta x = d \cdot \sin \theta_0 (1 - \cos \theta_0 / (n_g^2 - \sin^2 \theta_0)^{1/2})$$

In this embodiment, the glass plate is designed such that the transparent regions A, B and C have mutually different glass thicknesses d. Thus, as the glass plate 20 rotates, the shift amount $\Delta x$ of the optical axis changes periodically.

The light beam that has been modulated by the image display panel passes through one of the transparent regions A, B and C of the glass plate 20, which is being rotated by a driver (not shown) such as a motor, to reach the projection plane. In this embodiment, the optical path of a light beam that has been transmitted through the transparent region B shifts by 26.1 μm from that of a light beam that has been transmitted through the transparent region A. In the same way, the optical path of a light beam that has been transmitted through the transparent region C also shifts by 26.1 μm from that of the light beam that has been transmitted through the transparent region B. It should be noted that the shift amount of 26.1 μm is a value that has been converted into an equivalent shift amount on the image display panel. Thus, the image shifter is designed such that the shift amount is approximately equal to one vertical pitch of pixel regions. However, the shift amount may be changed into any other value by adjusting the thicknesses of the transparent regions A, B and C. For example, if the thicknesses of the respective transparent regions A, B and C are increased 1.4 times, then shift amount will be 26.1×1.4 μm.

In this embodiment, the direction in which the shift Δx of a light beam is created (which will be herein referred to as a "shifting direction") is the vertical direction of the image. Alternatively, the shifting direction of the light beam may also be the horizontal direction or a diagonal direction of the image. The point is the shift amount should be determined on a pixel basis such that the respective pixels of multiple image subframes are superimposed one upon the other substantially completely on the projection plane. In other words, the amount in which an image shifts on the projection plane may have any arbitrary magnitude as long as the amount of shifting is substantially an integral number of times as long as one pixel pitch that is measured on the projection plane in the shifting direction.

For example, to equalize the shifting direction of the light beam with the horizontal direction of the image, the glass plate shown in FIG. 10 may be rotated 90 degrees around the optical axis such that the light beam is shifted in the horizontal direction of the image.

Figure 11:
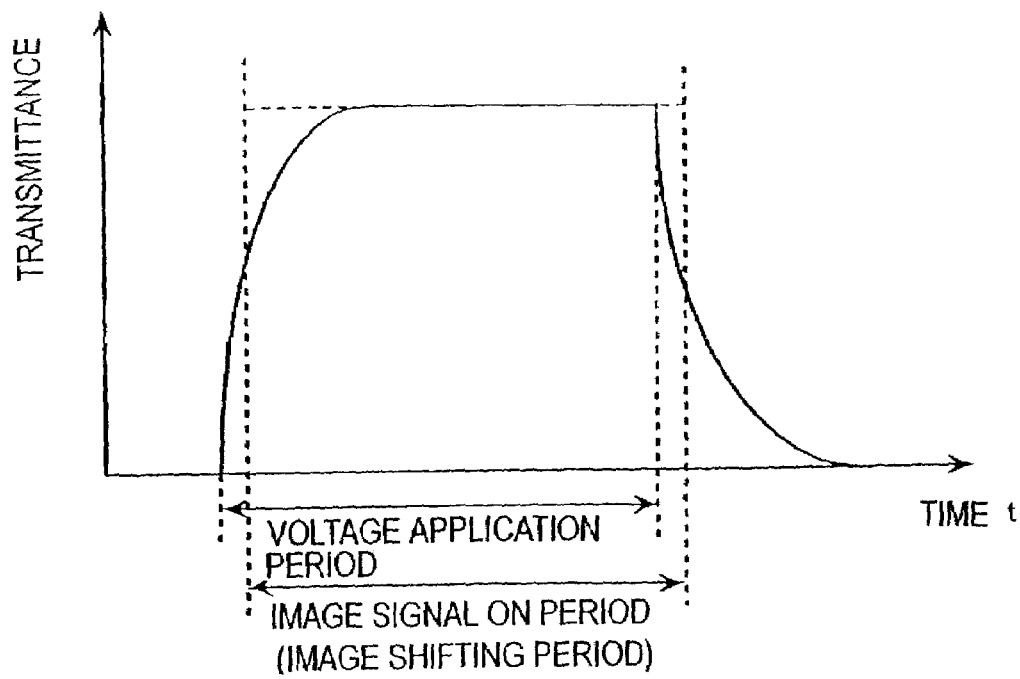
FIG. 11 is a graph showing a response curve of an LCD panel.

FIG. 11 shows a curve representing the response of the light transmittance of a light modulating portion (i.e., each pixel region) of the image display panel 8 to a voltage applied thereto. In this embodiment, each pixel region has a structure in which a liquid crystal layer is sandwiched between a pair of electrodes and the response speed of the liquid crystal material is finite. Accordingly, the light transmittance never reaches its maximum value the instant the voltage starts to be applied. That is to say, some delay is inevitable after the voltage started to be applied and before the light transmittance reaches its maximum level to complete the transition from dark state into bright state. Another time delay is caused after the voltage stopped being applied and before the light transmittance reaches its minimum value (i.e., zero).

In this embodiment, multiple different image subframes need to be displayed on the image display panel in one subframe period after another as shown in FIG. 8(b). If it takes a non-negligible amount of time to switch two image subframes to be displayed, then each image subframe will have insufficient brightness in the beginning of its subframe period. Meanwhile, even after the subframe period (i.e., a voltage application period) has ended, the same image subframe is still displayed for a while unnecessarily. In that case, even if the image subframe has been shifted, only the previous image subframe is displayed for a while or just a portion of the previous image subframe is superimposed on the next image subframe due to the slow response of the image display panel. Then, smearing or ghost (double image) phenomenon will happen around the contour and other portions of the synthesized image frame.

Figure 12:
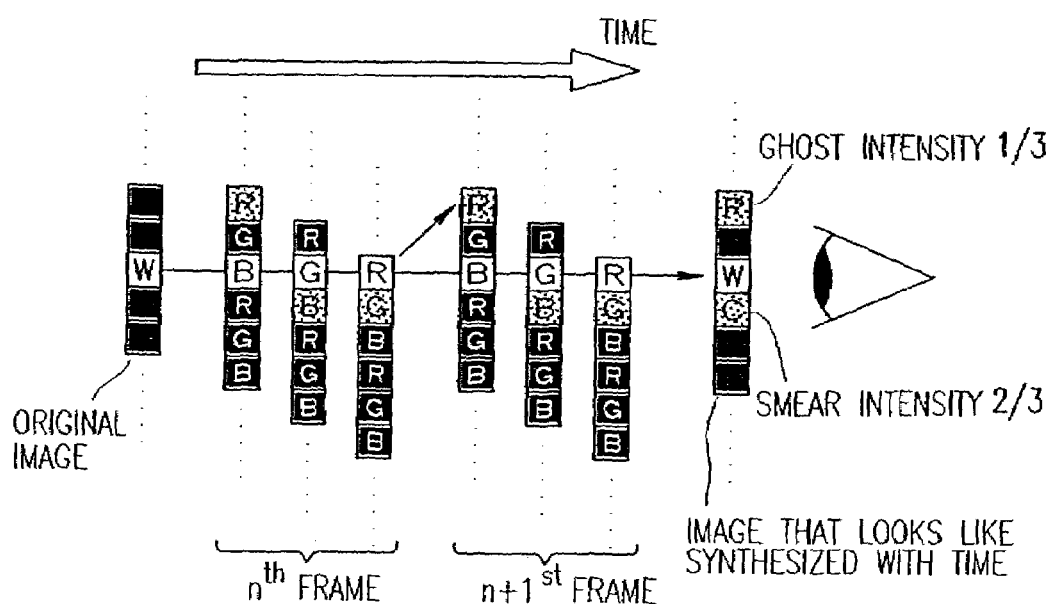
FIG. 12 shows another mode to shift image subframes.

Next, it will be described with reference to FIG. 12 why the smearing or ghost phenomenon occurs. FIG. 12 schematically illustrates a particular pixel row of three image subframes that make up an $n^{th}$ image frame (where n is a positive integer) and a corresponding pixel row of three image subframes that make up an $n+1^{st}$ image frame. Each of these pixel rows is displaced vertically because the optical path of each image subframe is shifted vertically by the image shifter. FIG. 12 illustrates pixels of which the bright-to-dark transition is delayed by the slow response of the image display panel. For example, a B pixel in bright state in the first one of the three image subframes that make up the $n^{th}$ image frame is shifted downward by one pixel in the next subframe. However, the B pixel has not completely changed into the dark state yet. In the following subframe, the B pixel is further shifted downward by one pixel and has changed into the dark state completely. Meanwhile, in this subframe, a G pixel that is located just over the B pixel maintains a rather bright state. If the response is delayed in this manner, a pixel that is adjacent to a pixel to be displayed in white (i.e., a W pixel) and another pixel that is adjacent to the W pixel but one are colorized unintentionally as shown in FIG. 12.

To avoid such a smearing or ghost phenomenon resulting from the delayed response of the image display panel, some measure may be taken to prevent the light rays being modulated by pixel regions with delayed response from being projected onto the projection plane while image subframes are switched in the image display panel. To do so, only while the response is delayed, a portion of the optical path (from the light source to the projection plane) may be blocked temporarily by some light cutoff device such as a liquid crystal shutter or a mechanical shutter or the light source may be temporarily turned OFF or have its brightness decreased.

A similar problem happens not only while the response of the image display panel is delayed but also while the display timing of the image display panel is not synchronous with the image shifting timing. Accordingly, the optical path may be blocked in a period during which such a time lag is, or may be, caused.

Figure 13:
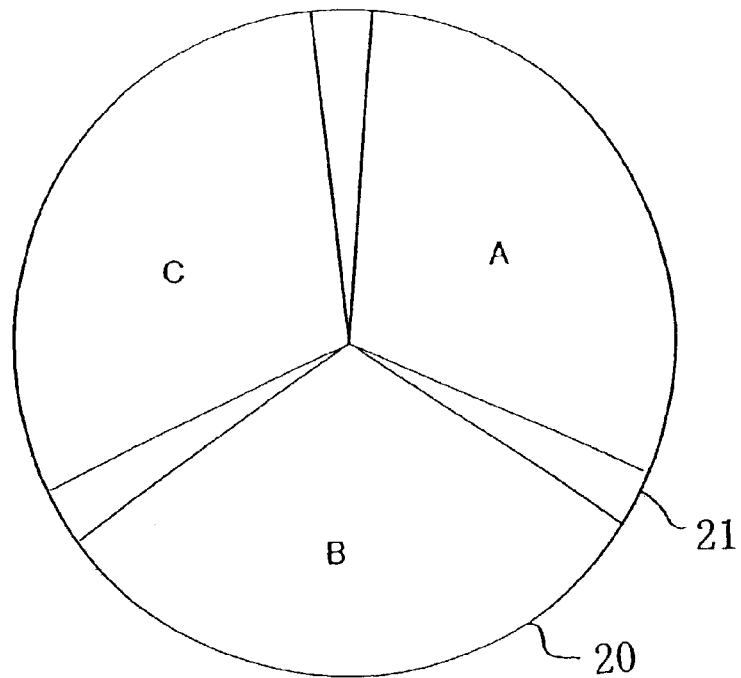
FIG. 13 is a front view illustrating a modified example of the rotational plate as the image shifter shown in FIG. 9.

It should be noted that instead of using such a light cutoff device specially provided, the image shifter shown in FIG. 9 may be modified so as to perform the "light cutoff function" by itself. For example, portions of the glass plate 20, through which the light beam passes while the response of the image display panel should be delayed or while the time lag should be caused, may be opaque regions 21 as shown in FIG. 13. Then, the smearing or ghost phenomenon such as that shown in FIG. 12 can be suppressed and an image of higher quality can be obtained. The central angle of the fan-shaped opaque regions 21 is appropriately determined by the length of the delay in response of the image display panel, for example. The smaller the percentage of the opaque regions 21 to the overall glass plate 20, the brighter the image to be presented on the projection plane.

The timing relationship between the period from the start to the end of the response of the image display panel and the period from the start of image shifting to the start of the next image shifting (i.e., the image shifting period) is preferably adjusted as shown in FIG. 11, for example. That is to say, the image shifting is preferably carried out while the respective pixel regions of the image display panel have sufficiently high brightness.

In the embodiment described above, a twisted nematic (TN) mode LCD panel is used as an image display panel. However, the present invention is not limited to this specific preferred embodiment but an LCD panel of any of various other modes may be used instead. If a display panel having a higher response speed is adopted, then the ratio of the total area of the opaque regions to the overall area of the image shifter can be reduced and therefore, an even brighter image of higher quality can be obtained.

The projection type image display device according to the embodiment described above generates three image subframes in each frame period and synthesizes those subframes together while optically shifting them from each other. Thus, compared to the conventional single-panel projection type image display device using color filters, the optical efficiency can be increased significantly and the resolution can be increased threefold.

Figure 14:
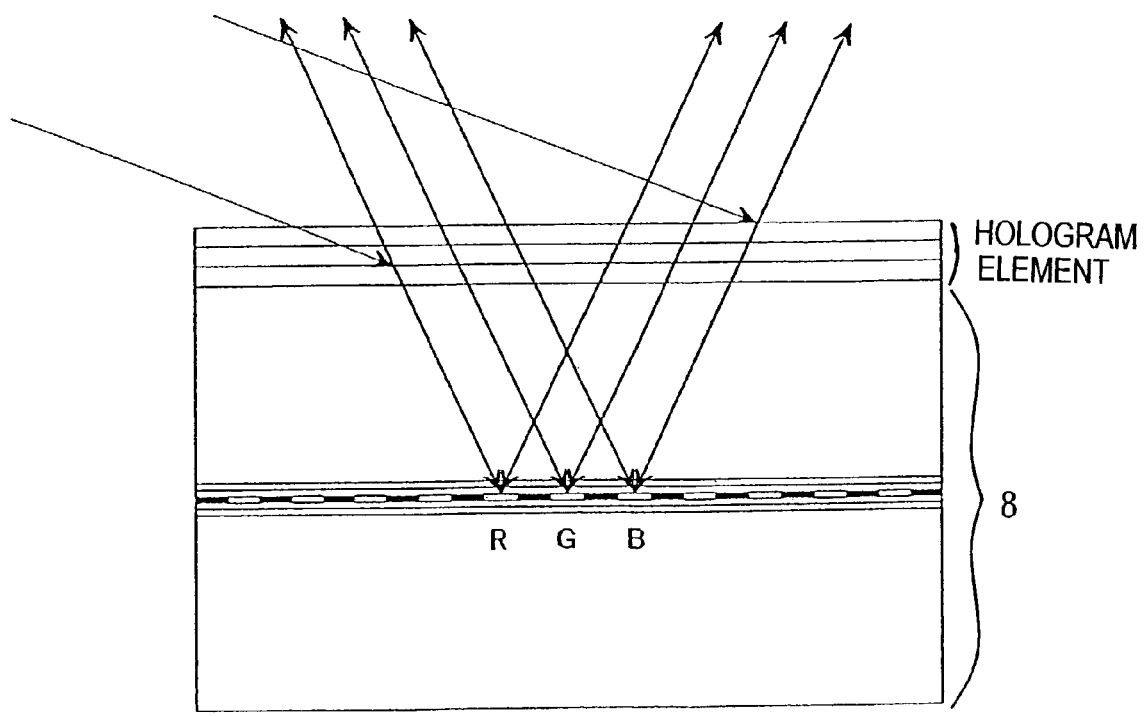
FIG. 14 is a cross-sectional view of a reflective LCD panel.

In the embodiment described above, a transmission type display panel is used as the image display panel. Alternatively, a reflective LCD panel such as that shown in FIG. 14 may also be used. The reflective LCD panel shown in FIG. 14 is disclosed in Japanese Laid-Open Publication No. 9-189809, for example. When such a reflective image display panel is used, there is no need to get the white light, emitted from the light source, split by dichroic mirrors. Instead, a transmissive hologram, provided on the display panel, diffracts and splits the white light into R, G and B light rays and then focuses those light rays onto the reflective electrodes (i.e., pixel electrodes) of their associated pixel regions. After having been reflected by the pixel electrodes, the light rays are transmitted through the hologram in accordance with a variation of the polarization components thereof. Such a transmissive hologram may be formed by stacking an R holography/lens array layer, a G holography/lens array layer and a B holography/lens array layer one upon the other.

In the reflection type, a transistor region may be provided on the bottom of (i.e., under) each reflective electrode. Thus, this type is advantageous if image subframes are switched at a time over the entire screen.

As described above, according to the first embodiment of the present invention, information about the same color is always presented in each pixel region of the image display panel. However, by shifting and projecting selected image subframes, information about mutually different positions (i.e., pixels) can be presented by each pixel region in one subframe after another. As a result, a high resolution is achieved.

Embodiment 2

Next, a second specific embodiment of the present invention will be described.

The projection type image display device of this second embodiment basically has the same configuration as the counterpart of the first embodiment described above. The main difference lies in the method of shifting image subframes. Thus, only this difference will be described.

Figure 15:
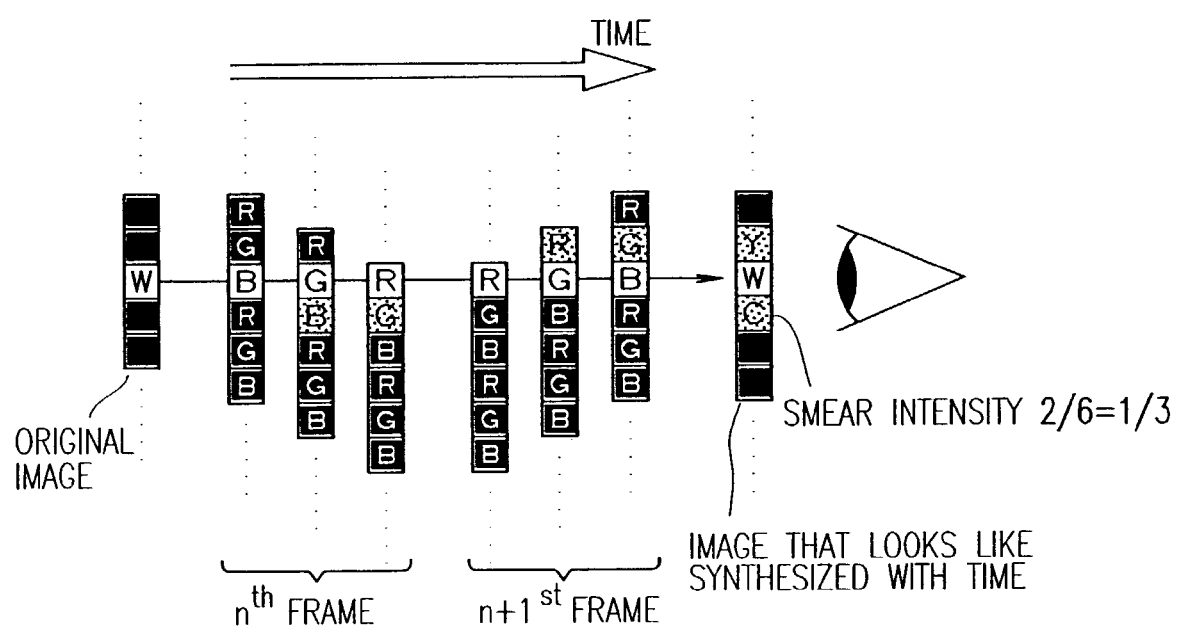
FIG. 15 shows still another mode of image shifting.

In the first embodiment described above, the direction in which the image subframes that make up the $n+1^{st}$ image frame (where n is a positive integer) are shifted is the same as the direction in which the image subframes that make up the $n^{th}$ image frame are shifted as shown in FIG. 12. In contrast, in this second embodiment, the direction in which the image subframes that make up the $n+1^{st}$ image frame are shifted is opposite to the direction in which the image subframes that make up the $n^{th}$ image frame are shifted as shown in FIG. 15. More specifically, the image subframes are shifted downward for the $n^{th}$ frame, while the image subframes are shifted upward for the $n+1^{st}$ frame. In addition, in this embodiment, the first image subframe of the $n+1^{st}$ frame and the last image subframe of the $n^{th}$ frame are projected onto the same location on the projection plane.

Also, in this embodiment, one image shifting period is equal to two frame periods, during which image shifting is carried out only four times. Thus, degradation in image quality, which might be caused due to the delayed response of the image display panel or the image shifting time lag, can be reduced. Furthermore, no pixels but adjacent ones are colorized, the number of subfields with the colorized pixels can be cut down to two-thirds of the first embodiment, and no ghost image is produced anymore.

To prevent image subframes from being shifted in this manner when two frames are switched, the image shifter may operate on the light beam under the same conditions, or may stop its movement, for the last subframe of each frame and the first subframe of the next frame.

Figure 16:
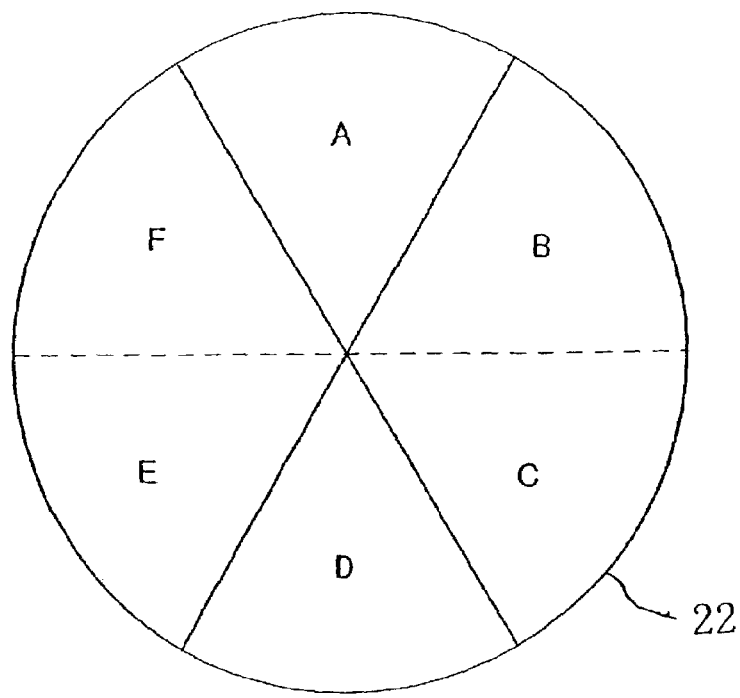
FIG. 16 is a front view of still another rotational plate as an image shifter.

An exemplary image shifter for use to carry out such image shifting is shown in FIG. 16. This image shifter includes a glass plate 22 having transparent regions A through F. The transparent regions E and F are made of FK5 glass having a refractive index of 1.49, the transparent regions A and D are made of BaK4 glass having a refractive index of 1.57 and the transparent regions B and C are made of SF2 glass having a refractive index of 1.64. Each of these transparent regions has a thickness of 2.0 mm.

The disklike glass plate 22 having such a configuration is disposed such that the principal surface thereof defines an angle of 65 degrees with the optical axis. Also, the glass plate 22 is rotated such that the timing at which each transparent region crosses the optical path is synchronized with the timing at which the previous subframe is switched into its associated subframe. Then, the optical path that crosses the transparent region A or D shifts by 34.0 μm from the optical path that crossed the transparent region F or E. The optical path that crosses the transparent region B or C shifts by 26.6 μm from the optical path that crossed the transparent region A or D.

Suppose the transparent region F is associated with the first subframe of the $n^{th}$ frame shown in FIG. 15. In that case, the transparent region A is associated with the next subframe of the $n^{th}$ frame and the transparent region B is associated with the last subframe of the $n^{th}$ frame. The transparent region C is associated with the first subframe of the $n+1^{st}$ frame, the transparent region D is associated with the next subframe of the $n+1^{st}$ frame and the transparent region E is associated with the last subframe of the $n+1^{st}$ frame.

The transparent regions B and C have the same refractive index and the same thickness, and shift the optical path to the same amount. Thus, as shown in FIG. 15, no shifting is caused between the two image subframes that are associated with these transparent regions B and C. The same phenomenon occurs between the transparent regions E and F.

In this example, the transparent regions B and C or the transparent regions E and F are regarded as two separate regions (as indicated by the dashed line in FIG. 16) for illustrative purposes only. Actually, though, each pair of regions B and C or E and F may be one continuous member. Accordingly, the disklike glass plate 22 shown in FIG. 16 may be formed by combining four fan-shaped transparent members together.

Figure 17:
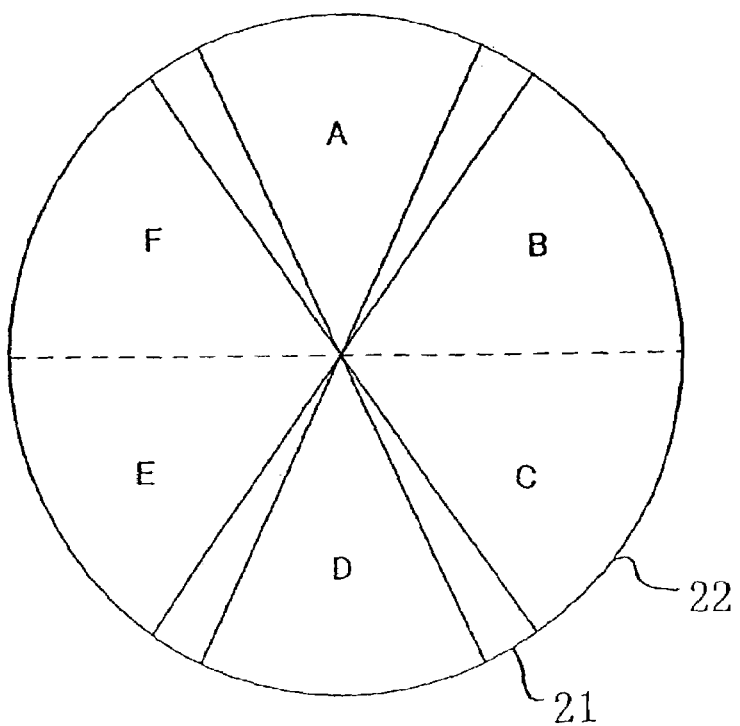
FIG. 17 is a front view of yet another rotational plate as an image shifter.

In this embodiment, a time lag may also be caused between the image shifting timing and the subframe switching timing due to the delayed response of the image display panel, for example. For that reason, opaque regions 21 are also preferably provided for appropriate portions of the glass plate 22 as shown in FIG. 17. Specifically, in the example illustrated in FIG. 17, each of the opaque regions 21 may be provided in the boundary of two regions, between which image shifting should be carried out (i.e., at both ends of the transparent region A or D).

In the second embodiment described above, a TN mode LCD panel is also used as the image display panel. However, an LCD panel of any of various other modes may also be used instead. If a display panel having a higher response speed is adopted, then the ratio of the total area of the opaque regions to the overall area of the image shifter can be reduced, and therefore, an even brighter image of higher quality can be obtained. Also, in the second embodiment described above, a transmission type display panel is used as the image display panel. Alternatively, a reflective LCD panel such as that shown in FIG. 14 may also be used.

The projection type image display device according to the embodiment described above generates three image subframes in each frame period by using an image display panel with no color filters, and synthesizes those subframes together while optically shifting them from each other. Thus, compared to the conventional single-panel projection type image display device using color filters, the optical efficiency can be increased significantly and the resolution can be increased threefold.

Furthermore, since the image subframe is not supposed to be shifted when frames are switched, the smearing or ghost phenomenon due to the delayed response of the image display panel, for example, can be reduced significantly.

Embodiment 3

Next, a third specific embodiment of the present invention will be described.

The projection type image display device of this third embodiment basically has the same configuration as the counterpart of the first embodiment described above. The main differences lie in the arrangement of image subframes and the shifting method thereof. These differences will be described below.

Figure 18:
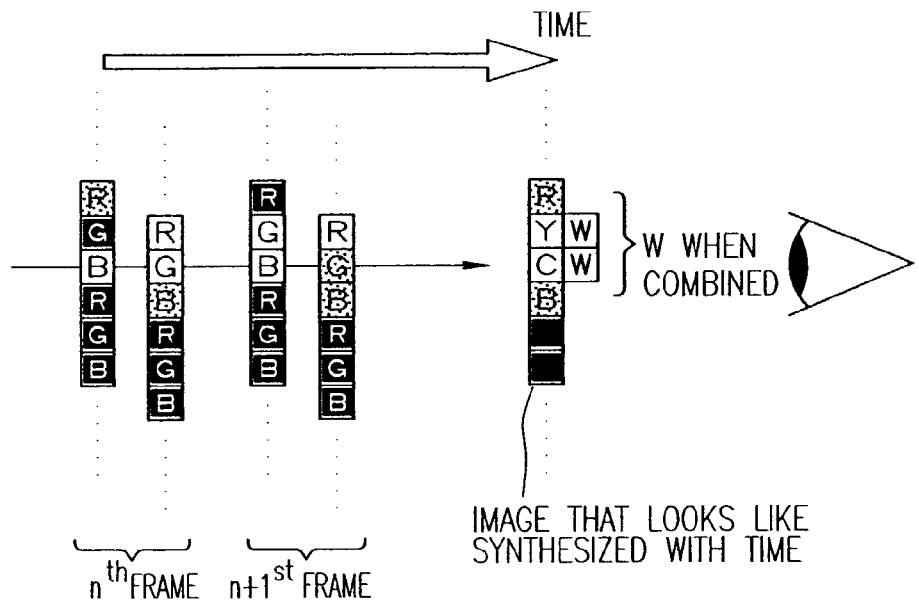
FIG. 18 shows yet another mode of image shifting.

In this embodiment, each image frame is made up of two image subframes as shown in FIG. 18. These two image subframes are sequentially displayed at two different locations on the projection plane. Also, one pixel on the projection plane is made up of three pixels in total, i.e., a pixel of the first image subframe of each frame and two pixels of the second image subframe thereof to be projected near the first image subframe. Conversely, another pixel that is adjacent to the one pixel on the projection plane is obtained by synthesizing together two pixels of the first image subframe and one pixel of the second image subframe. In that case, the image to be formed on the projection plane has somewhat decreased resolution. However, since each frame can be made up of just two subframes, there is no need to drive the image display panel at so high a speed, and the smearing phenomenon resulting from the delayed response can be minimized.

In this third embodiment, an image shifter that is so constructed as to get image subframes displayed at two different locations on the projection plane is used. The image shifter may be implemented as a glass plate having two types of transparent regions with mutually different refractive indices and/or mutually different thicknesses.

In the third embodiment described above, a TN mode LCD panel is also used as the image display panel. However, an LCD panel of any of various other modes may also be used instead. If a display panel having a higher response speed is adopted, then the ratio of the total area of the opaque regions to the overall area of the image shifter can be reduced and therefore, an even brighter image of higher quality can be obtained. Also, in the third embodiment described above, a transmission type display panel is used as the image display panel. Alternatively, a reflective LCD panel such as that shown in FIG. 14 may also be used.

The projection type image display device according to the embodiment described above generates two image subframes in each frame period by using an image display panel with no color filters, and synthesizes those subframes together while optically shifting them from each other. Thus, compared to the conventional single-panel projection type image display device using color filters, the optical efficiency can be increased significantly and a higher resolution is achieved.

Embodiment 4

Next, a fourth specific embodiment of the present invention will be described.

The projection type image display device of this fourth embodiment basically has the same configuration as the counterpart of the first embodiment described above. The main differences lie in the arrangement of image subframes and the shifting method thereof. These differences will be described below.

Figure 19:
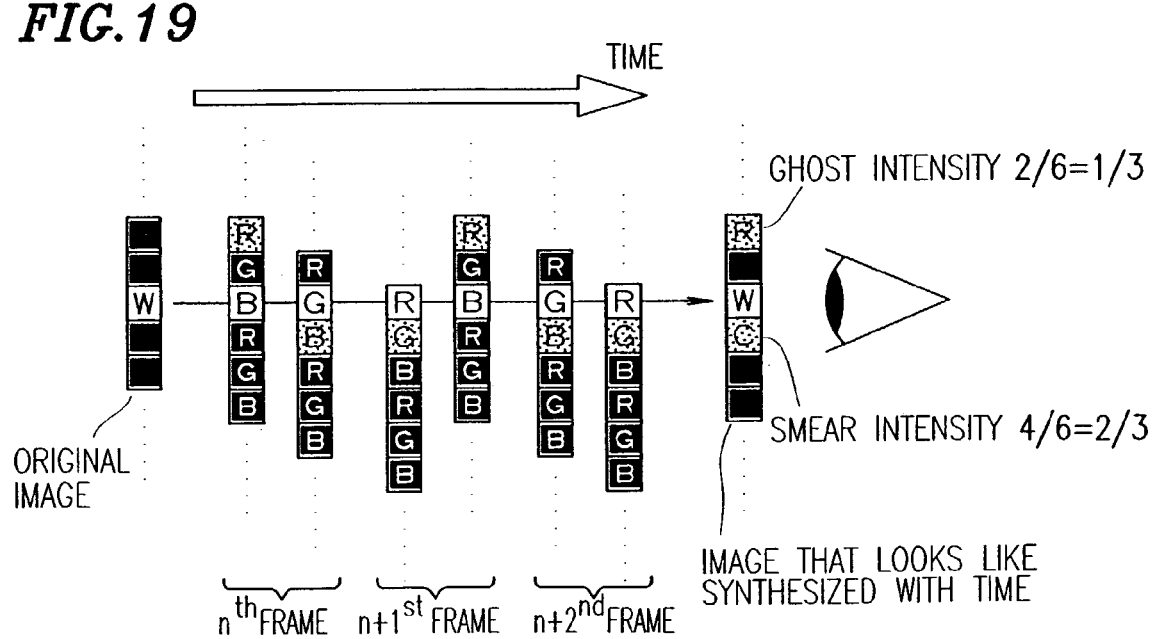
FIG. 19 shows yet another mode of image shifting.

In this embodiment, each image frame is made up of two image subframes as shown in FIG. 19. These two image subframes are sequentially displayed at three different locations on the projection plane. Since each frame can be made up of just two subframes, there is no need to drive the image display panel at so high a speed, and the smearing phenomenon resulting from the delayed response can be minimized.

In this embodiment, the number of image subframes that make up one image frame is two as shown in FIG. 19. However, these image subframes are sequentially displayed at three different locations on the projection plane. Thus, one image shifting period is 1.5 times as short as one frame period. As a result, pieces of information representing R, G and B pixels are superimposed one upon the other at each pixel on the projection plane. Consequently, an image having a higher resolution than that of the third embodiment described above can be obtained.

In this embodiment, two image subframes correspond to two subframes that make up one original image frame of a video signal. However, the timing at which each of those subframes, which make up the original image frame of a video signal, should be displayed does not have to be exactly matched to the timing at which its corresponding image subframe should be displayed. For example, if the time to display the next subframe has come before the last one of the subframes that make up an original image frame of the video signal is displayed fully, then the remaining video signal parts of that original image frame may be discarded and instead the first one of the subframes that make up another original image frame may start to be displayed. In a normal picture, the image information does not change so dramatically between two frames or between two subframes. Accordingly, even if the frequency of frames to be displayed is different from the frequency of original image frames, the display operation still can be conducted without making the viewer feel non-smoothness. Thus, according to this embodiment, the device structure can be simplified without degrading display quality seriously.

Unlike the third embodiment described above, the image shifter of this fourth embodiment gets image subframes displayed at three different locations on the projection plane. Thus, the image shifter of the first embodiment described above may also be used and the rotational velocity thereof may be decreased to two-thirds in this fourth embodiment.

In the fourth embodiment described above, a TN mode LCD panel is also used as the image display panel. However, an LCD panel of any of various other modes may also be used instead. If a display panel having a higher response speed is adopted, then the ratio of the total area of the opaque regions to the overall area of the image shifter can be reduced and therefore, an even brighter image of higher quality can be obtained. Also, in the fourth embodiment described above, a transmission type display panel is used as the image display panel. Alternatively, a reflective LCD panel such as that shown in FIG. 14 may also be used.

The projection type image display device according to the embodiment described above generates two image subframes in each frame period by using an image display panel with no color filters, and synthesizes those subframes together while optically shifting them from each other. Thus, compared to the conventional single-panel projection type image display device using color filters, the optical efficiency can be increased significantly and a higher resolution is achieved.

Embodiment 5

Next, a fifth specific embodiment of the present invention will be described.

The projection type image display device of this fifth embodiment basically has the same configuration as the counterpart of the first embodiment described above. The main differences lie in the arrangement of image subframes and the shifting method thereof. These differences will be described below.

In this fifth embodiment, each image frame is made up of four image subframes, which are sequentially displayed at three different locations on the projection plane. Two of the four image subframes that make up one image frame are displayed at the same location on the projection plane. That is to say, in this fifth embodiment, subframe data are generated as in the first embodiment described above. However, in this fifth embodiment, the second subframe of each frame is displayed again as the last subframe, thereby making up one image frame of four subframes.

Figure 20:
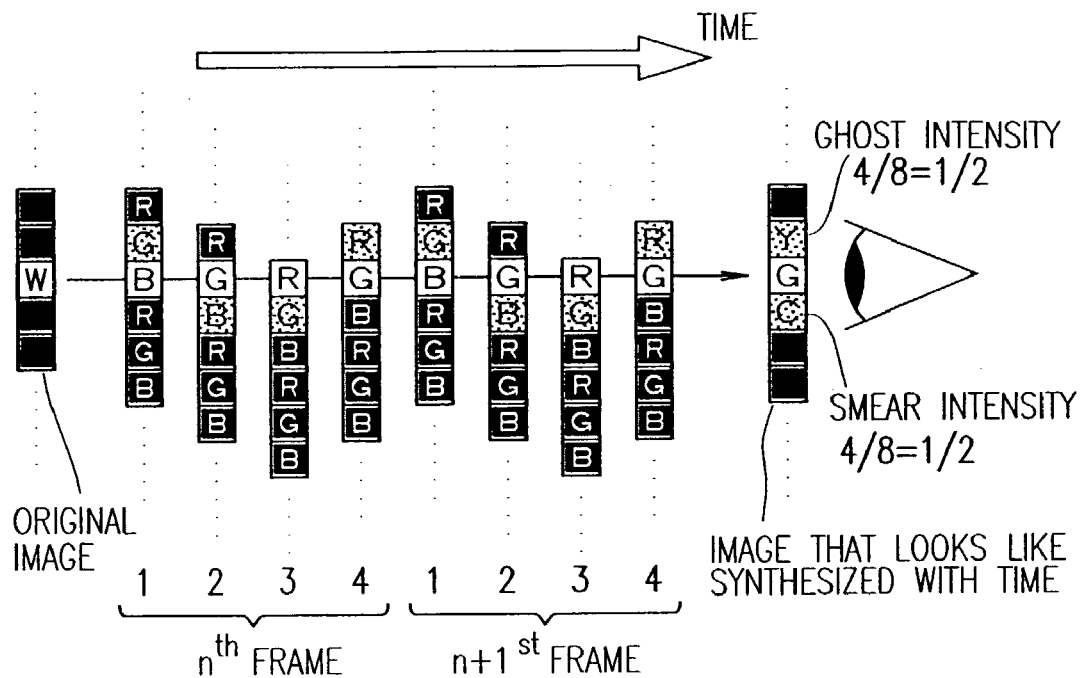
FIG. 20 shows yet another mode of image shifting.

This point will be described in further detail with reference to FIG. 20.

In this embodiment, image shifting is carried out approximately at one pixel pitch. Specifically, the first image subframe of each frame is shifted upward from the second image subframe thereof, while the third image subframe of each frame is shifted downward from the fourth image subframe thereof. That is to say, each frame is made up of four subframes and one shifting period includes four image shifting operations.

In this fifth embodiment, the images are moved up and down on a frame-by-frame basis, and therefore, the images can always be shifted to three different locations on a pixel-by-pixel basis. Furthermore, the image shifting can always be carried out pixel by pixel no matter whether the shifting is an intra-frame one or an inter-frame one. Thus, the ghost phenomenon can be prevented as shown in FIG. 20.

Figure 21:
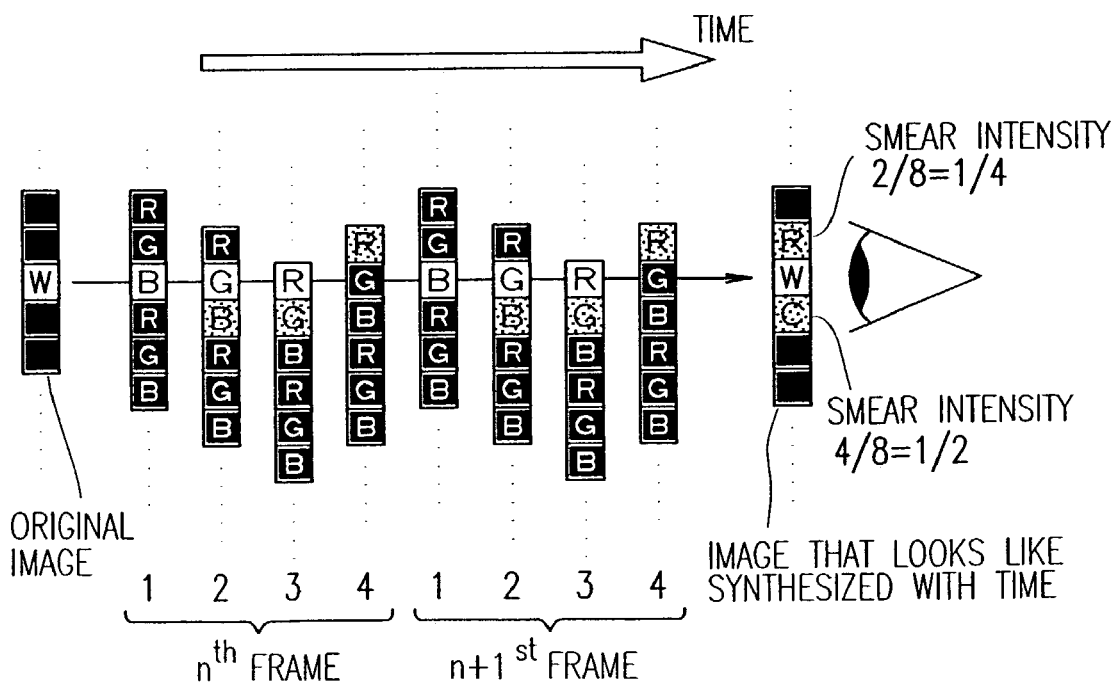
FIG. 21 shows yet another mode of image shifting.

Furthermore, if the fourth display subframe is displayed in black as shown in FIG. 21, every color is displayed the same number of times in each frame. As a result, the color balance among the pixels can be improved.

Alternatively, one frame may be made up of five or more image subframes. In that case, multiple image subframes to be displayed in black are preferably dispersed in each frame such that every color is displayed the same number of times in each frame.

As another alternative, instead of inserting an image subframe to be displayed in black into each frame in this manner, two image subframes to be displayed at the same location on the projection plane may be image subframes with a reduced brightness. More specifically, display image signals may be corrected such that the total quantity of light of the second and fourth image subframes of each frame is equal to the quantity of light of the first or third image subframe thereof. Then, the color balance among the pixels can be improved, and the pixels can always be displayed. As a result, the flicker can be reduced. Since those display image signals may always be corrected in the same way for all pixels and for every frame, the circuit to be provided for that purpose may have a simple configuration.

Figure 22:
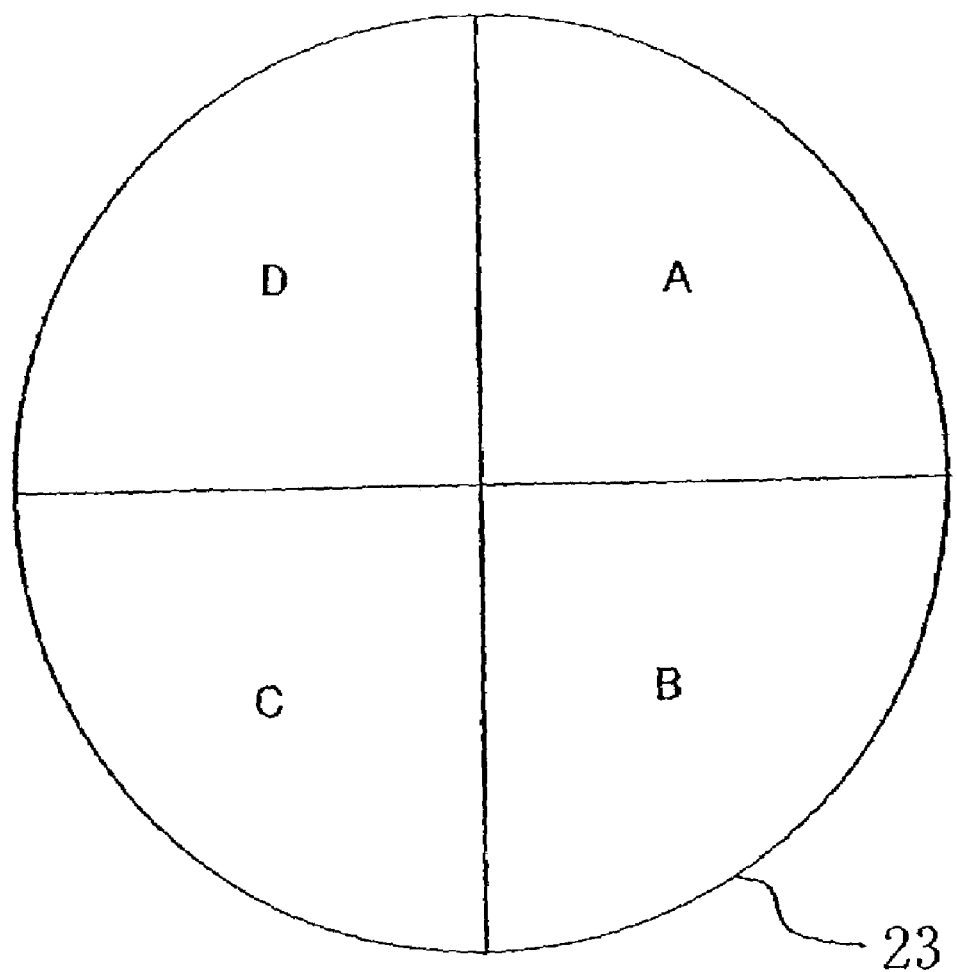
FIG. 22 is a front view of yet another rotational plate as an image shifter.

The image shifter for use in this embodiment is a glass plate 23 having four transparent regions as shown in FIG. 22. The transparent region A is made of FK5 glass having a refractive index of 1.49, the transparent regions B and D are made of BaK4 glass having a refractive index of 1.57, and the transparent region C is made of SF2 glass having a refractive index of 1.64. Each of the transparent regions A through D has a thickness of 2.0 mm. The glass plate 23 crosses the optical path such that the principal surface thereof defines an angle of 65 degrees with the optical axis, and rotates such that the transparent regions A through D are associated with the respective image subframes. The light beam that crosses the transparent region A shifts by 34.0 µm upward from the light beam that crossed the transparent region B or D, while the light beam that crosses the transparent region C shifts by 26.6 µm from the light beam that crossed the transparent region B or D.

In the fifth embodiment described above, a TN mode LCD panel is also used as the image display panel. However, an LCD panel of any of various other modes may also be used instead. If a display panel having a higher response speed is adopted, then the ratio of the total area of the opaque regions to the overall area of the image shifter can be reduced and therefore, an even brighter image of higher quality can be obtained. Also, in the fifth embodiment described above, a transmission type display panel is used as the image display panel. Alternatively, a reflective LCD panel such as that shown in FIG. 14 may also be used.

The projection type image display device according to the embodiment described above generates four image subframes in each frame period by using an image display panel with no color filters, and synthesizes those subframes together while optically shifting them from each other. Thus, compared to the conventional single-panel projection type image display device using color filters, the optical efficiency can be increased significantly and the resolution can be increased threefold.

As described above, in the projection type image display device of the present invention, each image frame is divided into multiple image subframes time-sequentially and those image subframes are superimposed one upon the other while being shifted from each other, thereby reconstructing the original image frame through such an image synthesis process. The timing of shifting the image subframe is preferably synchronized with the timing of getting the image subframes switched by the image display panel.

The methods of switching the image subframes are roughly classifiable into the following two types. The first type is a "line scanning method". In this method, multiple pixel regions, which are arranged in columns and rows in the image display panel, are driven on a row-by-row basis or on a several-rows-at-a-time basis, and a new image subframe is sequentially displayed vertically from the top toward the bottom of the screen. A method of scanning one row after another with the screen divided into several blocks is also herein included in the "line scanning method". On the other hand, the second type is a "screen (or simultaneous) writing method". In this method, multiple pixel regions, which are arranged in columns and rows in the image display panel, are all driven simultaneously, and a new image subframe is displayed at a time on the screen.

It should be noted, however, that the present invention is not limited to any particular scanning method. Hereinafter, embodiments of the "line scanning method" will be described first.

Embodiment 6

Figure 23:
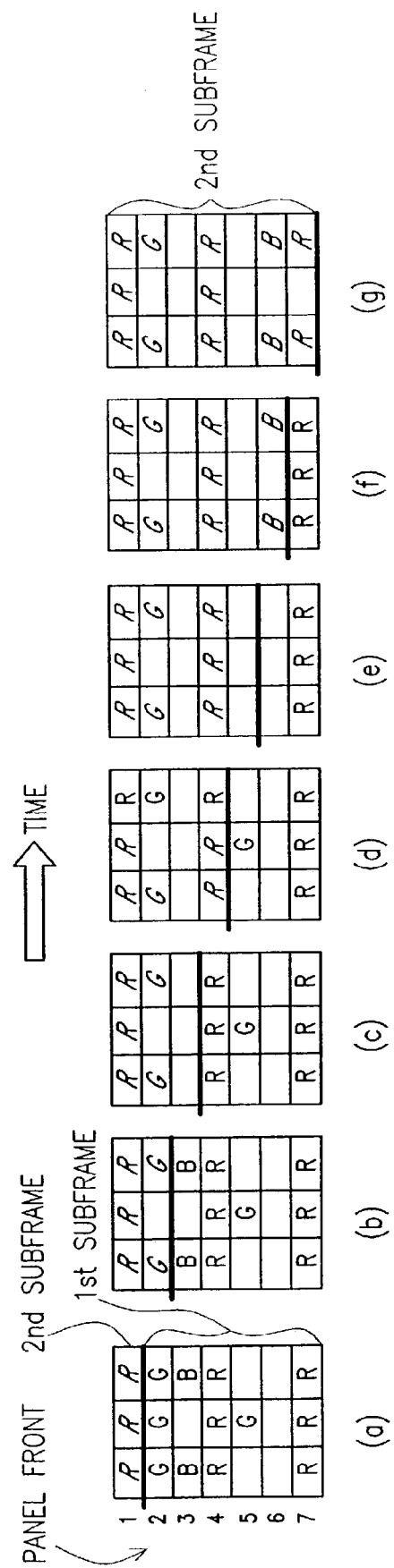
FIG. 23 is a partial front view of an image display panel showing how image subframes are switched by line scanning.

Portions (a) through (g) of FIG. 23 show how image subframes are switched by a line scanning technique in an image display panel. FIG. 23(*a*) shows a state in which only the first row of pixel regions of the display panel has been switched into the display of a new image subframe (e.g., the second image subframe). At this point in time, the other rows of pixel regions (i.e., the second and succeeding rows) maintain the display of the old image subframe (e.g., the first image subframe). As shown in portions (b) through (g) of FIG. 23, the scan line moves down row by row toward the bottom of the screen, thereby expanding the display area of the new image subframe. As a result, the new image subframe is displayed in the first through seventh rows of pixel regions in FIG. 23(*g*).

In this manner, in the image display panel to be driven by the normal line scanning technique, while the old image subframe is going to be switched into the new image subframe, the boundary between the old and new image subframes moves row by row every time one horizontal (1H) period passes. In this case, the point in time when the voltage starts to be applied as shown in FIG. 11 shifts one scan line (or row) after another at regular intervals.

Accordingly, when an image display panel to be driven by such a line scanning technique is used, the timing at which the new image subframe starts to be displayed is preferably synchronized with the timing at which the optical path starts to be shifted by the image shifter for each of multiple pixels. For that purpose, a rate at which the display area of the new image subframe increases (i.e., scan line moving rate) is preferably equal to a rate at which the shifting area of the image shifter increases.

Hereinafter, various image shifters that can be used effectively to get such an operation done will be described.

Figure 24:
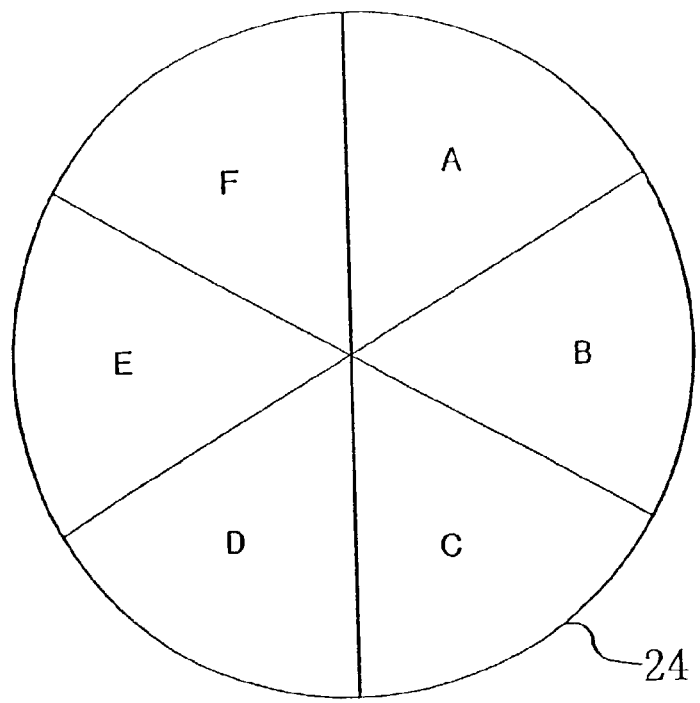
FIG. 24 is a front view of yet another rotational plate as an image shifter.

An image shifter according to this embodiment is implemented as a glass plate 24 having six transparent regions as shown in FIG. 24. The transparent regions A and D are made of FK5 glass having a refractive index of 1.49, the transparent regions B and E are made of BaK4 glass having a refractive index of 1.57, and the transparent regions C and F are made of SF2 glass having a refractive index of 1.64. Each of these transparent regions A through F has a thickness of 2.0 mm.

When this image shifter was inserted such that the principal surface of the glass plate 24 defined an angle of 65 degrees with the optical axis, the transparent regions B and E shifted the image by 34.0 µm with respect to the transparent regions A and D. On the other hand, the transparent regions C and F shifted the image by 26.6 µm with respect to the transparent regions A and D. Each of these transparent regions is associated with a display subframe. In this image shifter, the glass plate 24 has a uniform thickness. Accordingly, the image shifter can rotate calmly and constantly even at a high velocity.

Figure 25:
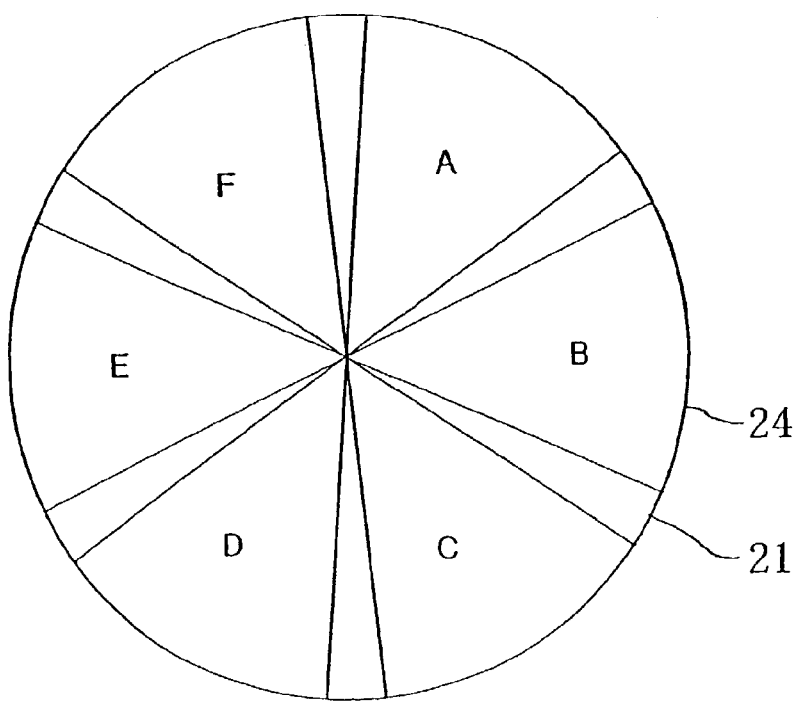
FIG. 25 is a front view of yet another rotational plate as an image shifter.

To suppress the smearing phenomenon due to the delayed response of the image display panel, for example, as described for the foregoing embodiments, opaque regions 21 are preferably provided between the transparent regions as shown in FIG. 25.

Also, as in the glass plate 20 shown in FIG. 9, only inexpensive BK7 glass may be used as the glass material. In that case, the thicknesses of the respective transparent regions may be selected relatively freely and an image shifter with higher precision can be obtained at a lower cost.

This image shifter may be modified as follows. Specifically, the transparent regions A and D may be notched portions of the glass plate 24 and the other transparent regions may be made of BK7 glass having a refractive index of 1.52. In that case, if the transparent regions B and E have a thickness of 0.7 mm and the transparent regions C and F have a thickness of 1.4 mm and if the image shifter is inserted such that the principal surface of the glass plate 24 defines an angle of 83.8 degrees with the optical axis, then the transparent regions B and E can shift the image by 26.0 μm with respect to the transparent regions A and D and the transparent regions C and F can also shift the image by 26.0 μm with respect to the transparent regions B and E. When such a configuration is adopted, the image shifter can have a lighter weight. Also, the image subframes associated with the transparent regions A and D are not transmitted through the glass. Thus, the sharpness can be increased effectively.

The glass plate 24 having the six transparent regions may also be modified as follows as another image shifter. Specifically, the transparent regions A and D may be made of FK5 glass having a refractive index of 1.49 and may have a thickness of 2.0 mm. The transparent regions B and E may be made of BK7 glass having a refractive index of 1.52 and may have a thickness of 2.09 mm. And the transparent regions C and F may be made of SF2 glass having a refractive index of 1.64 and may have a thickness of 2.0 mm. In that case, if this glass plate is inserted so as to define an angle of 65 degrees with the optical axis, then the transparent regions B and E can shift the image by 25.9 μm with respect to the transparent regions A and D and the transparent regions C and F can shift the image by 26.8 μm with respect to the transparent regions B and E. In this manner, by selecting a glass plate that can be mass-produced relatively easily and by adjusting the thicknesses thereof appropriately, an image shifter with higher precision can be manufactured at a lower cost even though the difference in thickness between the transparent regions is relatively small.

In the image shifter described above, the main portions thereof are all transparent plates made of glass materials. However, the image shifter of the present invention is not limited to those specific preferred embodiments. For example, a resin such as a plastic may also be used as long as the resin is a transparent material that can cause some refraction on the optical path.

As described above, to get the optical path of an image subframe shifted by a transparent plate that is disposed so as to define a tilt angle with respect to the optical axis, the transparent plate preferably has multiple transparent regions that have mutually different refractive indices and/or mutually different thicknesses. The thickness of the transparent plate is easily adjustable by a technique such as surface polishing or etching.

If the principal surface of the transparent plate should get tilted by an angle of 45 to 85 degrees with respect to the optical axis, an appropriate refractive index is preferably selected from the range of about 1.45 to about 1.7 to achieve the required image shift amount. A transparent plate having a refractive index that falls within this range is normally made of an inexpensive glass material. Thus, the image shifter can be produced at a reduced cost.

If the principal surface of the transparent plate should get tilted by an angle of 66 to 88 degrees with respect to the optical axis, the transparent plate preferably has a thickness that is appropriately selected from the range of about 0.5 mm to about 2.0 mm to achieve the required image shift amount. Also, if the principal surface of the transparent plate should get tilted by an angle of 61 to 80 degrees with respect to the optical axis, the transparent plate preferably has a thickness that is appropriately selected from the range of about 0.5 mm to about 2.0 mm and a refractive index that is appropriately selected from the range of about 1.45 to about 1.7 to achieve the required image shift amount.

Embodiment 7

Figure 26:
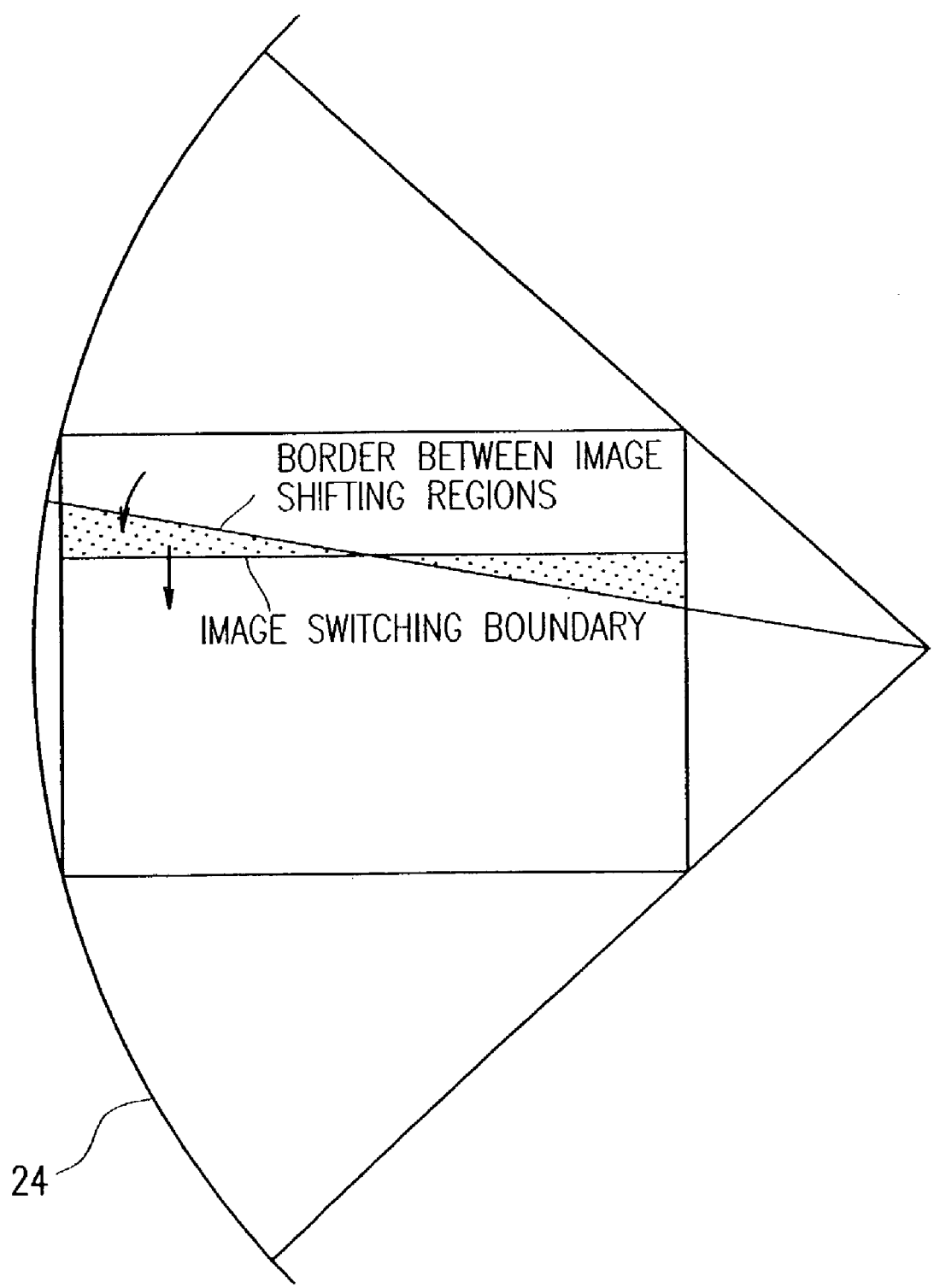
FIG. 26 shows how the timing of switching image subframes may shift from the image shifting timing depending on the location of a given pixel.

When line scanning is carried out vertically from the top to the bottom of the screen, the boundary between the $n^{th}$ image subframe and the $n+1^{st}$ image subframe (i.e., image switching boundary) is represented by a horizontal line segment as shown in FIG. 26, and this line segment moves downward.

In performing image shifting by using the rotational plate described above, the border line between adjacent transparent regions of the glass plate 24 (i.e., image shifting region border) rotates around a point as also shown in FIG. 26. Accordingly, this border line is sometimes not parallel to, but intersects with, the image subframe switching boundary. In that case, a portion of the current image subframe to be shifted may not be shifted appropriately but a portion of the previous image subframe not to be shifted may be shifted unintentionally.

To avoid such an inconvenience, it is possible to prevent the light that has gone out of the image display panel from being projected onto the projection plane by any of various methods only while such a time lag is caused as already described for the first embodiment.

Figure 27:
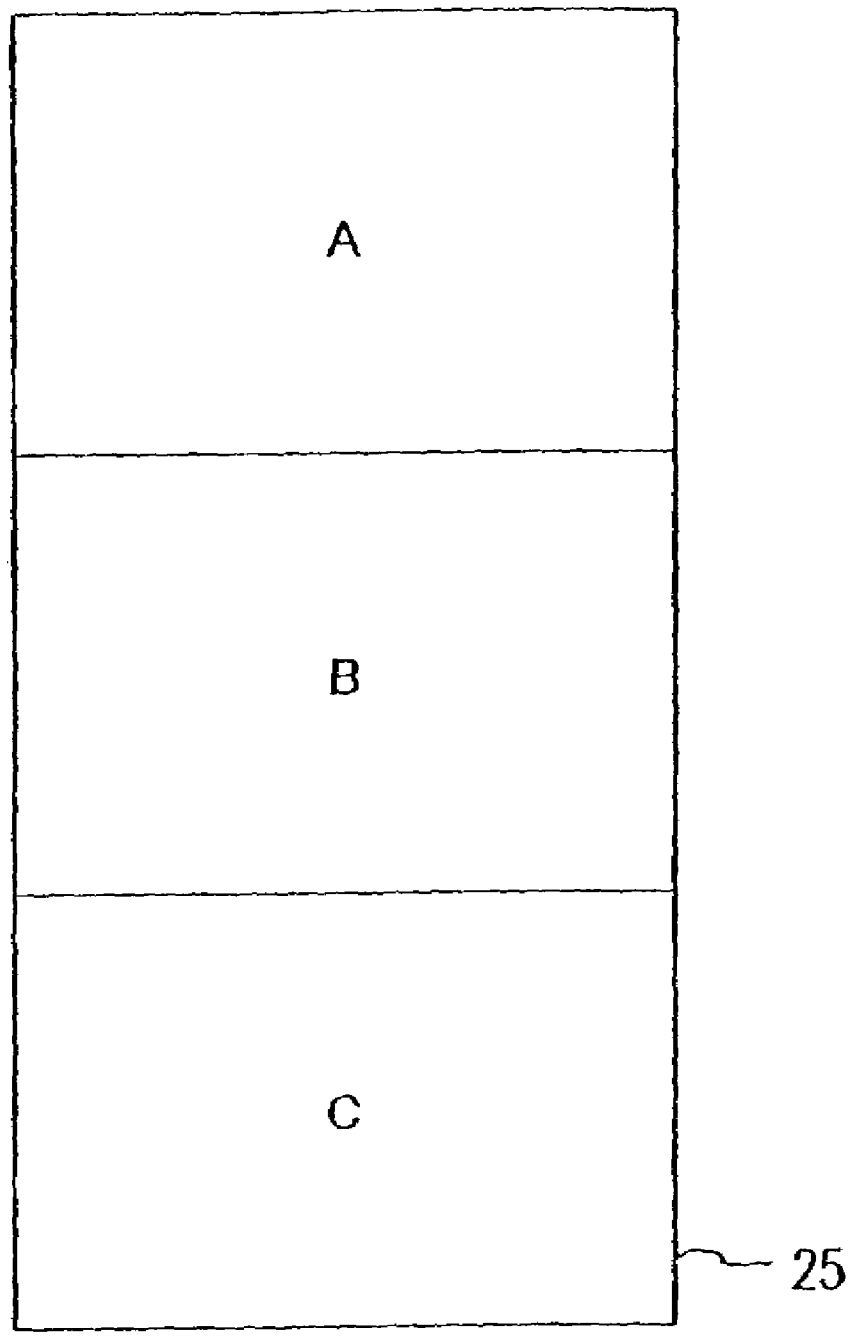
FIG. 27 is a front view of a transparent plate as an image shifter.

In this embodiment, to avoid this inconvenience, the image shifter is implemented as a glass plate 25 having three transparent regions but no opaque regions as shown in FIG. 27. By getting this glass plate 25 moved up and down by a driver, image shifting is carried out.

In this embodiment, the transparent region A of the glass plate 25 is made of FK5 glass having a refractive index of 1.49, the transparent region B is made of BaK4 glass having a refractive index of 1.57, and the transparent region C is made of SF2 glass having a refractive index of 1.64. Each of these transparent regions has a thickness of 2.0 mm. If such a glass plate 24 is inserted into the optical path such that the principal surface thereof defines an angle of 65 degrees with the optical axis, then the transparent region B can shift the image by 34.0 μm with respect to the transparent region A and the transparent region C can shift the image by 26.6 μm with respect to the transparent region B.

According to this embodiment, the border line between adjacent transparent regions of the glass plate 25 (i.e., image shifting region border) can always be parallel to the image switching boundary. Thus, all of the pixels, representing information about the new image subframe, can be shifted at appropriate timing and an even less smeared image can be obtained.

It should be noted that even if the image shifter of this embodiment is used, the smearing and other unwanted phenomena still may occur in some image display panels due to the delayed response. In that case, an opaque region (not shown) is preferably provided in the border between each pair of transparent regions A through C shown in FIG. 27.

Figure 28:
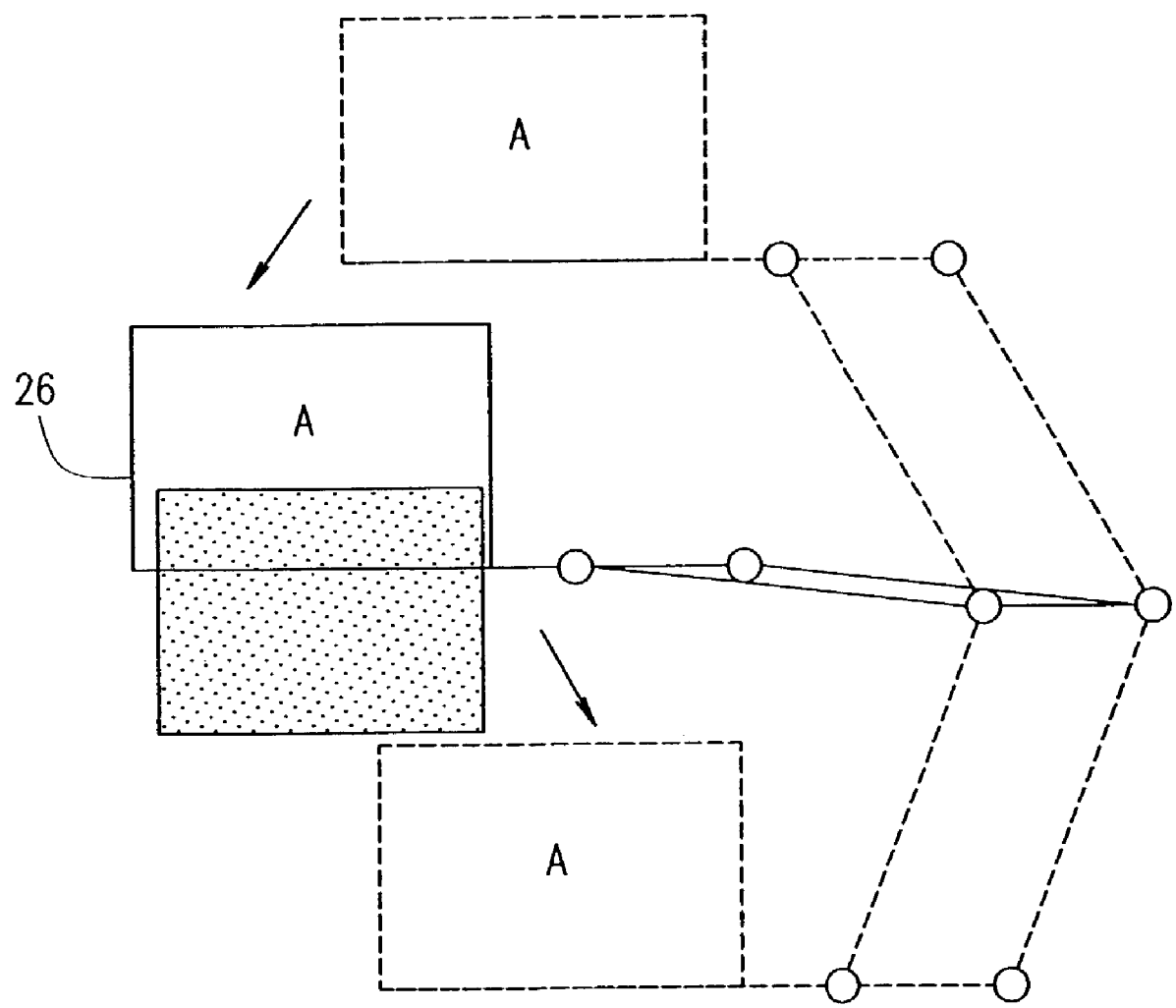
FIG. 28 shows how to drive the transparent plate shown in FIG. 27.

According to this embodiment, while the scan line of the image display panel is kept substantially parallel to the border line between multiple transparent regions, image shifting is carried out synchronously with switching of the images. To get such image shifting done, the glass plate 25 shown in FIG. 27 is moved up and down in this embodiment. However, any other means may also be used as long as the border line between adjacent transparent regions can be kept parallel to the scan line of the image display panel. For example, the transparent regions A through C shown in FIG. 27 may be made of separate glass plates 26 and those glass plates 27 may be moved by the driver shown in FIG. 28. Even by performing such an operation, the border line between multiple transparent regions can be moved synchronously with the line scanning process while being kept substantially parallel to the scan line of the image display panel. Similar effects are also achieved by arranging three transparent plates, corresponding to the transparent regions A through C, along the same optical path and by sequentially rotating them such that those plates cross the optical path one after another.

Embodiment 8

Hereinafter, another specific embodiment of the image shifter will be described with reference to FIGS. 29 through 31. The image shifter of this embodiment is made up of multiple micro prisms or diffraction gratings that are designed so as result in different shift amounts on the projection plane. Image shifting is carried out by getting this image shifter selectively inserted into the optical path.

Figure 29:
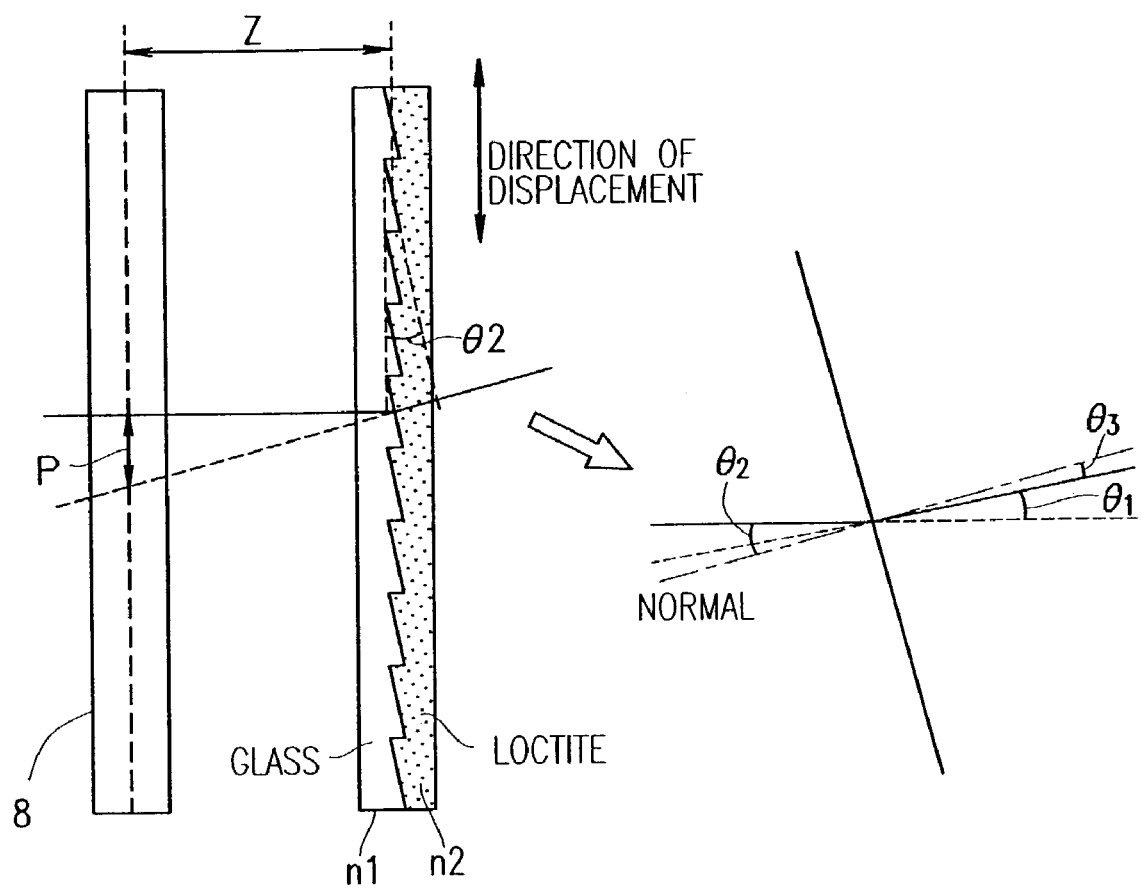
FIG. 29 is a cross-sectional view of an image shifter.

First, FIG. 29 will be referred to.

In this embodiment, the prism side of a micro prism plate, which is made of glass having a refractive index n1, is covered with a resin material having a refractive index n2. Suppose the image shifts by one pixel pitch on the projection plane when a light ray, which has been vertically incident onto the non-prism side (i.e., a smooth plane) of this micro prism plate, has its optical path refracted by an angle $\theta_1$. Also, suppose that the pitch of pixel regions on the image display panel 8 is P and the distance between the pixel region plane of the image display panel 8 and the prism plane (refracting plane) is Z. In this embodiment, the structure of the micro prism plate is designed such that $\theta_1 = \tan^{-1}(P/Z)$.

In this embodiment, FK5 glass is used as a material for the micro prism plate and Loctite 363 produced by Loctite Corporation is used as a UV curing resin on the surface of the prism side, thereby leveling the prism side.

Supposing the pixel region pitch P is 26 µm, the distance Z is 5 mm, the tilt angle of the micro prisms is $\theta_2$ (i.e., the angle at which an incoming light ray is incident on the sloped surface of a micro prism) and the angle at which the light ray, refracted by the micro prism, goes out of the micro prism is $\theta_3$, $\theta_1 = 0.3$ degrees is obtained by the equation described above.

In this case, since the glass has the refractive index n1 and the resin has the refractive index n2, $\theta_2$ and $\theta_3$ satisfy not only the relationship $n1 \cdot \sin \theta_3 = n2 \cdot \sin \theta_2$ in accordance with the Snell laws but also the relationship $\theta_2 = \theta_3 + \theta_1$. Accordingly, considering that FK5 glass has a refractive index of 1.487 and Loctite 363 has a refractive index of 1.520, a shift amount corresponding to the pitch P can be obtained by defining the tilt angle $\theta_2$ of the micro prisms at 13.7 degrees.

It should be noted that the present invention is not limited to the materials and numerical values that are adopted in the embodiment described above as long as various parameters are selected so as to satisfy the equations described above. Also, the prism side does not have to be leveled with a resin but the leveling process may be omitted.

When the prism plate shown in FIG. 29 or a diffraction grating is used as an image shifter, the distance between the image display panel 8 and the image shifter is defined as the constant distance Z. Accordingly, this distance may not be changed into any other arbitrary value once the optical design process described above is completed.

Figure 30:
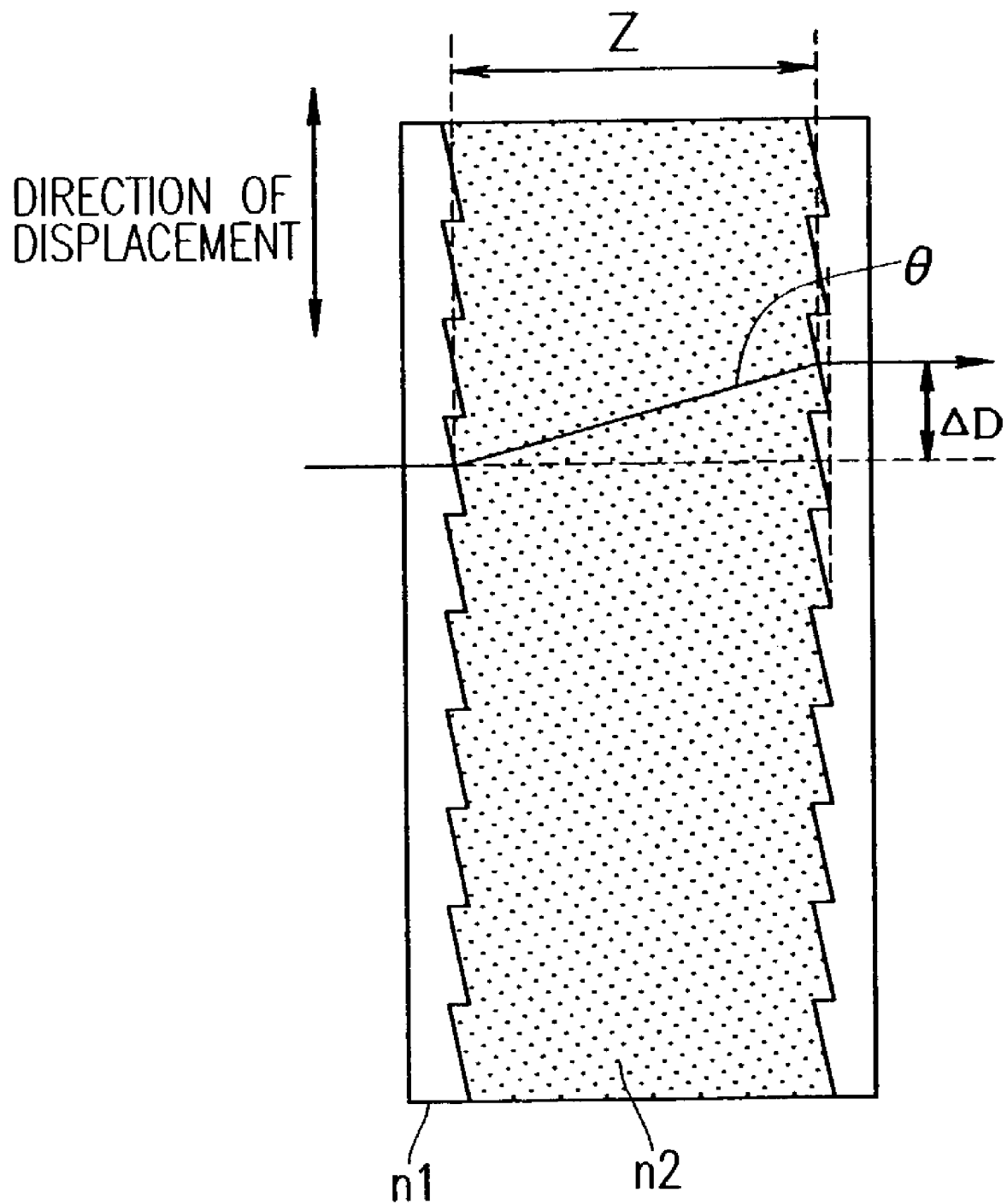
FIG. 30 shows how the image shifter may operate.

To obtain an image shifter that can be inserted into any position on the optical path without those constraints, a pair of micro prism plates of the type described above or diffraction gratings may be disposed so as to face each other as shown in FIG. 30, for example. In that case, the gap between the pair of micro prism plates or diffraction gratings may be filled with a material having a different refractive index n2 (e.g., the resin material). Specifically, the two micro prism plates may be made of SF2 glass and may be bonded together with the UV curing resin Loctite 363 produced by Loctite Corporation, for example. The distance Z between the micro prism plates may be 1 mm, for example. In this case, SF2 glass has a refractive index of 1.64 and Loctite 363 has a refractive index of 1.52. Thus, if the micro prisms have a tilt angle $\theta$ of 19.6 degrees, then the shift amount $\Delta D$ of the optical path will be about 26 µm.

Figure 31:
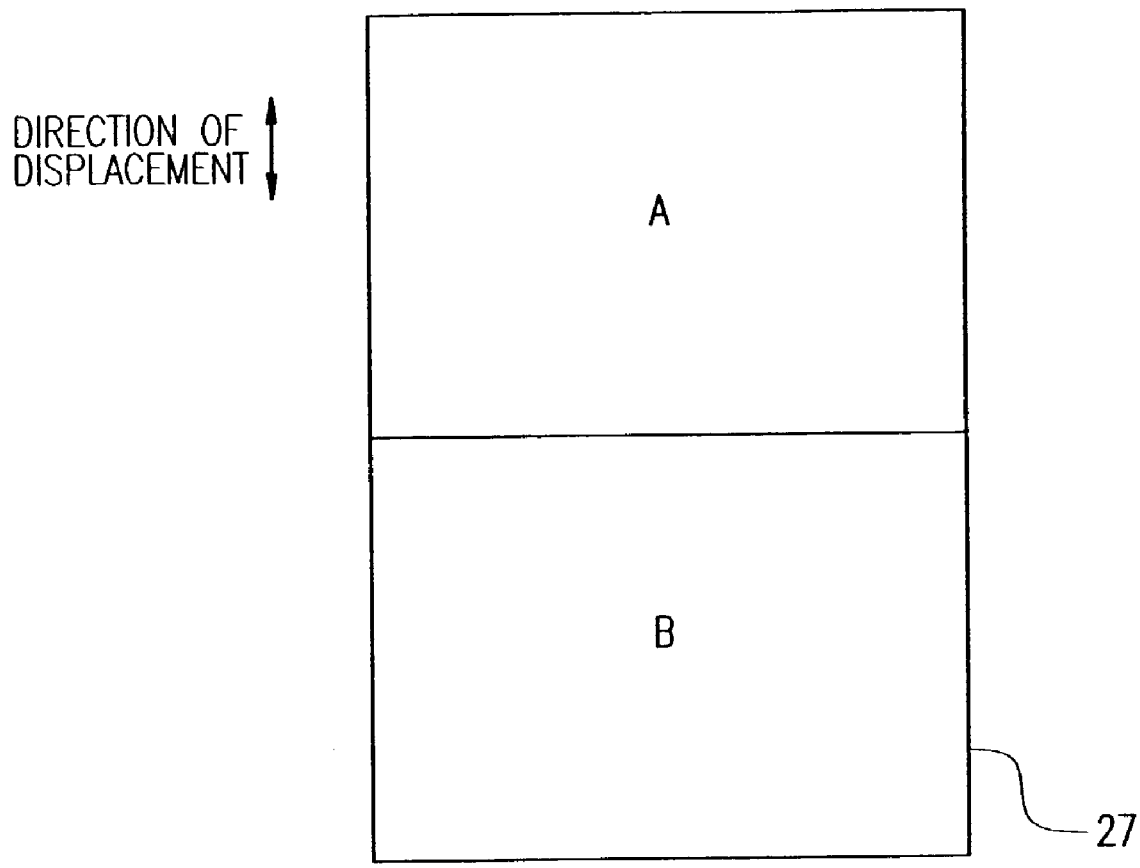
FIG. 31 is a front view of an image shifter.

To display an image subframe at three different locations on the projection plane, an element 27 may be formed as shown in FIG. 31 by combining the elements shown in FIG. 29 or 30. This element 27 is designed such that the region A and B thereof cause mutually different shift amounts $\Delta D$. If such an element 27 is operated periodically so as to be inserted into the optical path selectively (i.e., not inserted in a subframe period but inserted in another subframe period), image shifting can be carried appropriately.

In the examples illustrated in FIGS. 29 and 30, the light beam is shifted in an in-plane direction of the paper. However, since the direction in which the border line between shift regions moves and the shifting direction of the light beam can be defined independently of each other, the light beam moving direction is not limited to the illustrated one.

It should be noted that a light beam transmitted through the image shifter is eventually projected onto the projection plane by way of one of mutually different optical paths. That is to say, the optical path changes depending on which transparent region the light beam has been transmitted through. Accordingly, the optical path length between the image display panel and the projection plane changes subframe by subframe, not all of the images associated with respective transparent regions can be focused, and the image quality deteriorates. To prevent such deterioration in image quality, another transparent plate for compensating for the difference in optical path length, caused by the transparent plates of the image shifter, is preferably inserted into the optical path and operated (i.e., rotated or moved) synchronously with the transparent plates of the image shifter. Then, consistent image quality is realized for all subframes.

Embodiment 9

When image subframes are switched substantially simultaneously over the entire screen of the image display panel, each of the image subframes is also preferably shifted at a time over the entire screen. This is because a time lag is less likely caused between the timing of switching the image subframes and the timing of image shifting and the deterioration of image quality can be prevented in that case.

Such image shifting is preferably carried out during a vertical blanking interval. However, considering the delayed response of the image display panel, image shifting may also be carried out some time after the image subframes started to be switched.

Hereinafter, a configuration for an image shifter that can be used effectively in a simultaneous write method will be described.

Figure 32:
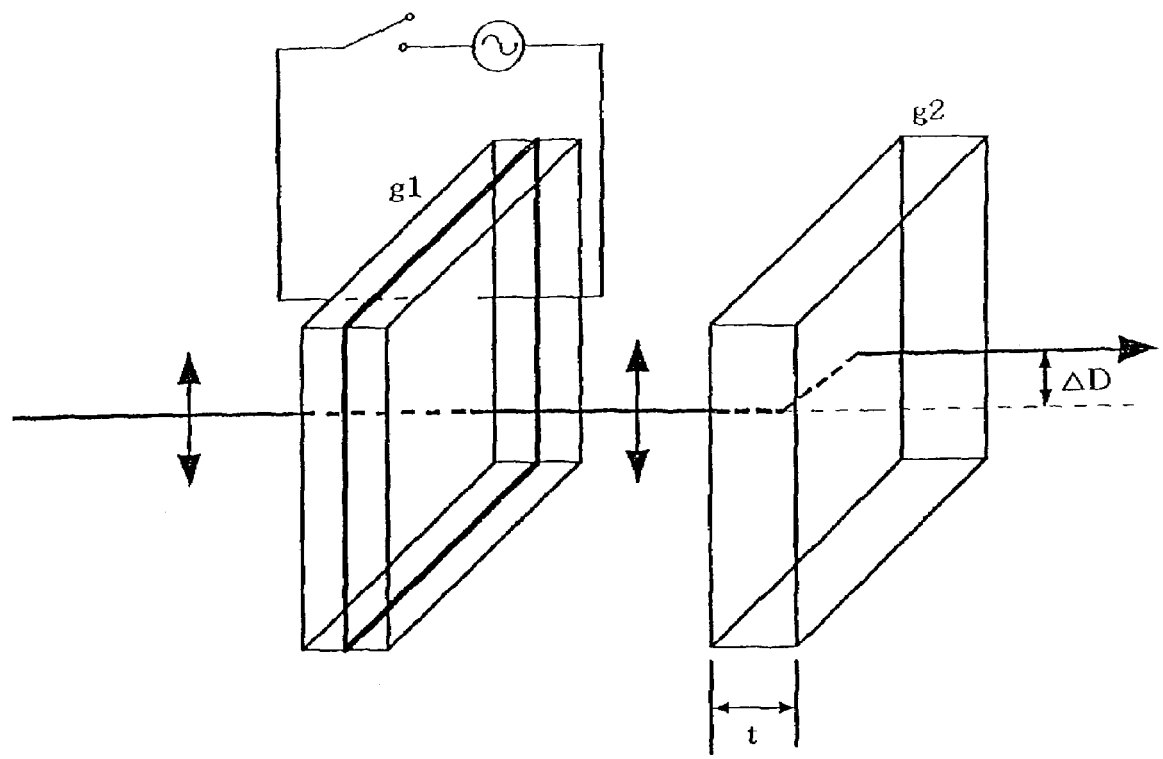
FIG. 32 is a perspective view of an image shifter.
Figure 33:
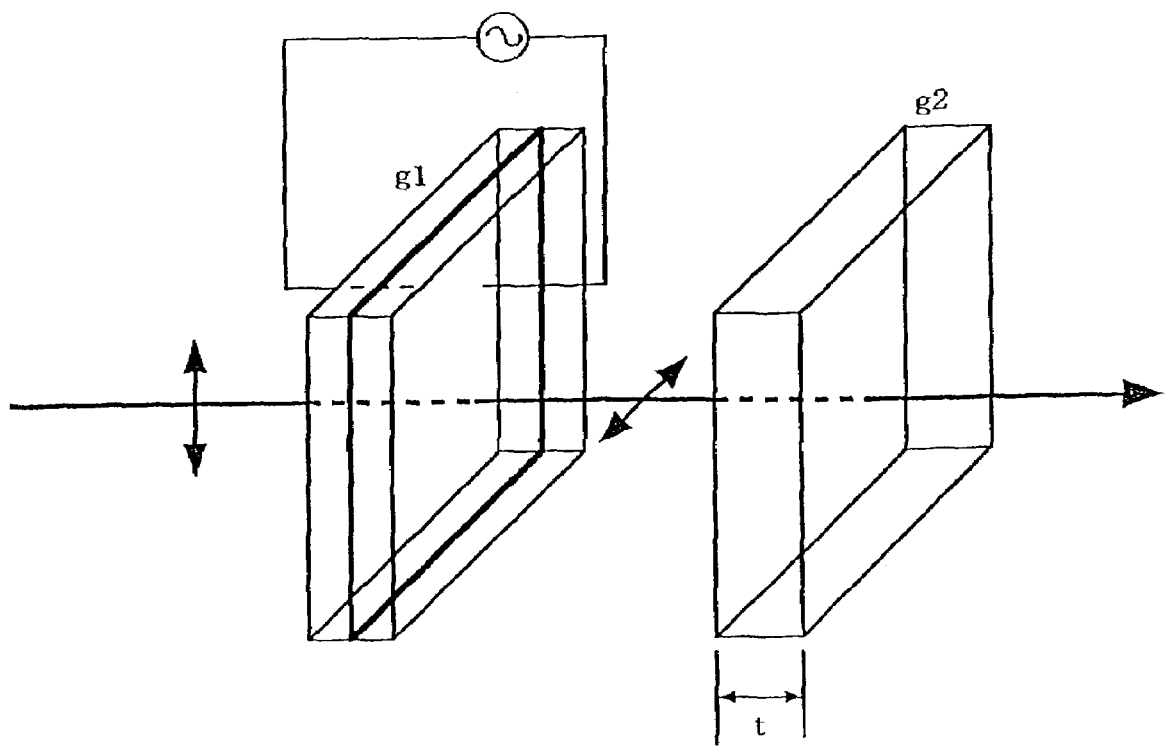
FIG. 33 is a perspective view of the image shifter.

First, referring to FIGS. 32 and 33, illustrated is an image shifter that includes: a first element (e.g., a liquid crystal cell) g1 for changing the polarization direction of an image subframe that has been modulated by the image display panel; and a second element g2 (e.g., a quartz plate) that exhibits one of multiple different refractive indices according to the polarization direction of the incoming light. As used herein, the "polarization direction" means the direction in which the electric vector of a light ray vibrates. The polarization direction is perpendicular to the propagation direction k of a light ray. Also, a plane that includes both the electric vector and the light propagation direction k will be herein referred to as a "vibration plane" or "polarization plane".

In the illustrated example, the light that has gone out of the image display panel is polarized vertically (i.e., polarization direction=vertical direction on the screen). While no voltage is being applied to the liquid crystal layer of the liquid crystal cell g1, the light that has gone out of the image display panel does not have its polarization plane rotated as shown in FIG. 32 while being transmitted through the liquid crystal cell g1. On the other hand, while an appropriate voltage is being applied to the liquid crystal layer of the liquid crystal cell g1, the light that has gone out of the image display panel has its polarization plane rotated 90 degrees by the liquid crystal layer as shown in FIG. 33. In the illustrated example, the angle of rotation is supposed to be 90 degrees. However, the angle of rotation may be defined arbitrarily depending on the design of the liquid crystal layer.

The quartz plate g2 consists of uniaxial crystals (or positive crystals) and has birefringence property. Thus, the quartz plate g2 exhibits multiple different refractive indices in respective directions. The quartz plate g2 is disposed such that its light incidence plane crosses the optical axis of the incoming light (which is parallel to the propagation direction k) at right angles. The optic axis of the quartz plate g2 is included in a perpendicular plane in FIGS. 32 and 33 but still tilts away from the light incidence plane of the quartz plate g2. Accordingly, when a light ray having the vertical polarization direction is incident onto the quartz plate g2, the light ray is refracted in the plane, including the optic axis, inside the quartz plate so as to shift vertically as shown in FIG. 32. The refraction is determined by the tilt of the optic axis. In this case, a plane that includes both the optic axis of the quartz plate g2 and the optical axis of the incoming light (which will be herein referred to as a "principal section") is parallel to the plane of polarization of the incoming light. Such an incoming light ray having a plane of polarization that is parallel to the principal section is an "extraordinary ray" for the quartz plate g2.

On the other hand, as shown in FIG. 33, when a light ray having a horizontal plane of polarization is incident onto the quartz plate g2, the light ray is neither refracted nor shifted. This is because the plane of polarization crosses the optic axis of the quartz plate g2 (or the principal section) at right angles. In that case, the light ray that is incident onto the quartz plate g2 is an "ordinary ray" for the quartz plate g2.

In this manner, the polarization direction of the light ray that is going to enter the quartz plate g2 can be controlled and the shift of the light ray can be adjusted by selectively applying a voltage to the liquid crystal cell g1.

Suppose the quartz plate g2 has a thickness t, the refractive indices of the quartz plate g2 against an extraordinary ray and an ordinary ray are $n_{e1}$ and $n_{o1}$, respectively, and the optic axis defines a tilt angle of 45 degrees in the principal section with respect to the incidence plane. Then, the shift amount ΔD of the light ray is given by $$t = \Delta D \cdot (2 \cdot n_{e1} \cdot n_{o1}) / (n_{e1}^2 - n_{o1}^2)$$

As can be seen from this equation, the shift amount ΔD of the light ray is proportional to the thickness t of the quartz plate g2. Thus, by adjusting the thickness t of the quartz plate g2, the shift amount of an image subframe may be adjusted to an arbitrary value.

In the image shifter of this embodiment, the liquid crystal layer is sandwiched between a pair of transparent electrodes so that an appropriate voltage can be applied to the overall liquid crystal layer at a time. Accordingly, by using this image shifter, image shifting can be carried out appropriately even in a simultaneous write mode.

It should be noted that if the structure of the electrodes to be provided for the liquid crystal cell is modified, a voltage can be applied to only a selected portion of the liquid crystal layer. When a liquid crystal cell having such electrodes is used, the image shifter is also applicable for use even with an image display panel to be driven by the line scanning technique described above.

In this embodiment, the polarization direction of the incoming light is rotated 90 degrees when a predetermined voltage is applied to the liquid crystal cell and is not rotated when no voltage is applied thereto. Alternatively, these relationships may be reversed.

Embodiment 10

Figure 34:
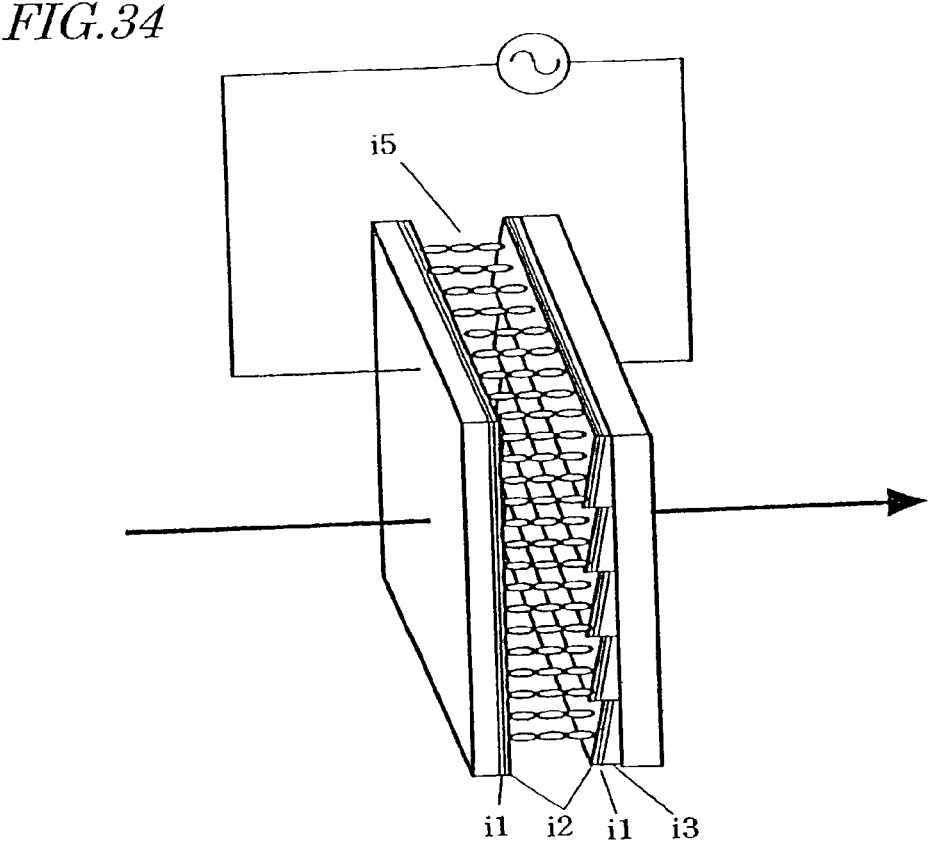
FIG. 34 is a perspective view of an image shifter.
Figure 35:
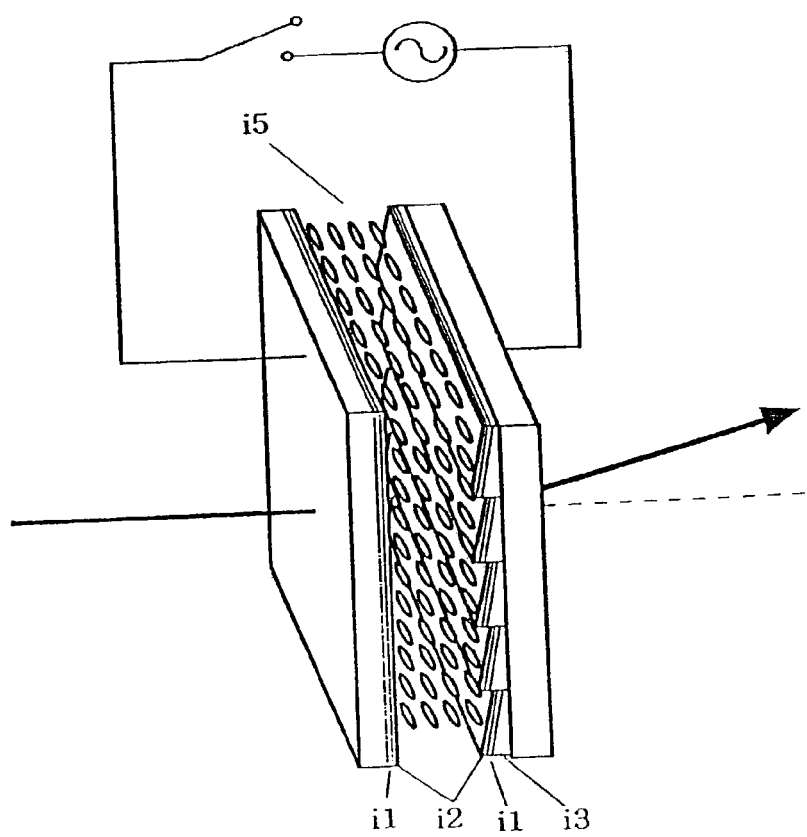
FIG. 35 is a perspective view of the image shifter.

Next, referring to FIGS. 34 and 35, illustrated is an element that includes a liquid crystal layer i5 and two transparent substrates that sandwich the liquid crystal layer i5 between them. A micro prism array is provided on one surface of one of the two transparent substrates so as to face the liquid crystal layer i5. More specifically, the image shifter of this embodiment is a liquid crystal cell in which a nematic liquid crystal layer i5 is sandwiched between a transparent substrate with the micro prism array i3, of which the surface is covered with a transparent electrode i1 and an alignment film i2, and another transparent substrate, of which the surface is covered with another transparent electrode i1 and another alignment film i2. The liquid crystal layer i5 has a homogeneous alignment state. That is to say, when a voltage is applied to the gap between the two transparent electrodes i1, the liquid crystal molecules are aligned vertically to the substrates as shown in FIG. 34. On the other hand, while no voltage is applied thereto, the liquid crystal molecules are aligned homogeneously as shown in FIG. 35. Suppose the refractive index of the liquid crystal layer i5 to which no voltage is being applied is $n_{e2}$, while the refractive index of the liquid crystal layer i5 to which a voltage is being applied is $n_{o2}$. In this embodiment, the micro prism array i3 is made of a material having a refractive index close to $n_{o2}$.

Thus, while no voltage is being applied thereto, a difference in refractive index is created between the liquid crystal layer and the micro prism array i3. Accordingly, a light ray that has been incident onto the micro prism array i3 is refracted in accordance with the Snell laws. On the other hand, while a voltage is being applied thereto, the difference in refractive index between the liquid crystal layer and the micro prism array i3 decreases inversely proportionally to the magnitude of the applied voltage. As the difference in refractive index decreases, the angle of refraction of the light ray that has been incident on the micro prism array i3 also decreases.

Supposing the apical angle of the micro prisms is $\theta_4$ and the refractive index of the micro prism array i3 is $n_2$, the angle $\delta$ of refraction of the light ray while no voltage is being applied to the liquid crystal layer i5 is given by $$\delta = (n_{e2} - n_2) \times \theta_4$$

It should be noted that a liquid crystal layer having great refractive index anisotropy is preferably used to increase the angle of refraction.

Figure 36:
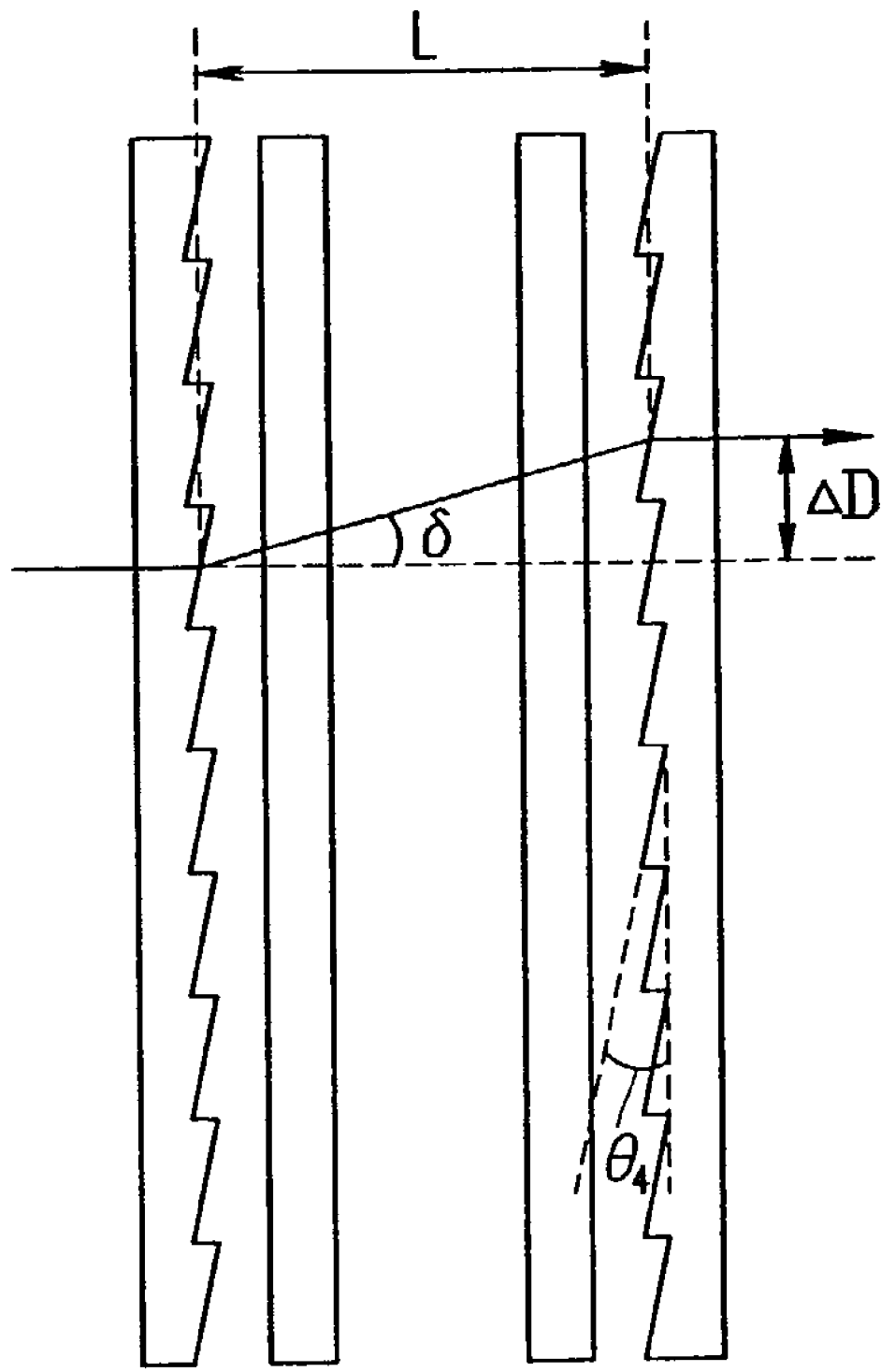
FIG. 36 is a cross-sectional view of an image shifter.

The image shifter of this embodiment is obtained by disposing two such elements as shown in FIG. 36. The amount of image shifting $\Delta D$ caused by this image shifter is given by $$\Delta D = L \cdot \tan \delta$$

where L is the distance between the two micro prism arrays.

In this embodiment, the glass plates have a thickness of 0.5 mm, the distance between the micro prism arrays is 1.0 mm, the apical angle $\theta_4$ of the micro prisms is 10 degrees, and a liquid crystal material BL-009 produced by Merck & Co., Inc. is used. In this case, the refractive index $n_{e2}$ is 1.82, the refractive index $n_{o2}$ is 1.53, and the shift amount $\Delta D$ is in the range of 0 µm to 50.7 µm. That is to say, the image shifter of this embodiment can shift the image by about two pixels.

A diffraction grating having a predetermined grating interval may be provided on the transparent substrate instead of the micro prism array i3. If an appropriate grating interval is selected according to the wavelength of the incoming light, the light can be diffracted at a desired angle of diffraction.

It should be noted that even in the simultaneous write method, if the response of the image display panel is delayed, the smearing or ghost phenomenon described above may be caused. Accordingly, by disposing a light cutoff device such as a liquid crystal shutter or a mechanical shutter on the optical path, the light going out of the image display panel is preferably cut off while the response of the image display panel is delayed.

Even the image shifter of this embodiment may be combined with an image display panel of the type switching the image subframes progressively on the screen if each electrode of the image shifter is divided into multiple parts and if a circuit for driving those divided parts one after another is provided. Then, the image shifter is applicable for use not only when the images are switched by the line scanning technique but also when the images are switched on a block (consisting of multiple rows or columns of pixels) basis.

Embodiment 11

Next, an exemplary system configuration for a projection type image display device according to the present invention will be described with reference to FIG. 37.

Figure 37:
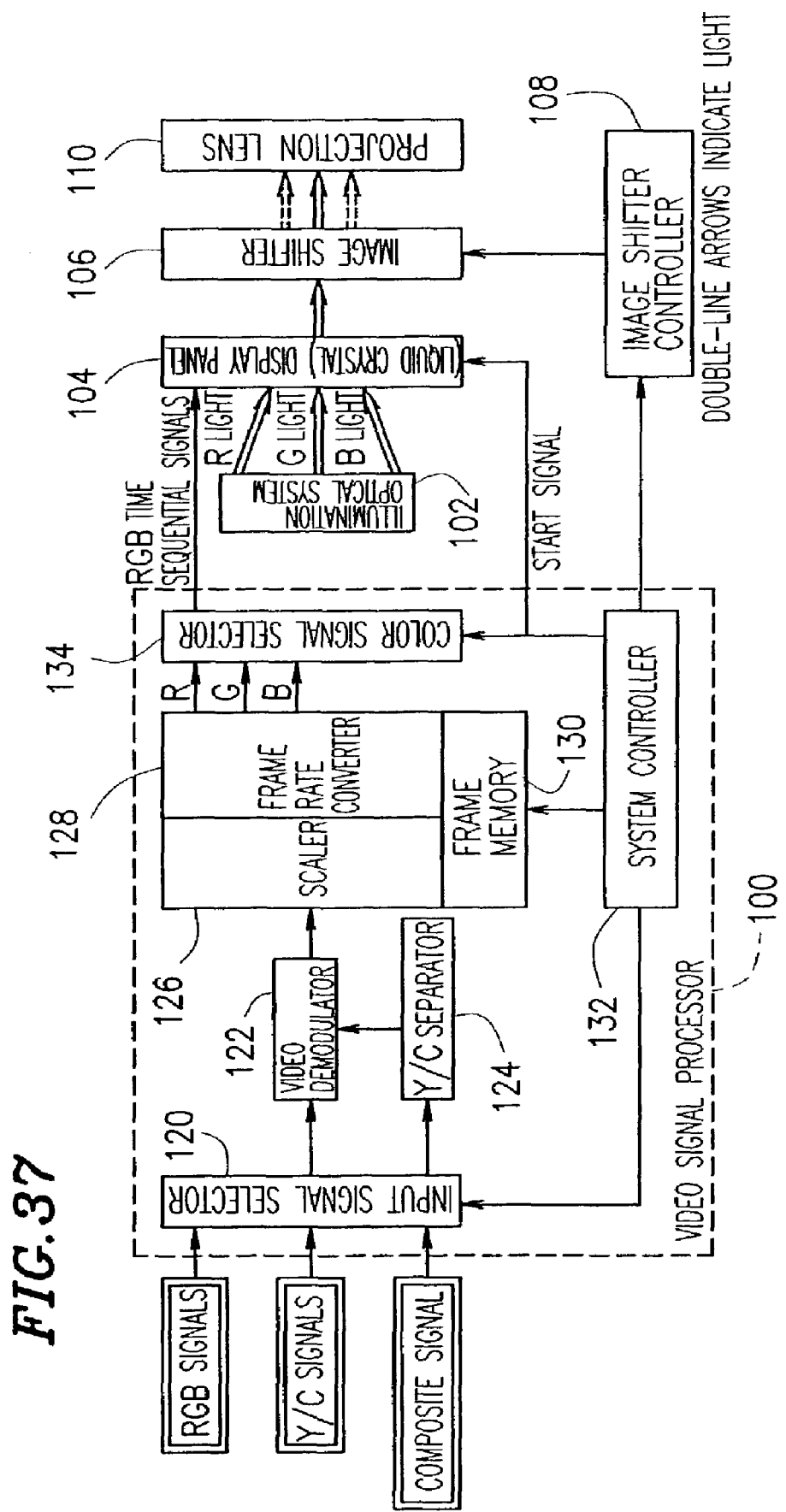
FIG. 37 is a block diagram showing an exemplary system configuration for a projection type image display device according to the present invention.

As shown in FIG. 37, this system includes a video signal processor 100, an illumination optical system (such as a light source) 102, an image display panel (e.g., an LCD panel) 104, an image shifter 106, an image shifter controller 108 and a projection lens 110 as its main components.

The illumination optical system 102, image display panel 104, image shifter 106 and projection lens 110 have already been described above. Thus, the following description of the relationship between these components will be mainly focused on the video signal processor 100 and the image shifter controller 108.

In this embodiment, the video signal processor 100 includes an input signal selector 120, a video demodulator 122, a Y/C separator 124, a scaler 126, a frame rate converter 128, a frame memory circuit 130, a system controller 132 and a color signal selector 134.

The input signal selector 120 can receive multiple types of video signals and processes those video signals depending on their types. Examples of those video signals include three separate R, G and B signals (i.e., RGB signals), three separate signals consisting of a luminance signal Y and color difference signals B-Y and R-Y (i.e., Y/C signals), and a composite (video) signal obtained by multiplexing the frequencies of a chrominance signal C and the luminance signal Y. The chrominance signal C is obtained by modulating a color carrier wave with the color difference signals.

The Y/C signals are demodulated by the video demodulator 122 by way of the input signal selector 120. The composite signal is passed through the input signal selector 120 and then separated into the luminance signal Y and the chrominance signal by the Y/C separator 124. Thereafter, the luminance and chrominance signals Y and C are supplied to, and demodulated by, the video demodulator 122. The video demodulator 122 outputs the RGB signals that have been demodulated from the video signals.

The RGB signals that have been input to the input signal selector 120 and the RGB signals that have been output from the video demodulator 122 are supplied to the scaler 126. The scaler 126 converts the number of pixels of each of these various input signals to the number of pixels of the image display panel 104. The frame rate converter 128 converts the frame rates of the input video signals into the best frame rate to operate this system properly.

The frame memory circuit 130 consists of three frame memories to store the R, G and B signals therein, respectively. The data that have been sequentially read out from these frame memories are selected in an appropriate order by the color signal selector 134, and then supplied to the driver circuit section of the image display panel 104. The image display panel 104 displays the image subframes thereon in accordance with the data that have been output from the color signal selector 134.

The system controller 132 controls the operations of the input signal selector 120, frame memory 130, color signal selector 134 and image shifter controller 108.

In response to the output signal of the system controller 132, the image shifter controller 108 controls the operation of the image shifter 106 such that the image shifter 106 operates synchronously with the display of an image subframe.

Next, it will be described with reference to FIGS. 38 and 39 how to read out data from the frame memories for the R, G and B signals.

The rate at which a signal is written on a frame memory (i.e., frequency $f_{in}$) is changeable with the type of the input signal, while the rate at which a signal is read out from the frame memory (i.e., frequency $f_{out}$) is defined by the clock frequency of this system. For example, the frequency $f_{in}$ may be 60 hertz (Hz) and the frequency $f_{out}$ may be 180 Hz.

In response to a control signal that has been output from the system controller 132, the R, G and B signals are read out from the R, G and B frame memories 130$a$, 130$b$ and 130$c$, respectively. These signals are read out at the rate $f_{out}$ as described above. In each frame period, the same read operation is repeatedly performed three times on each of these frame memories 130$a$ through 130$c$.

Figure 39:
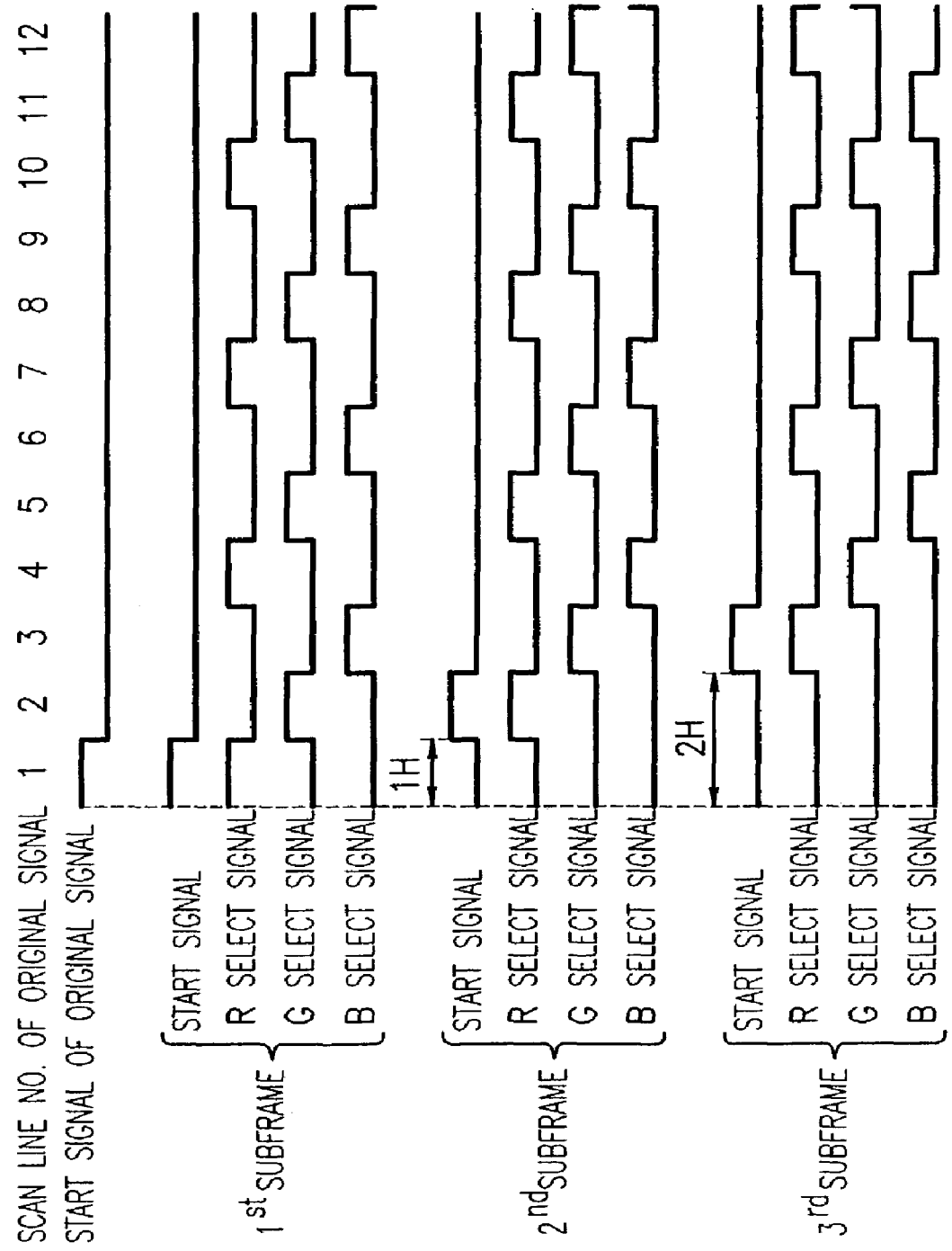
FIG. 39 is a timing chart showing how to generate image subframes.

Next, referring to FIG. 39, shown is a timing chart corresponding to the situation shown in FIG. 6 where three types of image subframes are formed. In FIG. 39, the numerals shown at the top indicate the scan line numbers of the original image frame.

In displaying the first image subframe on the image display panel, the data that are stored at the addresses associated with the scan line No. 1 are read out simultaneously from the respective frame memories 130a through 130c. A start signal is output at the same time, thereby starting a line scanning process on the image display panel 104. The data (i.e., the R, G and B signals) that have been read out from the respective frame memories 130a through 130c are transmitted to the color signal selector 134 shown in FIG. 38. In response, the color signal selector 134 selects only the R signal first, and then passes it to the image display panel 104. The color signal selector 134 includes R, G and B switching elements, which are turned ON responsive to R, G and B select signals, respectively. That is to say, only one of these switching elements, which has received a select signal in logically high state, transmits the input signal to the output section. In the example shown in FIG. 39, only the R signal is selected and supplied to the pixel regions on the first row of the image display panel 104 (i.e., the R pixel regions).

When one horizontal scanning period (i.e., 1H period) has passed, the R select signal will change into logically low state and only a G select signal will change into logically high state. Accordingly, among the data that have been stored at respective addresses associated with scan line No. 2 of the original image frame in the respective frame memories 130a through 130c, only the G signal is read out from the G frame memory and then transmitted to the image display panel 104 by way of the color signal selector 134. Based on this G signal, the pixel regions on the second row of the image display panel 104 (i.e., G pixel regions) are subjected to the display operation.

The data that will make up the first image subframe will be sequentially read out in the same way thereafter. As a result, the image subframe shown at the upper right corner of FIG. 6 will be displayed on the image display panel.

To display the second image subframe, the application timings of the start pulse signal and respective select signals are delayed for 1H period as shown in FIG. 39. Specifically, among the data associated with scan line No. 2 of the original image frame, the R signal that has been stored in the R frame memory is selected by the color signal selector 134. Then, based on this R signal, the pixel regions on the first row of the image display panel 104 (i.e., R pixel regions) are subjected to the display operation. Similar operations will be repeatedly performed thereafter, thereby displaying the second image subframe shown in FIG. 6 on the image display panel 104.

To display the third image subframe, the application timings of the start pulse signal and respective select signals are further delayed for 1H period. As a result, the third image subframe shown in FIG. 6 can be displayed.

Instead of shifting the application timing of the start signal subframe by subframe as described above, the addresses at which the respective frame memories start to be read may be alternated among multiple addresses corresponding to scan lines Nos. 1, 2 and 3.

In the example described above, the R, G and B pixel regions are arranged parallelly to the scan lines. It should be noted, however, that the present invention is not limited to such a system. Alternatively, the 1H period may be replaced with a dot clock period. Then, the present invention is also applicable for use in a system that is operated by using an RGB vertically striped image display panel in which the R, G and B pixel regions are arranged vertically to the scan lines.

Figure 38:
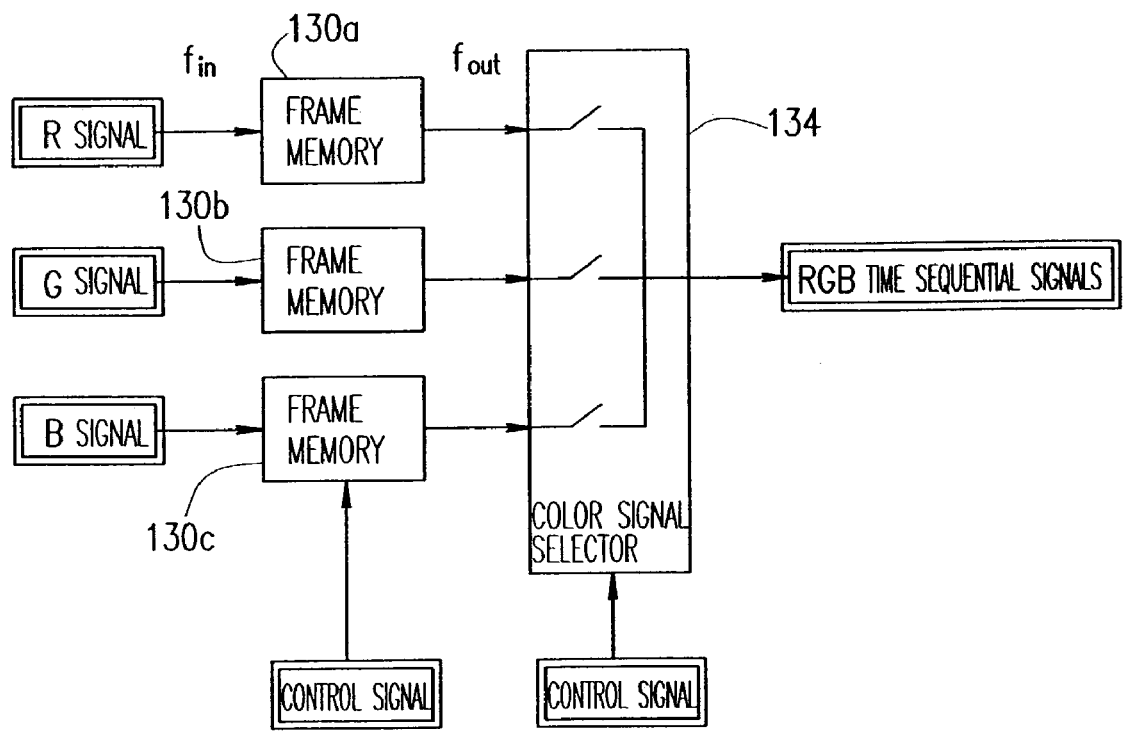
FIG. 38 is a diagram schematically showing a circuit configuration for generating image subframes.

The circuit shown in FIG. 38 includes no special frame memories to store the data representing image subframes therein. Optionally, such a frame memory may be provided to temporarily store the image subframes therein.

Embodiment 12

Figure 40:
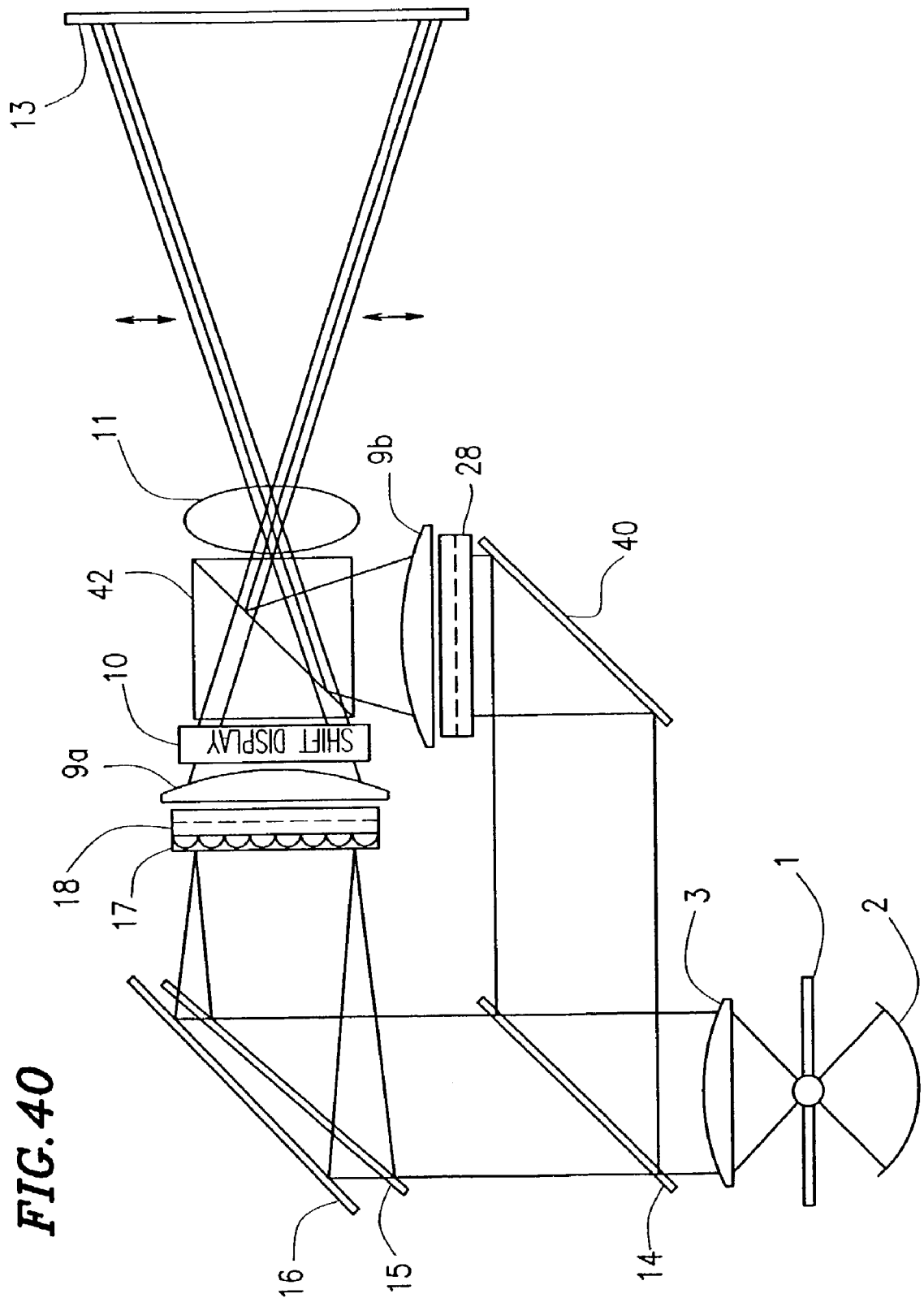
FIG. 40 is a diagram showing an embodiment of a projection type image display device that uses two image display panels.

Hereinafter, an embodiment of a projection type image display device including two image display panels will be described. As shown in FIG. 40, the projection type image display device of this embodiment includes a light source 1, an LCD panel 18, light control means, and a projection optical system. The light control means is provided to focus the light, emitted from the light source 1, onto associated pixel regions of the LCD panel 18 according to the wavelength ranges thereof. The projection optical system is provided to project the light rays, which have been modulated by the LCD panel 18, onto a projection plane. The device of this embodiment further includes another LCD panel 28. A light ray falling within a particular wavelength range is selected from the white light that has been emitted from the light source 1 and then incident onto the LCD panel 28.

This device further includes dichroic mirrors 14, 15 and 16. The light ray falling within the particular wavelength range is selectively reflected by the dichroic mirror 14, further reflected by a mirror 40, and then incident onto the LCD panel 28. On the other hand, the light rays that have been reflected by the dichroic mirrors 15 and 16 are incident onto a microlens array 17 on the LCD panel 18 at respective angles that change with the wavelength ranges thereof. Then, the light rays that have been incident onto the microlenses 17 at mutually different angles are focused onto their associated pixel regions that are located at respective positions.

The light rays that have been modulated by the first LCD panel 18 are transmitted through a field lens 9a, an image shifter 10, a polarization beam splitter (or dichroic prism) 42 and a projection lens 11 and then projected onto a screen 13. On the other hand, the light ray that has been modulated by the second LCD panel 28 is transmitted through a field lens 9b, the polarization beam splitter 42 and the projection lens 11 and then projected onto the screen 13.

In this embodiment, the light that has been modulated by the first image display panel 18 gets shifted by the image shifter 10 by a method similar to that already described for the other embodiments. On the first image display panel 18, two image subframes in the colors of R and B are displayed, for example, and the shift amount between the image subframes is defined to be approximately equal to one pixel pitch as measured in the shifting direction. The data representing each image subframe is obtained by combining together the data representing the R and B image frames as shown in portions (b) and (d) of FIG. 4 (i.e., R and B signals).

On the other hand, only an image in the color G is displayed on the second image display panel 28. This image may have a pattern such as that shown in portion (c) of FIG. 4, and reflects the color G data of all pixels of the image frame.

On the second image display panel 28, there is no need to display the image that has been divided into respective subframes. Accordingly, to strike an adequate color balance among the R, G and B light rays to irradiate the projection plane with, either the brightness or the display periods need to be compensated for between the first and second image display panels 18 and 28. For example, the image to be projected from the second image display panel 28 onto the screen may be displayed for only approximately one half frame period. Alternatively, the brightness thereof may be reduced instead.

In this embodiment, only two of the three colors R, G and B are displayed on the first image display panel 18, while the other color is displayed on the second image display panel 28. In the first image display panel 18, each of the microlenses splits the incoming light into two color rays and then focuses them onto their associated pixel regions Accordingly, the pitch and focal length of the microlenses 17 may be two-thirds as long as those of the single-panel microlenses 7.

Figure 41A:
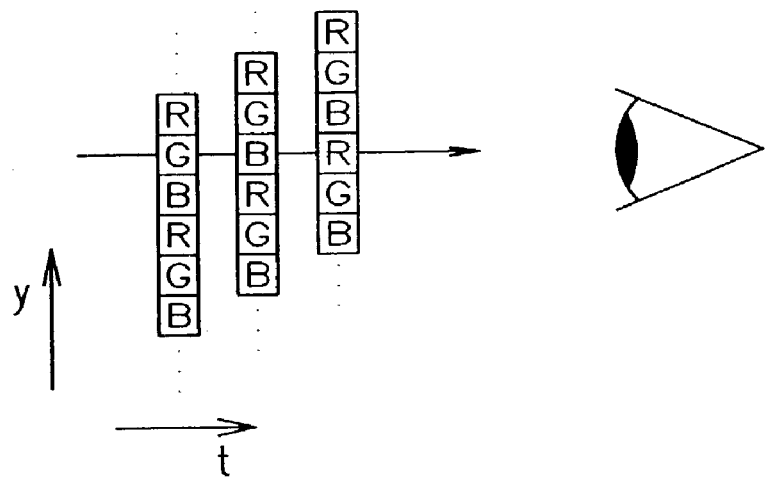
FIG. 41(a) illustrates image shifting in a situation where the viewer does not move his or her eyes.
Figure 41B:
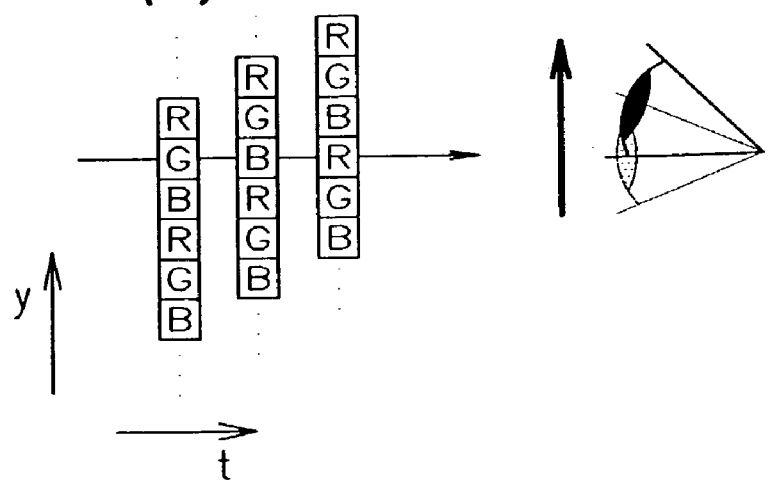
FIG. 41(b) illustrates image shifting in a situation where the viewer does move his or her eyes.
Figure 41C:
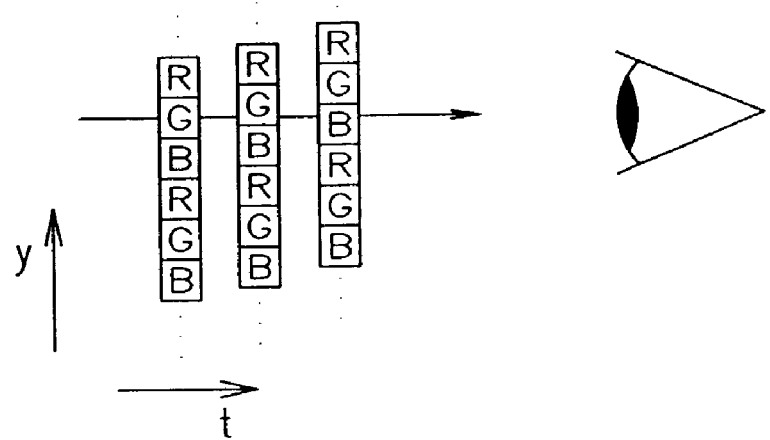
FIG. 41(c) illustrates how images being shifted look to the viewer who is moving his or her eyes.

As described above, according to the present invention, image subframes are shifted and superimposed time-sequentially to obtain an image frame. If the viewer's eyes are substantially fixed, then the R, G and B pixels are superimposed one upon the other appropriately as shown in FIG. 41(*a*). However, if the viewer's eyes move as the image subframes are shifted, then the image subframes are multiplexed time-sequentially on the viewer's retinas as if the image subframes had not been shifted sufficiently as shown in FIG. 41(*b*). If the moving rate of the eyes is close to the shifting rate of the image subframes, then it looks for the viewer as if the shifting rate of the image subframes had decreased as shown in FIG. 41(*c*). And if the eye moving rate is approximately equal to the image subframe shifting rate, then it looks as if the image subframes had not been shifted. As a result, the pixel arrangements on the image display panel are viewable and the resolution decreases to approximately equal to the number of pixel arrangements that make up the image display panel.

Such a phenomenon occurs when the eye moving direction and rate are approximately equal to the image subframe shifting direction and rate. Accordingly, if the shifting patterns of the image subframes are adjusted, then the effects of this phenomenon can be reduced. The effects of such reduction can be evaluated by analyzing the spatial frequency characteristic (i.e., frequency spectrum) of a two-dimensional pixel arrangement pattern in which columns of pixels, each being arranged in the shifting direction of the image subframes (e.g., y direction), are arranged along the time axis (i.e., t-axis). This two-dimensional pixel arrangement is obtained by representing the shifting pattern of subframes, which move up and down along the y-axis, in a y-t space, of which the axis of ordinates is y-axis and the axis of abscissas is time axis (i.e., t-axis). To analyze the motion pattern of image subframes that are shifted in the y-axis direction on the projection plane, it is effective to perform a two-dimensional Fourier transform on the pixel arrangement in the y-t space and thereby evaluate the spectrum with respect to the spatial frequencies in the y-axis and t-axis directions. The pixel arrangement in the y-t space has a pattern in which pixels are arranged regularly at the respective lattice points. Accordingly, the frequency spectrum thereof can be substantially represented as localized points in the Fourier space (i.e., fy-ft space).

Figure 42A:
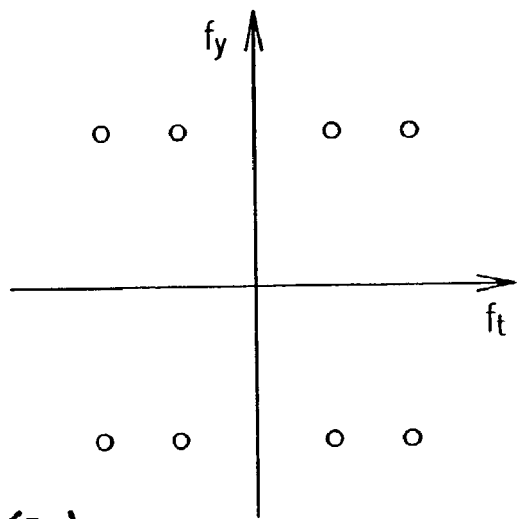
FIGS. 42(a) through 42(c) are graphs each showing the localized points of a frequency spectrum that is obtained by subjecting a pixel arrangement (or shifting pattern) in the y-t space to a Fourier transform.
Figure 42B:
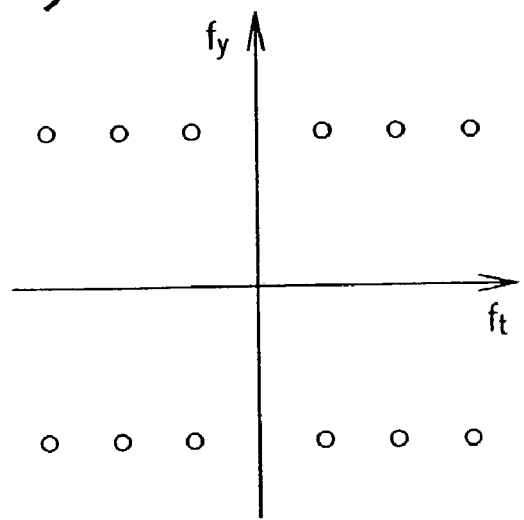
Figure 42C:
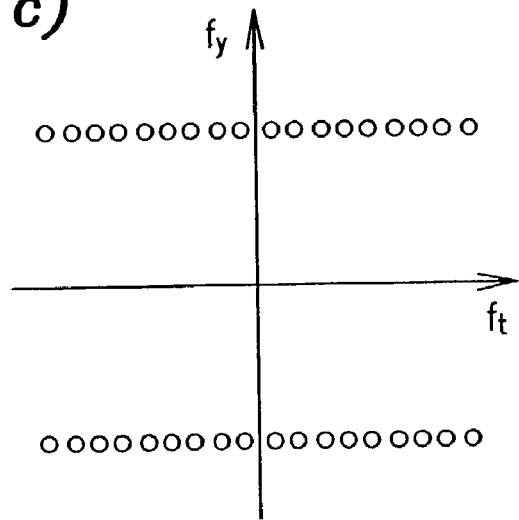

For example, a spectrum obtained by subjecting the pixel arrangement in the y-t space shown in FIG. 15 to a Fourier transform is shown in FIG. 42(*a*). In FIG. 42(*a*), the respective localized points indicated by the open circles ○ represent the spatial frequency of the pixel arrangement in the y-t space.

In a situation where image subframes are shifted according to a relatively simple pattern such as that shown in FIG. 15, when the eyes move toward a particular direction at a particular rate, the above-described phenomenon happens suddenly. To avoid this phenomenon, the image subframes need to be shifted in a more complicated pattern so as to get the spatial frequency dispersed as multiple components. More specifically, the spatial frequency of a zigzag pixel arrangement, including alternately a portion in which red (R) pixels are upwardly arranged to the right and a portion in which R pixels are downwardly arranged to the right, is more dispersed in the y-t space than that of a pixel arrangement in which R pixels are arranged in line upwardly to the right. For that reason, the former arrangement is preferred to the latter arrangement. When the spatial frequency of a pixel arrangement is dispersed in the y-t space, the localized points of a spectrum are also dispersed in the Fourier space.

Accordingly, if the pattern of a pixel arrangement in the y-t space is determined such that the localized points are more dispersed in the Fourier space (i.e., fy-ft space), then the unwanted phenomenon happening at a particular eye moving rate can be suppressed more easily.

Also, if the pattern of a pixel arrangement in the y-t space is determined such that the localized points are symmetrically arranged with respect to the fy axis in the Fourier space, then the unwanted phenomenon happening in a particular eye moving direction can also be suppressed more easily.

Furthermore, if the pattern of a pixel arrangement in the y-t space is determined such that a largest possible number of localized points are located within a range satisfying fy<ft in the Fourier space, then the unwanted phenomenon less likely happens at relatively low eye moving rates.

Figure 43:
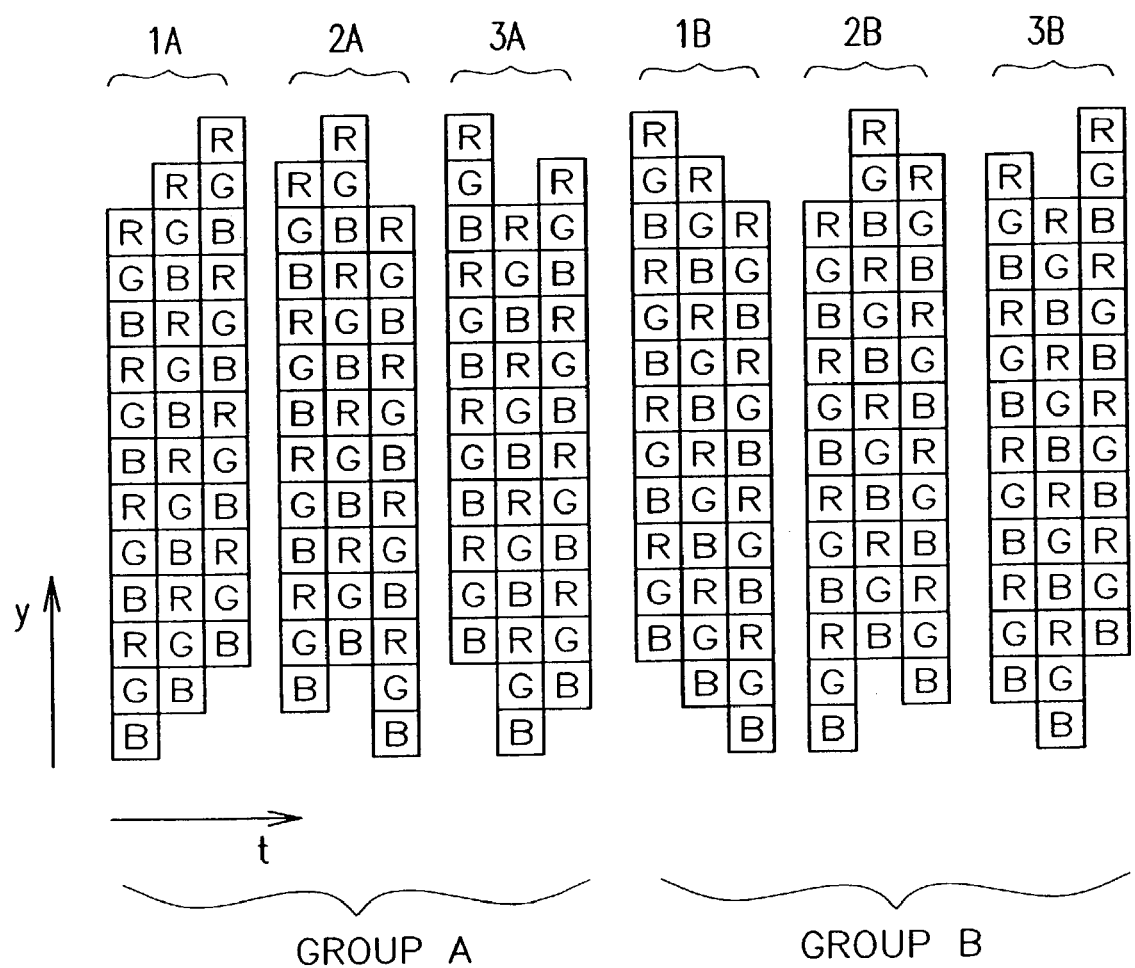
FIG. 43 shows six types of subsets 1A through 3A and 1B through 3B that can make up an image subframe shifting pattern.

According to the present invention, a pixel in a desired color is formed by superimposing three R, G and B pixels one upon the other time-sequentially. Thus, an image is formed as a combination of three image subframes that have been shifted relative to each other. FIG. 43 illustrates six types of subsets 1A through 3A and 1B through 3B, each being made up of three subframes. Each and every shifting pattern that can be adopted in the present invention is obtained by combining some of the six types of subsets shown in FIG. 43. These six types of subsets are classified into Group A consisting of the subsets 1A through 3A and Group B consisting of the subsets 1B through 3B. The shifting direction(s) of each subset belonging to Group A is/are opposite to that or those of its associated subset belonging to Group B. That is to say, the former and latter subsets are symmetrical to each other. For example, in the subset 1A, the image subframes are shifted pixel by pixel in the +y direction. In the subset 1B on the other hand, the image subframes are shifted pixel by pixel in the y direction. In the same way, the subset 2A is symmetrical to the subset 2B, and the subset 3A is symmetrical to the subset 3B.

In the embodiments to be described below, these subsets are appropriately combined with each other, thereby forming a shifting pattern and minimizing the degradation in display quality due to the eye movement of the viewer.

It should be noted that the effects of the unwanted phenomenon resulting from the eye movement can also be reduced by modifying the pixel arrangement of the image display panel. That is to say, this phenomenon is most noticeable when the image subframe shifting completely matches the eye movement. In that case, the actual pixel arrangement on the image display panel is viewed by the viewer. Accordingly, the pixel arrangement on the image display panel (in the x-y space) may be subjected to a Fourier transform and estimated in a Fourier space. More specifically, while satisfying a condition that three R, G and B pixels be arranged in line in the shifting direction, a pixel arrangement (in the x-y space) is preferably selected such that localized points are located as distant from the origin as possible in the Fourier space of the pixel arrangement (x-y space). If such a pixel arrangement (x-y space) is selected, the color-by-color spatial resolution can be increased.

Hereinafter, embodiments, in which the shifting patterns of image subframes are modified into more preferable ones in view of these considerations, will be described.

Embodiment 13

A projection type image display device according to this embodiment basically has the same configuration as the counterpart of the first embodiment described above. The main difference between this and first embodiments is that a particular image subframe shifting pattern is adopted in this embodiment so as to minimize the phenomenon described above. Thus, only this difference will be described below.

Figure 44:
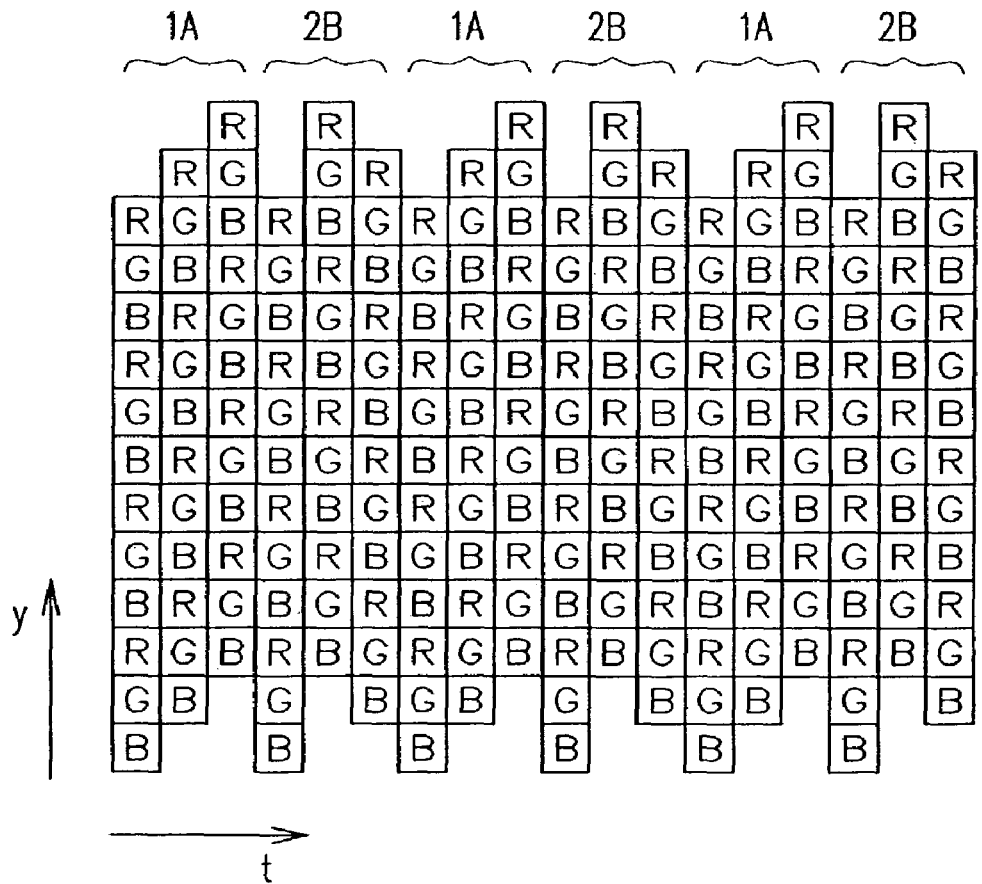
FIG. 44 shows an image subframe shifting pattern that is made up of six image subframes (consisting of subsets 1A and 2B) per period.

In the first embodiment described above, the $n+1^{st}$ image frame (where n is a positive integer) is made up of three image subframes, which are shifted in the same direction as the image subframes that make up the $n^{th}$ image frame as shown in FIG. 12. On the other hand, in this thirteenth embodiment, the image subframe shifting pattern consists of six image subframes (consisting of subsets 1A and 2B) per period as shown in FIG. 44. By combining the subsets 1A and 2B as shown in FIG. 44, the shifting pattern involves two-pixel shifting twice (in the +y direction and −y direction, respectively) per period. The shifting pattern shown in FIG. 44 has spectral localized points shown in FIG. 42(b) in its corresponding Fourier space. Comparing the spectrum shown in FIG. 42(b) with that shown in FIG. 42(a), it can be seen that the localized points shown in FIG. 42(b) are more dispersed although the shifting pattern is made up of the same number of subframes per period. Consequently, in this embodiment, the unwanted phenomenon described above even less likely happens in the particular eye moving direction or at the particular eye moving rate as compared to the first embodiment. In addition, one period is made up of six subframes. Thus, one period is relatively short and the image shifter may have a relatively simple configuration.

According to the image subframe shifting pattern for use in this embodiment, one frame may also be made up of two or three subframes.

Figure 45:
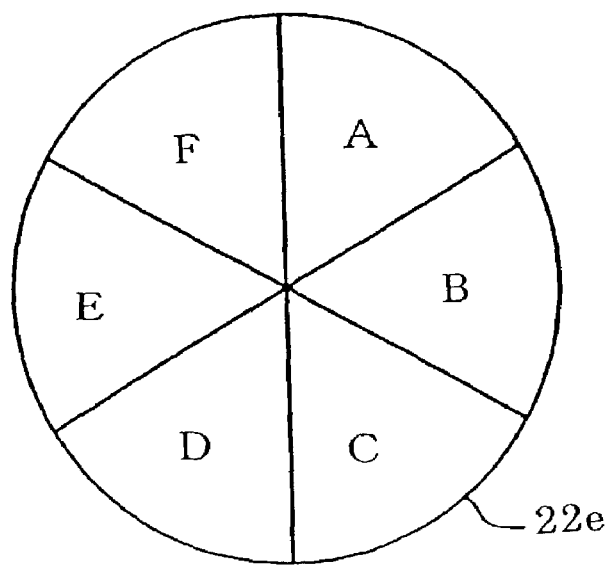
FIG. 45 illustrates a rotational plate implemented as an image shifter that realizes the shifting pattern shown in FIG. 44.

An exemplary image shifter for use to carry out such image shifting is shown in FIG. 45. This image shifter includes a glass plate 22e having transparent regions A through F. The transparent regions A and D are made of FK5 glass having a refractive index of 1.49, the transparent regions B and F are made of BaK4 glass having a refractive index of 1.57 and the transparent regions C and E are made of SF2 glass having a refractive index of 1.64. Each of these transparent regions may have a thickness of 2.0 mm.

The disklike glass plate 22e having such a configuration is disposed such that the principal surface thereof defines an angle of 65 degrees with the optical axis. Also, the glass plate 22e is rotated such that the timing at which each transparent region crosses the optical path is synchronized with the timing at which the previous subframe is switched into its associated subframe. Then, the optical path that crosses the transparent region B or F shifts by 34.0 μm from the optical path that crossed the transparent region A or D.

The optical path that crosses the transparent region C or E shifts by 26.6 μm from the optical path that crossed the transparent region B or F.

Suppose the transparent region A is associated with the first subframe shown in FIG. 44. In that case, the transparent region B is associated with the next subframe and the following transparent regions C and so on are associated with the following subframes.

In this embodiment, a time lag may also be caused between the image shifting timing and the subframe switching timing due to the delayed response of the image display panel, for example. For that reason, opaque regions 21 are also preferably provided for appropriate portions of the glass plate 22 as shown in FIG. 17. Specifically, in the example illustrated in FIG. 17, each of the opaque regions 21 may be provided in the boundary of two regions, between which image shifting should be carried out (i.e., at both ends of the transparent region A or D).

It is naturally possible to adopt the image shifter as described for any of the other embodiments.

Figure 46:
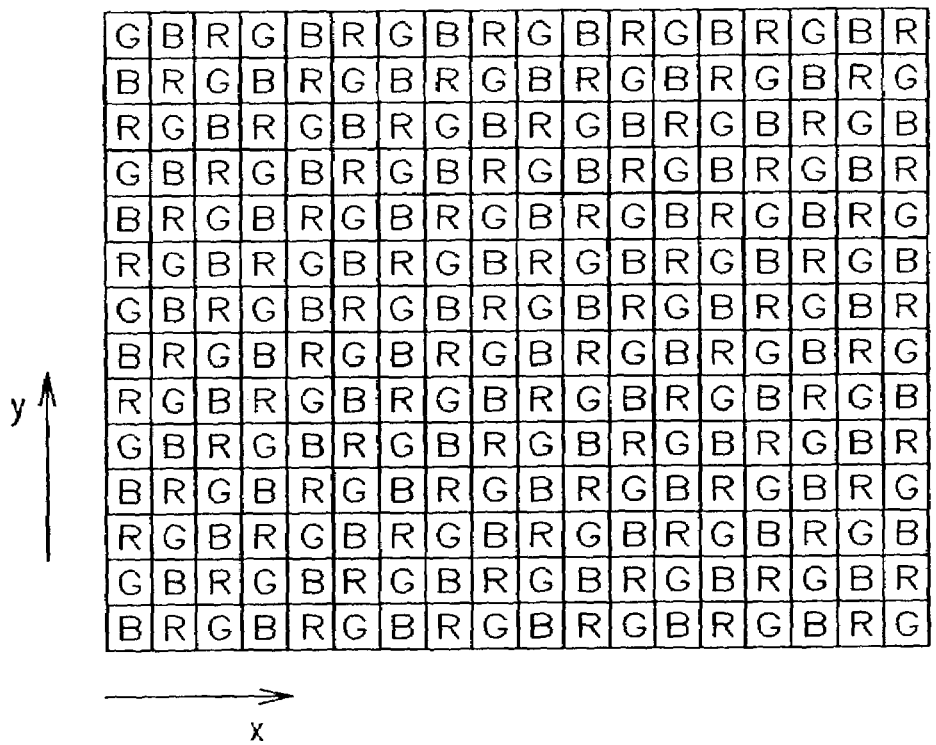
FIG. 46 shows an exemplary pixel arrangement for an image display panel for use in an embodiment of the present invention.
Figure 47:
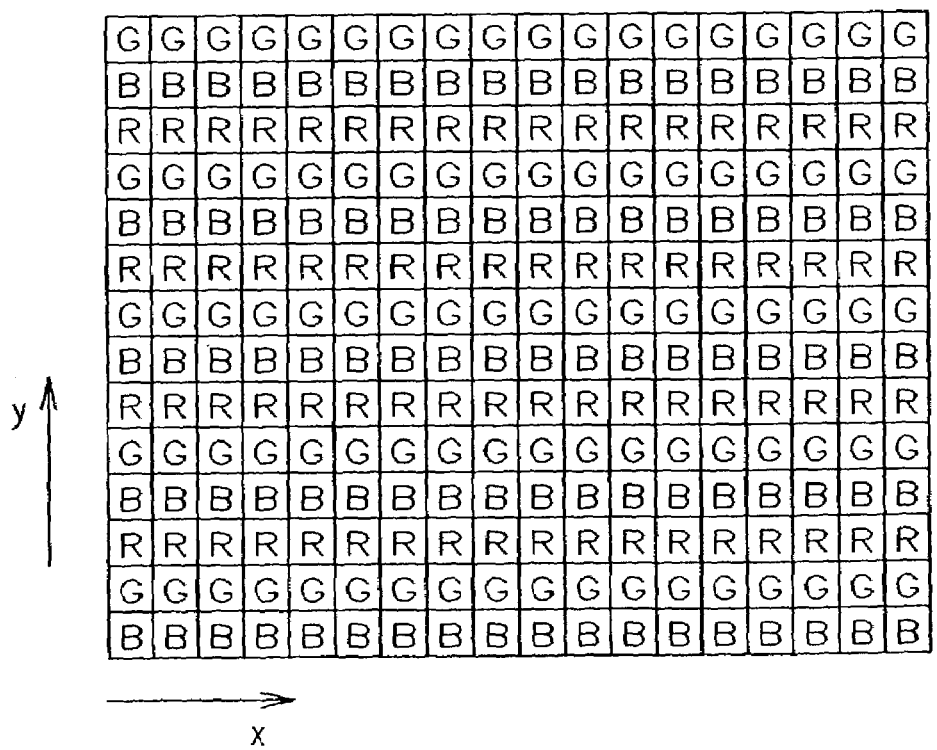
FIG. 47 shows another exemplary pixel arrangement for the image display panel.
Figure 48A:
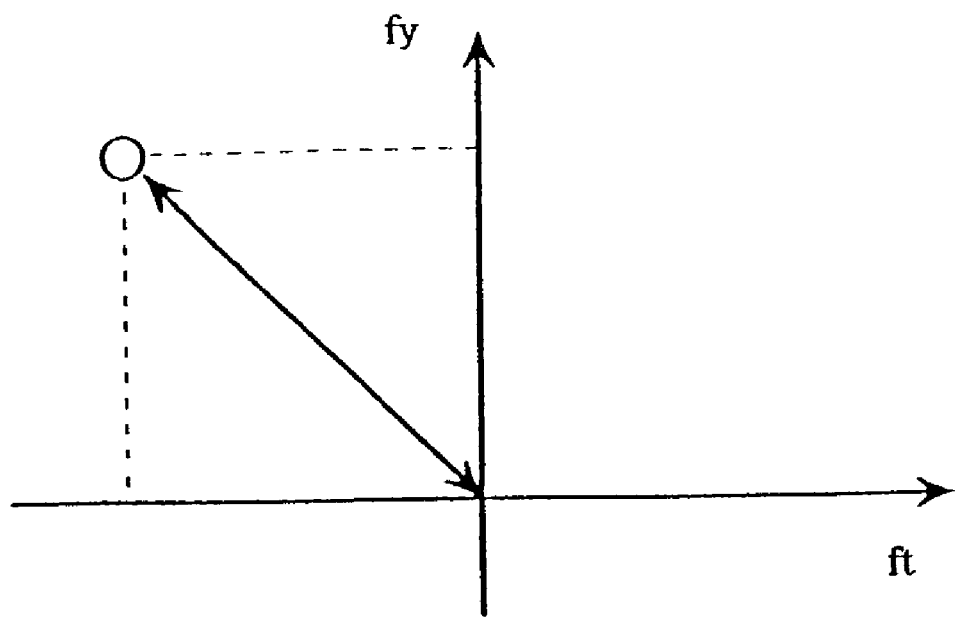
Figure 48B:
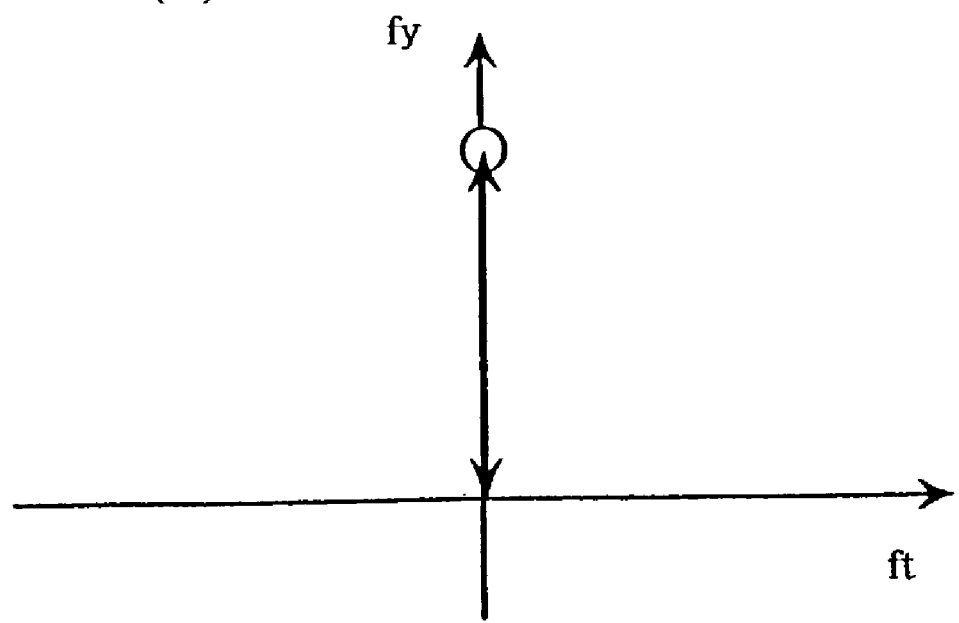
FIG. 48(b) is a graph showing a localized point of a frequency spectrum in a Fourier space corresponding to the pixel arrangement shown in FIG. 47.

In this embodiment, the image display panel has a pixel arrangement such as that shown in FIG. 46. The Fourier spaces corresponding to the pixel arrangements shown in FIGS. 47 and 46 are shown in FIGS. 48(a) and 48(b), respectively. It can be seen that the localized point is more distant from the origin in FIG. 48(a) than in FIG. 48(b). This means that the gap between two lines, each connecting pixels in the same color together, is narrower in FIG. 46 than in FIG. 47. That is to say, the color-by-color spatial frequency is higher in FIG. 46 than in FIG. 47. As can be seen from the foregoing description, by adopting the pixel arrangement shown in FIG. 46, even if the pixel arrangement on the image display panel is recognized due to substantial match between the eye movement and image subframe shifting, the image quality is affected to a much lesser degree.

The projection type image display device according to the embodiment described above generates three image subframes in each frame period by using an image display panel with no color filters, and synthesizes those subframes together while optically shifting them from each other. Thus, compared to the conventional single-panel projection type image display device using color filters, the optical efficiency can be increased significantly and the resolution can be increased threefold. It is naturally possible to generate two image subframes in each frame period and synthesize them together while optically shifting them from each other. In that case, some non-smoothness will be produced in a motion picture displayed but the subframes are switched at a low rate. Thus, the response of the liquid crystal material is sufficient and a higher transmittance is achieved.

Embodiment 14

A projection type image display device according to this embodiment basically has the same configuration as the counterpart of the thirteenth embodiment described above. The main difference between this and thirteenth embodiments lies in the image subframe shifting pattern. Thus, only this difference will be described below.

Figure 49:
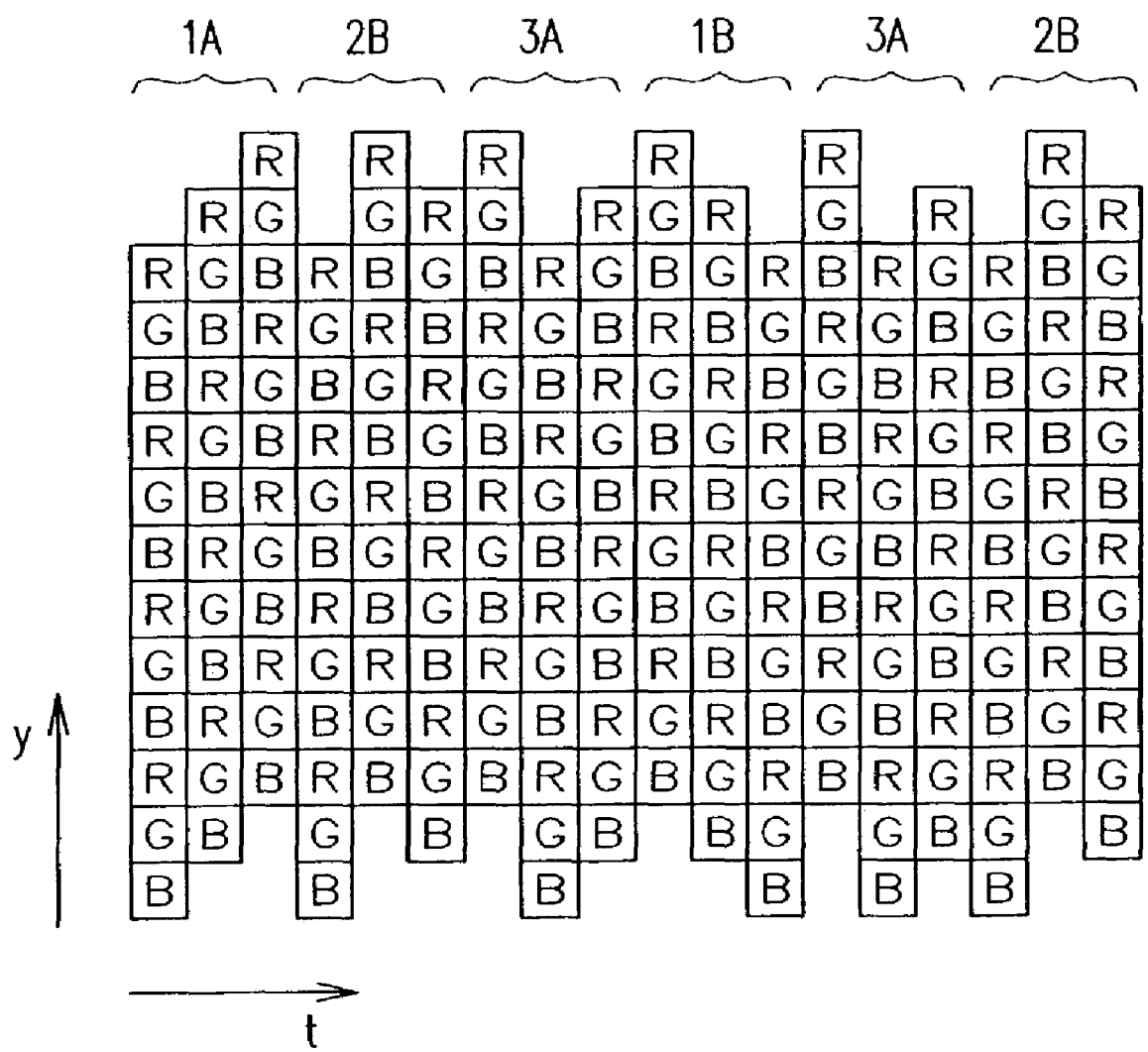
FIG. 49 shows an image subframe shifting pattern that is made up of eighteen image subframes (consisting of six subsets) per period.

In the thirteenth embodiment described above, the image subframe shifting pattern is made up of six image subframes (consisting of the subsets 1A and 2B) per period as shown in FIG. 44. On the other hand, in this fourteenth embodiment, the image subframe shifting pattern is made up of eighteen image subframes (consisting of six subsets) per period as shown in FIG. 49. In this embodiment, the subsets 1A and 3A are selected from Group A of subsets, the subsets 1B and 2B are selected from Group B of subsets, and subsets belonging to these Groups A and B are alternately arranged. The alternate arrangement of subsets belonging to Groups A and B means that shifting in the +y direction and shifting in the −y direction are alternately carried out approximately the same number of times. Accordingly, even if the viewer moves his or her eyes toward one direction, the possibility of matching between the eye moving direction and the image shifting direction is halved. Also, even when those directions match each other, the matching state never lasts more than three subframe periods.

The Fourier space corresponding to the shifting pattern shown in FIG. 49 is shown in FIG. 42(*c*). It can be seen that the localized points shown in FIG. 42(*c*) are even more dispersed than those shown in FIG. 42(*b*). Thus, in this embodiment, the unwanted phenomenon described above even less likely happens at the particular eye moving rate.

It should be noted that where 60 image frames are displayed per second and one frame is made up of three subframes, one subframe period is $\frac{1}{180}$ second. In this embodiment, the shifting pattern is made up of eighteen subframes per period. Accordingly, one period of the shifting pattern is $\frac{1}{180}$ second×18=$\frac{1}{10}$ second. Even when the shifting patterns were repeated at 10 Hz, the influence on the image displayed was not recognizable to the human eyes. It is not impossible to make up a shifting pattern of more than eighteen subframes per period. However, if one period is too long, then the periodic variation of the shifting pattern could be recognized to the human eyes and the display quality might deteriorate. For that reason, a shifting pattern is preferably made up of no greater than eighteen subframes per period.

According to the image subframe shifting pattern for use in this embodiment, one frame may be made up of either two subframes or three subframes.

Figure 50:
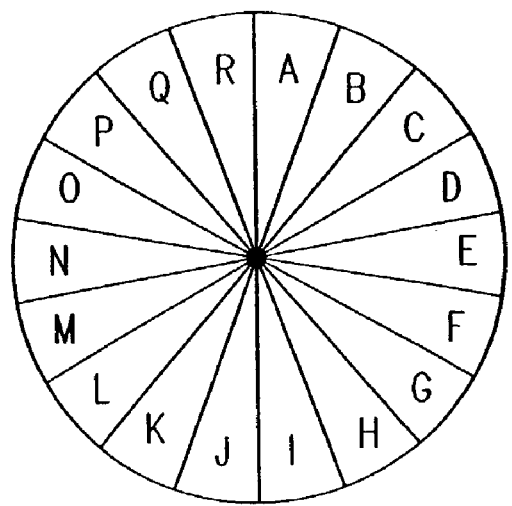
FIG. 50 illustrates a rotational plate implemented as an image shifter that realizes the shifting pattern shown in FIG. 49.

An exemplary image shifter to be preferably used in this embodiment is shown in FIG. 50.

This image shifter includes a glass plate 22*k* having transparent regions A through R. The transparent regions A, D, H, L, N and P are made of FK5 glass having a refractive index of 1.49, the transparent regions B, F, I, K, O and R are made of BaK4 glass having a refractive index of 1.57 and the transparent regions C, E, G, J, M and Q are made of SF2 glass having a refractive index of 1.64. Each of these transparent regions may have a thickness of 2.0 mm.

The disklike glass plate 22*k* having such a configuration is disposed such that the principal surface thereof defines an angle of 65 degrees with the optical axis. Also, the glass plate 22*k* is rotated such that the timing at which each transparent region crosses the optical path is synchronized with the timing at which the previous subframe is switched into its associated subframe. Then, the optical path that crosses the transparent region B, F, I, K, O or R shifts by 34.0 μm from the optical path that crossed the transparent region A, D, H, L, N or P. The optical path that crosses the transparent region C, E, G, J, M or Q shifts by 26.6 μm from the optical path that crossed the transparent region B, F, I, K, O or R.

Suppose the transparent region A is associated with the first subframe shown in FIG. 49. In that case, the transparent region B is associated with the next subframe and the following transparent regions C and so on are associated with the following subframes.

MODIFIED EXAMPLE 1 OF IMAGE SHIFTER

Next, a modified example of the image shifter will be described.

As described above, the image shifter including a liquid crystal layer is applicable for use in both an image display panel of a simultaneous write type and an image display panel of a line scanning type. However, since the image shifter includes the liquid crystal layer, the response characteristic (or response speed) of liquid crystal molecules to an applied voltage changes depending on whether the voltage is in ON state or in OFF state. Accordingly, this difference in response speed affects the response characteristic of the image shifter. That is to say, the time lag between the image subframe switching timing and the image shifting timing changes with the shifting direction, thus deteriorating the image quality.

Figure 51:
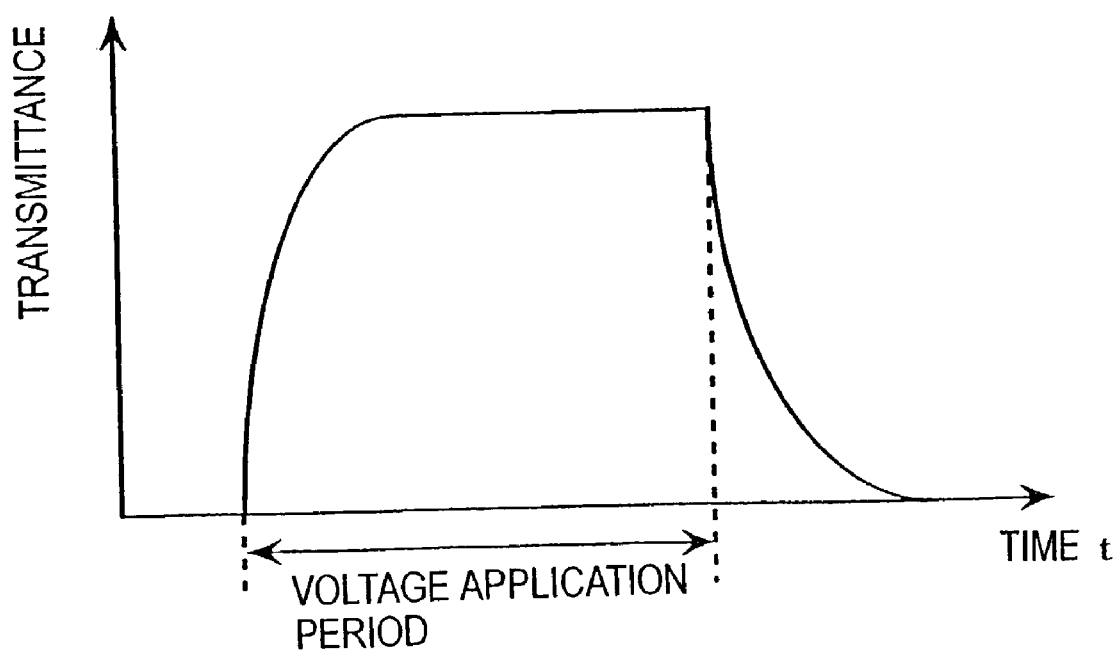
FIG. 51 is a graph showing a response curve of a liquid crystal layer for use in an image shifter.

When the transmittance of a liquid crystal layer to an applied voltage is measured with the liquid crystal layer sandwiched between a pair of parallel Nicol polarizers, the response speed of the liquid crystal layer in ON state is different from that of the liquid crystal layer in OFF state as shown in FIG. 51. Thus, when an image subframe is shifted from a location on the projection plane to another, the time it takes for the liquid crystal layer to change from the ON state into the OFF state is different from the time it takes for the same liquid crystal layer to change from the OFF state into the ON state.

Figure 52:
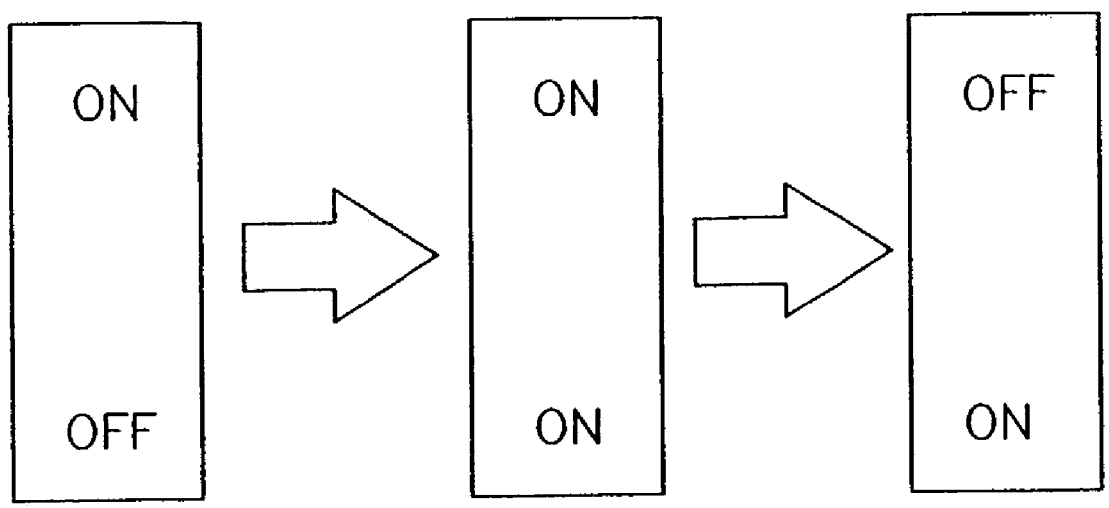
FIG. 52 shows a transitional phenomenon occurring when image shifting is carried out with two pairs of image shifters arranged in series on the optical path.

Suppose that two image shifters are arranged in series to carry out image shifting and that the voltage applied to one of the two liquid crystal layers on the light incoming side is switched from OFF into ON while the voltage applied to the other liquid crystal layer on the light outgoing side is switched from ON into OFF. In that case, the state transition of the liquid crystal layer on the light outgoing side is slower than that of the liquid crystal layer on the light incoming side. Accordingly, even if the liquid crystal layer on the light incoming side has been completely turned ON at a point in time, the liquid crystal layer on the light outgoing side still may not have been completely switched OFF at that point in time. FIG. 52 schematically illustrates such a situation. In FIG. 52, the arrows indicate the passage of time and respective ON/OFF pairs show how the states of the liquid crystal layers on the light incoming side (shown at the bottom of rectangles) and on the light outgoing side (shown at the top of rectangles) change. As shown in FIG. 52, there is a time period in which these two liquid crystal layers are both in ON state due to the response characteristic of the liquid crystal molecules. If these two liquid crystal layers are both ON albeit temporarily, then a double or triple image is displayed only during that period, thus deteriorating the image quality significantly.

Accordingly, if two or more liquid crystal layers are used and if one of three different locations is selected by changing the voltage application states of those liquid crystal layers, then the image shifter should be driven in such a manner as to avoid the deterioration of image quality even if the ON to OFF transition is delayed temporarily.

Hereinafter, an image shifter driving method that has been modified to avoid the problem described above will be described.

Embodiment 15

Figure 53:
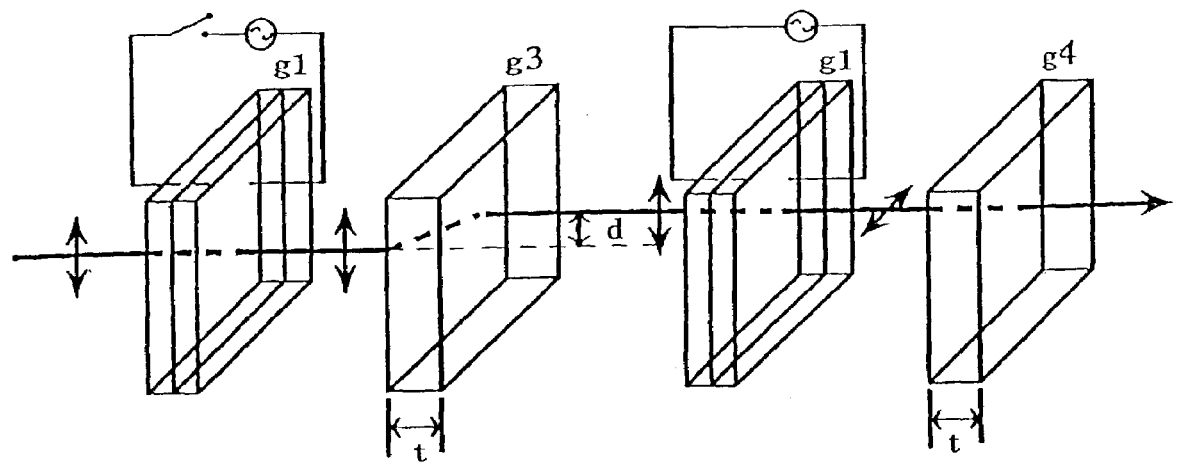
FIG. 53 is a perspective view illustrating an exemplary arrangement of an image shifter.

The image shifter of this embodiment is obtained by preparing two pairs of elements such as those shown in FIG. 32 (or FIG. 33) and arranging those two pairs of elements in series on the optical path as shown in FIG. 53. Specifically, in this embodiment, the image shifter is formed by using crystal plates g3 and g4 having birefringence. By using this image shifter, one of three different locations on the projection plane can be selected according to the voltage application states of the two liquid crystal layers on the light incoming and outgoing sides on the optical path. One of the three different locations is selected according to a particular combination of the voltage application state (i.e., ON or OFF) of the first liquid crystal layer on the light incoming side and the voltage application state (i.e., ON or OFF) of the second liquid crystal layer on the light outgoing side.

FIG. 55 schematically shows how the states of the liquid crystal layers on the light incoming and outgoing sides change with the voltages applied. For example, there are two possible states depending on whether or not a voltage is applied to the liquid crystal layer on the light incoming side. Each of these two different states further branches into two according to the voltage application state of the liquid crystal layer on the light outgoing side.

In this case, the direction of polarization plane of the light that is going to enter the liquid crystal layer on the light outgoing side changes 90 degrees depending on the voltage application state of the liquid crystal layer on the light incoming side. Accordingly, depending on whether or not the voltage is applied to the liquid crystal layer on the light incoming side, the state transition of the liquid crystal layer on the light outgoing side responsive to the voltage applied becomes one of two opposite ones. Thus, there are two possible sets of state transitions according to the particular combination of voltage application states of the liquid crystal layers on the light incoming and outgoing sides as shown in FIG. 55.

These two sets of combinations will be herein referred to as "Type A" and "Type B", respectively, and the three different locations of image subframes will be herein identified by States A, B and C, respectively. Furthermore, to represent the voltage application states of the two liquid crystal layers, a situation where the voltage application state of the liquid crystal layer on the light incoming side is ON and that of the liquid crystal layer on the light outgoing side is OFF will be herein denoted by "ON•OFF", for example.

In that case, according to Type A, "OFF•ON" results in State A, "OFF•OFF" and "ON•OFF" result in State B, and "ON•ON" results in State C. According to Type B on the other hand, "OFF•OFF" results in State A, "OFF•ON" and "ON•ON" result in State B, and "ON•OFF" results in State C. It should be noted that each of these States A, B and C may be associated with any of the three different locations on the projection plane.

Suppose a transition occurs between States A and B in Type A and a transition occurs between States B and C in Type B. More specifically, the transition is supposed to occur between State A defined by "OFF•ON" and State B defined by "ON•OFF" in Type A, while the transition is supposed to occur between State B defined by "OFF•ON" and State C defined by "ON•OFF" in Type B.

In that case, due to the response characteristic of liquid crystal molecules as already described with reference to FIGS. 51 and 52, a state in which voltages are temporarily applied to both liquid crystal layers (i.e., "ON•ON" state) exists in Type A while the transition is occurring between States A and B. In the same way, a similar state in which voltages are temporarily applied to both liquid crystal layers (i.e., "ON•ON" state) also exists in Type B while the transition is occurring between States B and C. The "ON•ON" state defines State C in Type A and State B in Type B, respectively, as indicated by bold arrows in FIG. 56. Accordingly, in Type A, an image subframe in State C, which is neither State A nor State B, is temporarily displayed while the transition is occurring between States A and B. As a result, the image quality deteriorates. In Type B on the other hand, an image subframe in State B is temporarily displayed while the transition is occurring between States B and C. This slightly delays the transition between States B and C but does not cause the display of an image subframe in a different state.

To avoid such a problem with Type A, State B is preferably defined by "OFF•OFF" while the transition should occur from State A into State B or from State B into State A. Then, State C should not be created temporarily.

Next, suppose the transition should occur from State C into State B. This state transition may be either a transition from "ON•ON" into "ON•OFF" or a transition from "ON•ON" into "OFF•OFF". Considering the difference in response characteristic between the two liquid crystal layers, normally it is preferable to change the voltage application state of only one of the two liquid crystal layers. Accordingly, the transition from "ON•ON" into "ON•OFF" is preferably selected. However, if State B is defined by "ON•OFF", then the above problem happens during a transition from State B into State A. For that reason, if the transition from State C into State B is followed by a transition into State A, then State B is preferably defined by "OFF•OFF". On the other hand, if the transition from State C into State B is followed by a transition into State C, then State B is preferably defined by "ON•OFF". In this manner, the deterioration of image quality during the transition can be minimized.

Figure 56:
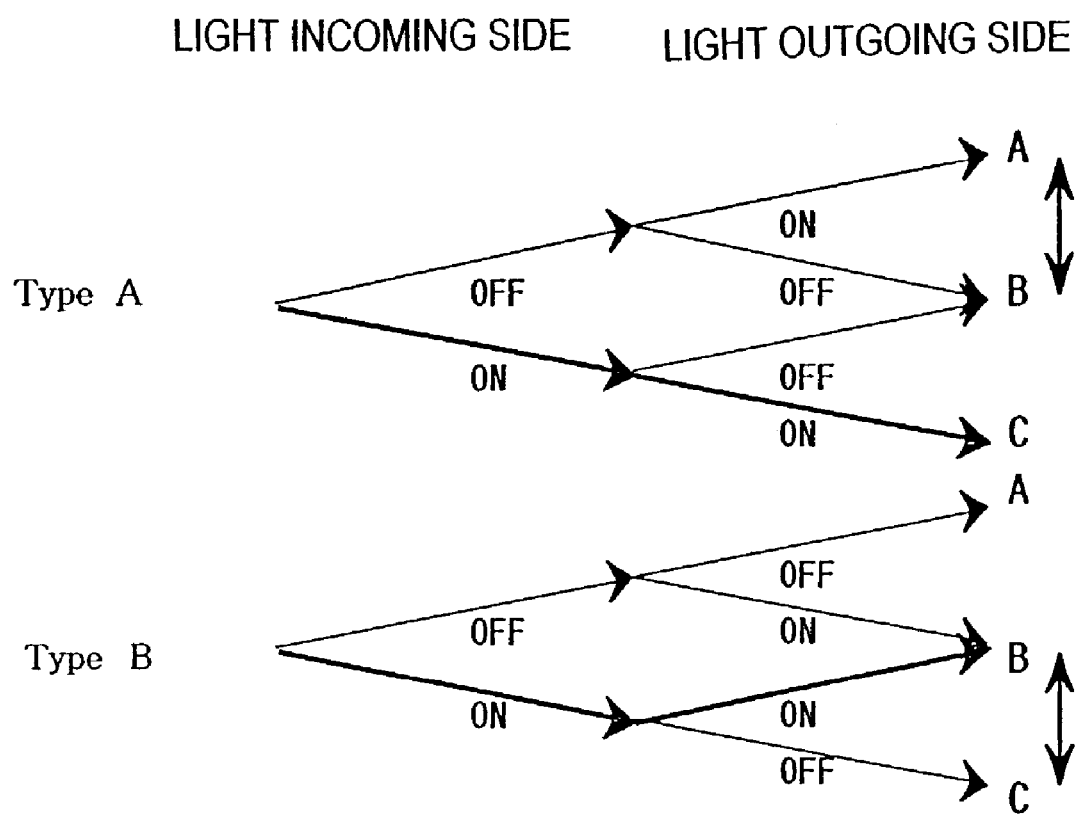
FIG. 56 shows how state transitions may occur in the image shifter shown in FIG. 53.

In Type B on the other hand, if State B is defined by "OFF•ON", the "ON•ON" state temporarily exists as in Type A while a transition is occurring from State B into State C or from State C into State B. However, State B is defined by the "ON•ON" state as shown in FIG. 56. Thus, unlike Type A, no deterioration is observed in image quality. Consequently, according to the combinations of Type B, no image quality deterioration is caused due to the difference in response characteristic during any transition.

In the image shifter shown in FIG. 53, if the crystal plates g3 and g4 on the light incoming and outgoing sides have positive birefringence and negative birefringence, respectively, then Type A is realized. That is to say, when the light ray is shifted in the same direction between the light incoming side (i.e., on the left-hand side) and the light outgoing side (i.e., on the right-hand side) as shown in FIG. 59, the light ray shifted on the light outgoing side preferably has a polarization direction that defines an angle of 90 degrees with that of the light ray shifted on the light incoming side. On the other hand, if the orientations of the crystal plates g3 and g4 on the light incoming and outgoing sides are aligned with each other, then Type B is realized. In this embodiment, States A through C shown in FIG. 55 respectively correspond to the upper, middle and lower shift locations on the projection plane.

Embodiment 16

Figure 54:
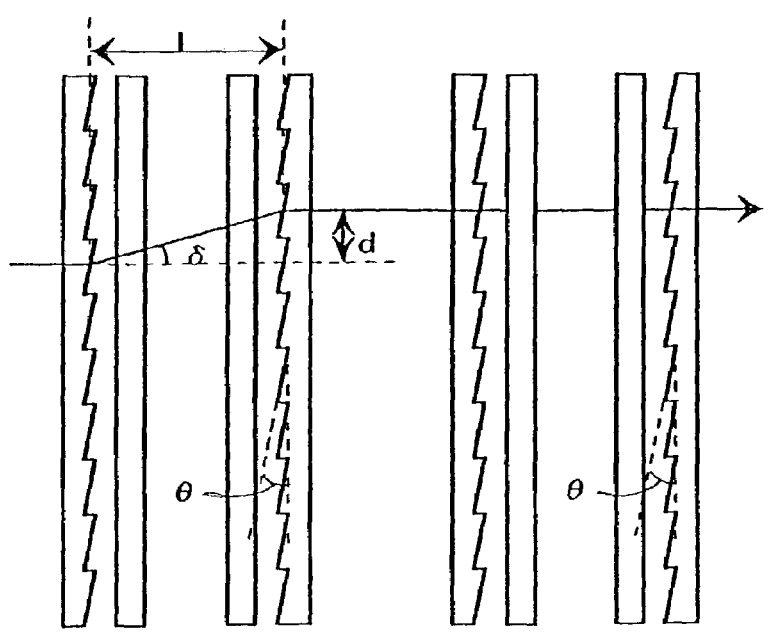
FIG. 54 is a perspective view illustrating another exemplary arrangement of an image shifter.

The image shifter of this embodiment is obtained by preparing two pairs of elements such as those shown in FIG. 36 and arranging those two pairs of elements as shown in FIG. 54.

The image shifter of this embodiment is similar to the image shifter of the fifteenth embodiment in that the image shifting direction is determined by the ON/OFF states of the voltages to be applied to the respective liquid crystal layers. The features of this embodiment will be described with reference to FIGS. 57 and 58.

Figure 57:
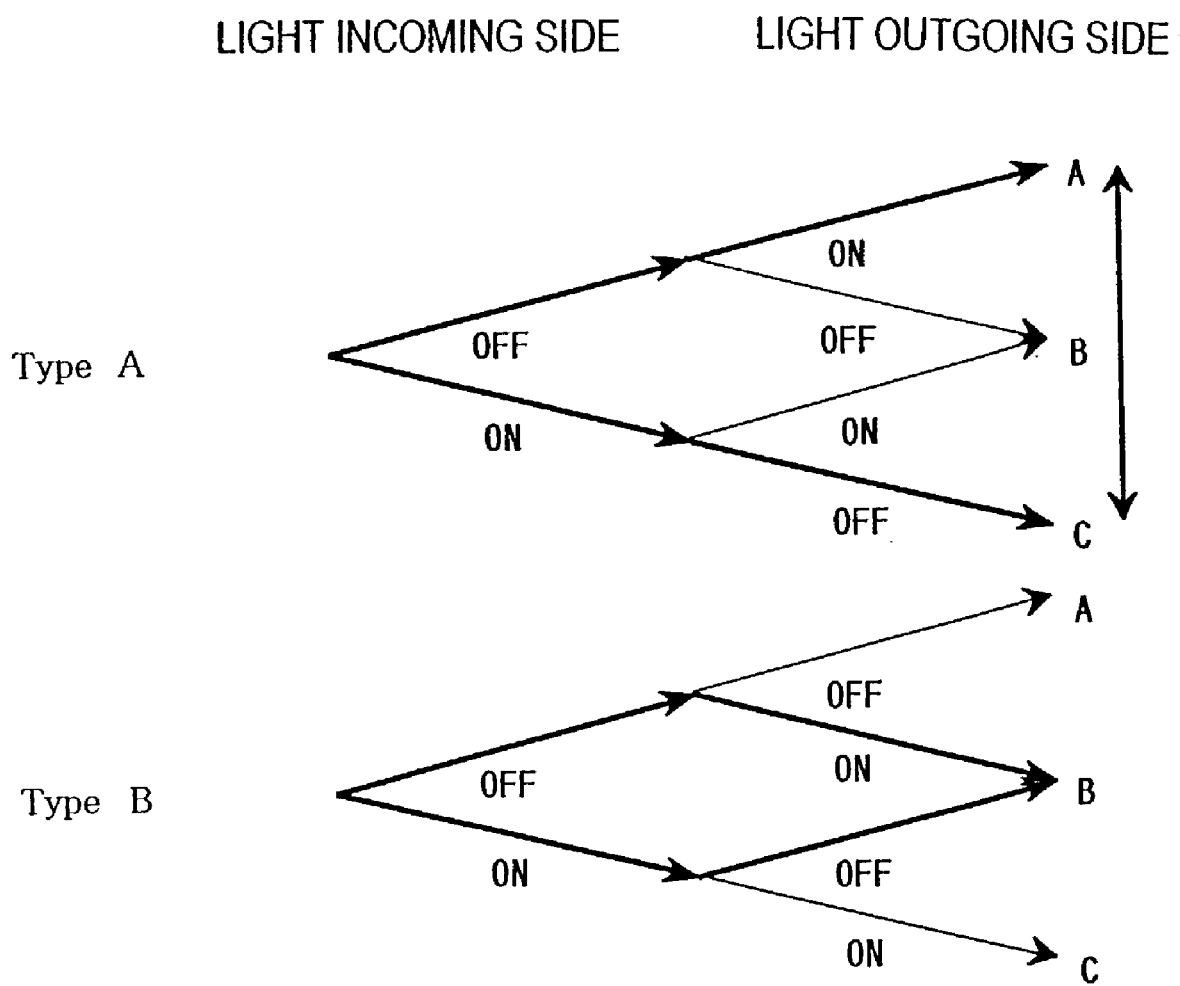
FIG. 57 shows how state transitions may occur in the image shifter shown in FIG. 54.

FIG. 57 schematically shows how the states of the liquid crystal layers on the light incoming and outgoing sides change with the voltages applied. For example, there are two possible states depending on whether or not a voltage is applied to the liquid crystal layer on the light incoming side. Each of these two different states further branches into two according to the voltage application state of the liquid crystal layer on the light outgoing side.

In FIG. 57, the changes of voltage application states of these two liquid crystal layers are indicated by bold arrows as in FIG. 52. On the other hand, the "ON•ON" state, which is temporarily created while the voltage application states of the two liquid crystal layers are changing, is indicated by bold arrows in FIG. 58.

In this embodiment, if the Type B arrangement is adopted, no state transition combination results in the intermediate state that might be temporarily created during a state transition as can be seen from FIGS. 57 and 58. That is to say, by adopting the Type B arrangement, it is possible to prevent another state from being created during a state transition. Thus, the deterioration of image quality is avoidable.

Next, it will be described how much an image subframe is shifted. As already described, if the response speed of a display panel is low, a time lag may be caused between the timing of image shifting and the timing of switching images to be displayed. When such a time lag is caused, a ghost image is displayed on the projection plane.

For example, in the subset 1A shown in FIG. 43, images are sequentially shifted pixel by pixel in the +y direction. Accordingly, an image that has been shifted by one pixel in the +y direction may be displayed for just a short time due to the difference in response. On the other hand, in the subset 1B shown in FIG. 43, an image that has been shifted by one pixel in the −y direction is displayed as a superimposed image. That is to say, an image contour is blurred in an area substantially corresponding to one pixel.

In contrast, each of the other subsets 2A, 2B, 3A and 3B includes two-pixel image shifting. Accordingly, an image that has been shifted by two pixels may be displayed as a superimposed image. Then, a blurred contour is observed in an area corresponding to two pixels. When two-pixel image shifting is carried out between two subsets, similar contour blurring may be created.

To avoid such contour blurring, the amount of shifting between image subframes to be displayed consecutively is preferably minimized. Also, to solve the problem described above that could happen when the eye moving direction and rate substantially match the image subframe shifting direction and rate, the number of shift locations to be included in one period of a shifting pattern is preferably increased.

Figure 60:
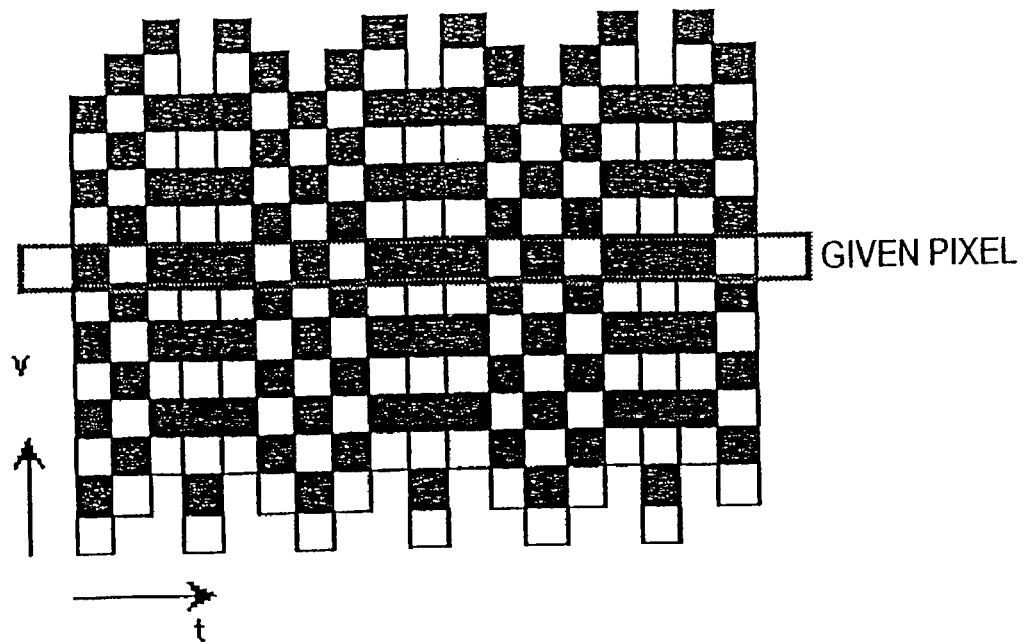
FIG. 60 shows an image subframe shifting pattern which is made up of six image subframes (consisting of two subsets) per period and of which the image shift amount is variable.

Suppose an image of which the brightness changes greatly every other pixel in the shifting direction. Examples of such images include an image with horizontal stripes, oblique lines, or cross-hatching. If such an image is shifted in multiple shift amounts (including one-pixel shifts and two-pixel shifts, for example), then the display quality changes compared to a situation where an image is always shifted in an amount that is approximately equal to one pixel. FIG. 60 shows a shifting pattern of such an image. In the example illustrated in FIG. 60, the image is shifted in multiple shift amounts (i.e., one-pixel shifts and two-pixel shifts). If an image is shifted in two different shift amounts in this manner, then the bright and dark state alternation period of a given pixel is inconstant.

Image subframes are switched at a frequency that is twice or more as high as the frame rate of a video signal. Accordingly, if the bright and dark states are alternated in too short a period, then the liquid crystal layer of the display panel cannot respond within one subframe period. Conversely, if one bright or dark period lasts for a long time over multiple subframe periods, then the liquid crystal layer can afford to respond within that long period. Accordingly, if an image is shifted in multiple shift amounts, then the brightness (or darkness) of a given pixel changes subframe by subframe. The variation in brightness of a pixel due to the difference in shift amount will be repeatedly created every shifting pattern period. As a result, the viewer feels such an image flickering.

Figure 61:
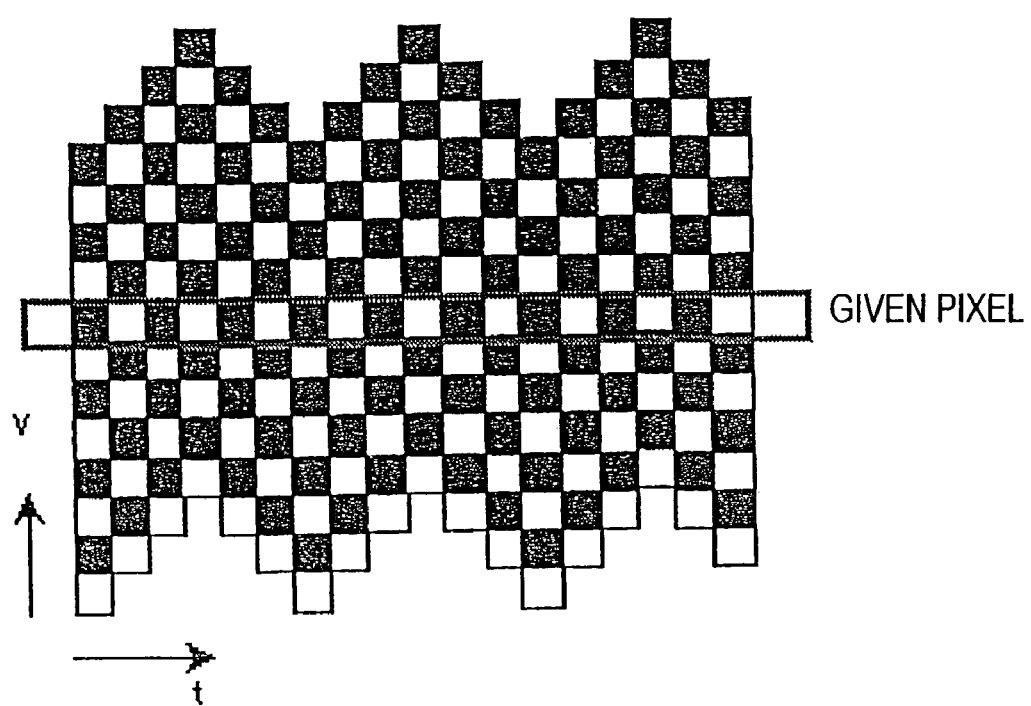
FIG. 61 shows an image subframe shifting pattern which is made up of six image subframes (consisting of two subsets) per period and of which the image shift amount is constant.

On the other hand, FIG. 61 shows a pattern in which the image is always shifted in a shift amount of one pixel. In the shifting pattern shown in FIG. 61, the bright and dark state alternation period of a given pixel is constant. In that case, the liquid crystal layer cannot respond fully within one subframe period and the image displayed does not become sufficiently bright (or dark). However, since the bright and dark states are alternated at regular intervals, no flicker is sensed.

In view of these considerations, it can be seen that beneficial effects are achieved by maintaining the amount of single image shifting at approximately one pixel.

Hereinafter, embodiments in which a preferred shifting pattern to obtain a sharp image is adopted will be described.

Embodiment 17

A projection type image display device according to this embodiment basically has the same configuration as the counterpart of the first embodiment described above. The main difference between this and first embodiments is that an image subframe shifting pattern, which can be used effectively to obtain an even sharper image, is adopted in this embodiment. Thus, only this difference will be described.

In the first embodiment described above, the $n+1^{st}$ image frame (where n is a positive integer) is made up of three image subframes, which are shifted in the same direction as the image subframes that make up the $n^{th}$ image frame as shown in FIG. 12. In this embodiment, one image subframe shifting pattern consists of six image subframes per period as in the thirteenth embodiment described above. In the thirteenth embodiment, the subsets 1A and 2B are combined as shown in FIG. 44, thereby making up a shifting pattern for one period. Accordingly, this shifting pattern involves two-pixel shifting twice (in the +y direction and −y direction, respectively) per period.

Figure 62:
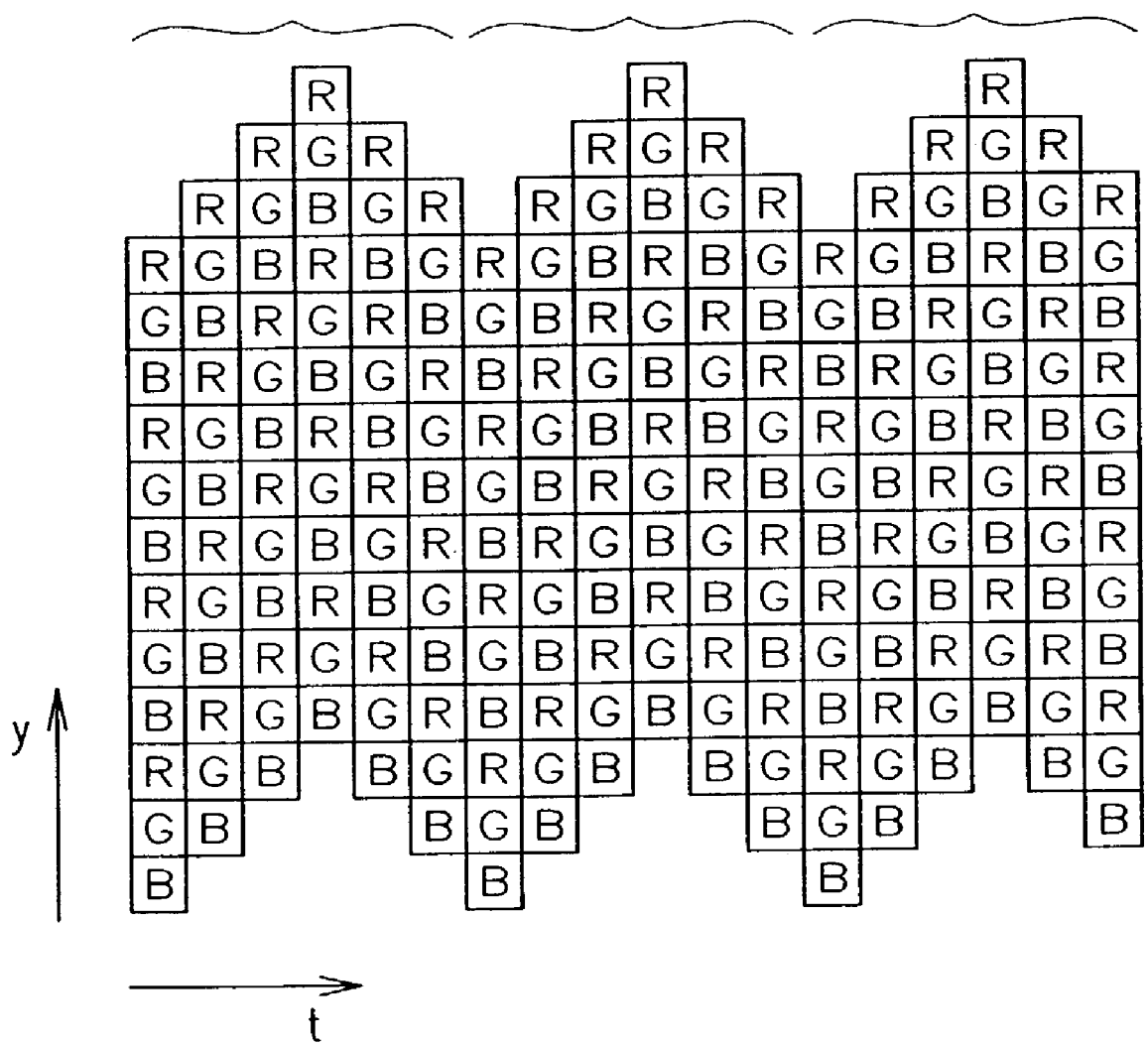
FIG. 62 shows an image subframe shifting pattern which is made up of six image subframes (consisting of two subsets) per period.

On the other hand, the shifting pattern shown in FIG. 62 is adopted in this embodiment. One period of this shifting pattern is defined by six image subframes, each of which is shifted to one of four locations in line. Also, the amount of shifting is one pixel each.

In its corresponding Fourier space, the shifting pattern shown in FIG. 62 is equivalent to that shown in FIG. 44. Accordingly, the spectral localized points of the shifting pattern shown in FIG. 62 are the same as those shown in FIG. 42(*b*). That is to say, according to this embodiment, the effects of the thirteenth embodiment described above are also achieved. In addition, according to this embodiment, the contour smearing can be advantageously halved from ±two pixels into ±one pixel. It should be noted that even when one frame is divided into two or three subframes, the shifting pattern shown in FIG. 62 may also be adopted.

Figure 63:
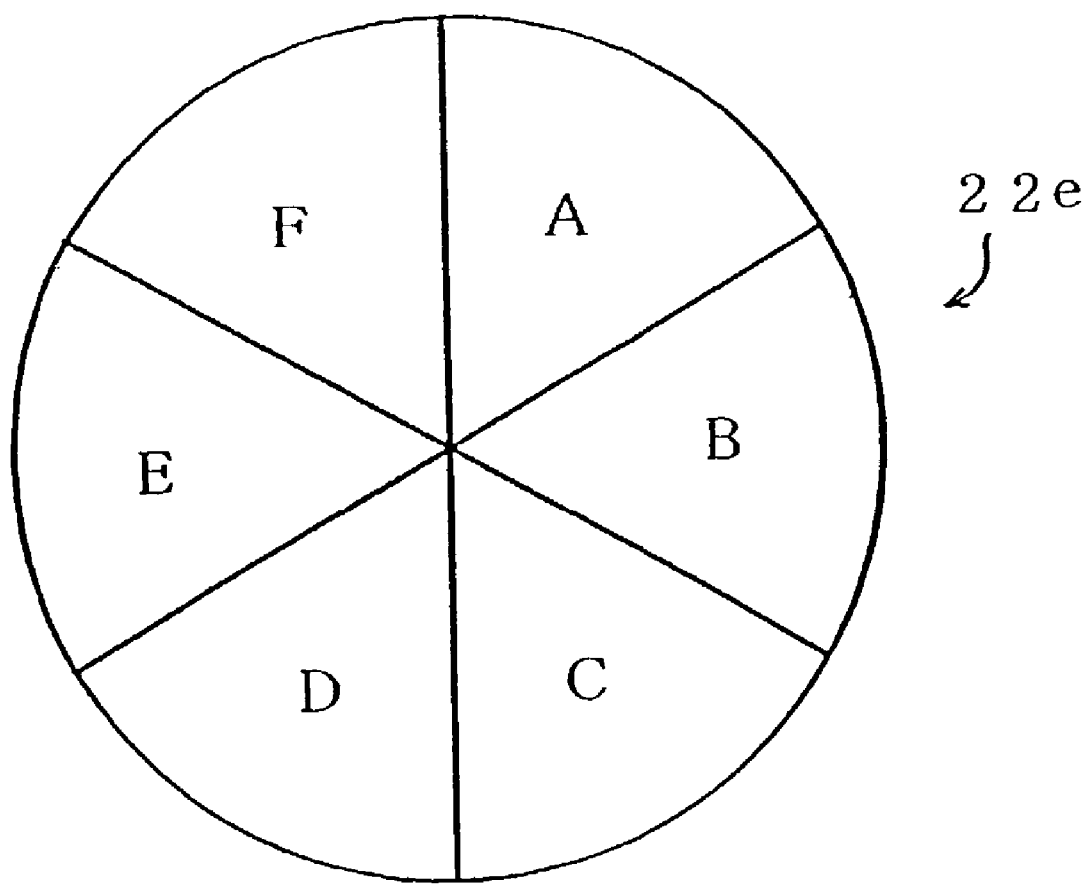
FIG. 63 is a front view of a rotational plate implemented as an image shifter.

An exemplary image shifter for use to realize such a shifting pattern is shown in FIG. 63. This image shifter includes a glass plate 22e having transparent regions A through F. Only inexpensive BK7 glass is used as a glass material. The transparent region A has a thickness of 0.7 mm, the transparent regions B and F have a thickness of 1.4 mm, the transparent regions C and E have a thickness of 2.1 mm, and the transparent region D has a thickness of 2.8 mm. Each of these transparent regions has a refractive index of 1.52.

The disklike glass plate 22e having such a configuration is disposed such that the principal surface thereof defines an angle of 83.8 degrees with the optical axis. Also, the glass plate 22e is rotated such that the timing at which each transparent region crosses the optical path is synchronized with the timing at which the previous subframe is switched into its associated subframe. Then, the optical path that crosses the transparent region B or F shifts by 26.0 μm from the optical path that crossed the transparent region A. The optical path that crosses the transparent region C or E shifts by 26.0 μm from the optical path that crossed the transparent region B or F. And the optical path that crosses the transparent region D further shifts by 26.0 μm from the optical path that crossed the transparent region C or E.

Suppose the transparent region A is associated with the first subframe shown in FIG. 44. In that case, the transparent region B is associated with the next subframe and the following transparent regions C and so on are associated with the following subframes.

It is naturally possible to adopt the image shifter as described for any of the other embodiments.

In this embodiment, the image display panel also has the pixel arrangement shown in FIG. 46. Accordingly, as in the thirteenth embodiment described above, even if the pixel arrangement on the image display panel is recognized by the viewer due to a substantially match between eye movement and image subframe shifting, the image quality is much less affected.

The projection type image display device according to the embodiment described above generates three image subframes in each frame period by using an image display panel with no color filters, and synthesizes those subframes together while optically shifting them from each other. Thus, compared to the conventional single-panel projection type image display device using color filters, the optical efficiency can be increased significantly and the resolution can be increased threefold. It is naturally possible to generate two image subframes in each frame period and synthesize them together while optically shifting them from each other. In that case, some non-smoothness will be produced in a motion picture displayed but the image subframes are switched at a low rate. Thus, the response of the liquid crystal material is sufficient and a higher transmittance is achieved. Furthermore, the image contour smearing, caused by the time lag between image shifting and subframe switching, can be no greater than one pixel.

Embodiment 18

A projection type image display device according to this embodiment basically has the same configuration as the counterpart of the seventeenth embodiment described above. The main difference between this and seventeenth embodiments lies in image subframe shifting pattern. Thus, only this difference will be described below.

In the seventeenth embodiment described above, the image subframe shifting pattern is made up of six image subframes per period as shown in FIG. 62. On the other hand, in this eighteenth embodiment, the image subframe shifting pattern is made up of twelve image subframes per period as shown in FIG. 63.

In the Fourier space corresponding to the shifting pattern shown in FIG. 63, the localized points are even more dispersed as compared to the Fourier space corresponding to the shifting pattern shown in FIG. 62. Thus, in this embodiment, the unwanted phenomenon described above even less likely happens at the particular eye moving rate than in the seventeenth embodiment.

In the image subframe shifting pattern for use in this embodiment, no shifting between subframes always occurs between an even-numbered subframe and an odd-numbered subframe. Thus, one frame may be made up of either two subframes or three subframes.

An exemplary image shifter to be preferably used in this embodiment is shown in FIG. 50.

This image shifter includes a glass plate 22k having transparent regions A through L. Only inexpensive BK7 glass is used as a glass material. The transparent regions A and L have a thickness of 0.7 mm, the transparent regions B and B, D, I and K have a thickness of 1.4 mm, the transparent regions C, E, H and J have a thickness of 2.1 mm and the transparent regions F and G have a thickness of 2.8 mm. Each of these transparent regions has a refractive index of 1.52.

The disklike glass plate 22k having such a configuration is disposed such that the principal surface thereof defines an angle of 83.8 degrees with the optical axis. Also, the glass plate 22k is rotated such that the timing at which each transparent region crosses the optical path is synchronized with the timing at which the previous subframe is switched into its associated subframe. Then, the optical path that crosses the transparent region B, D, I or K shifts by 26.0 μm from the optical path that crossed the transparent region A or L. The optical path that crosses the transparent region C, E, H or J shifts by 26.0 μm from the optical path that crossed the transparent region B, D, I or K. And the optical path that crosses the transparent region F or G also shifts by 26.0 μm from the optical path that crossed the transparent region C, E, H or J.

Suppose the transparent region A is associated with the first subframe shown in FIG. 49. In that case, the transparent region B is associated with the next subframe and the following transparent regions C and so on are associated with the following subframes.

MODIFIED EXAMPLE 2 OF IMAGE SHIFTER

Next, another modified example of the image shifter will be described.

As described above, the image shifter including a liquid crystal layer is effectively applicable for use in both an image display panel of a simultaneous write type and an image display panel of a line scanning type.

To shift an image subframe among three locations that are arranged in line on the projection plane, two image shifters may be arranged in series on the optical axis and the shift amounts of these image shifters may be substantially equalized with each other as described above.

On the other hand, to shift an image subframe among four locations that are arranged in line on the projection plane, the two image shifters may have mutually different shift amounts.

Hereinafter, a method of driving such an image shifter will be described.

Embodiment 19

Figure 64:
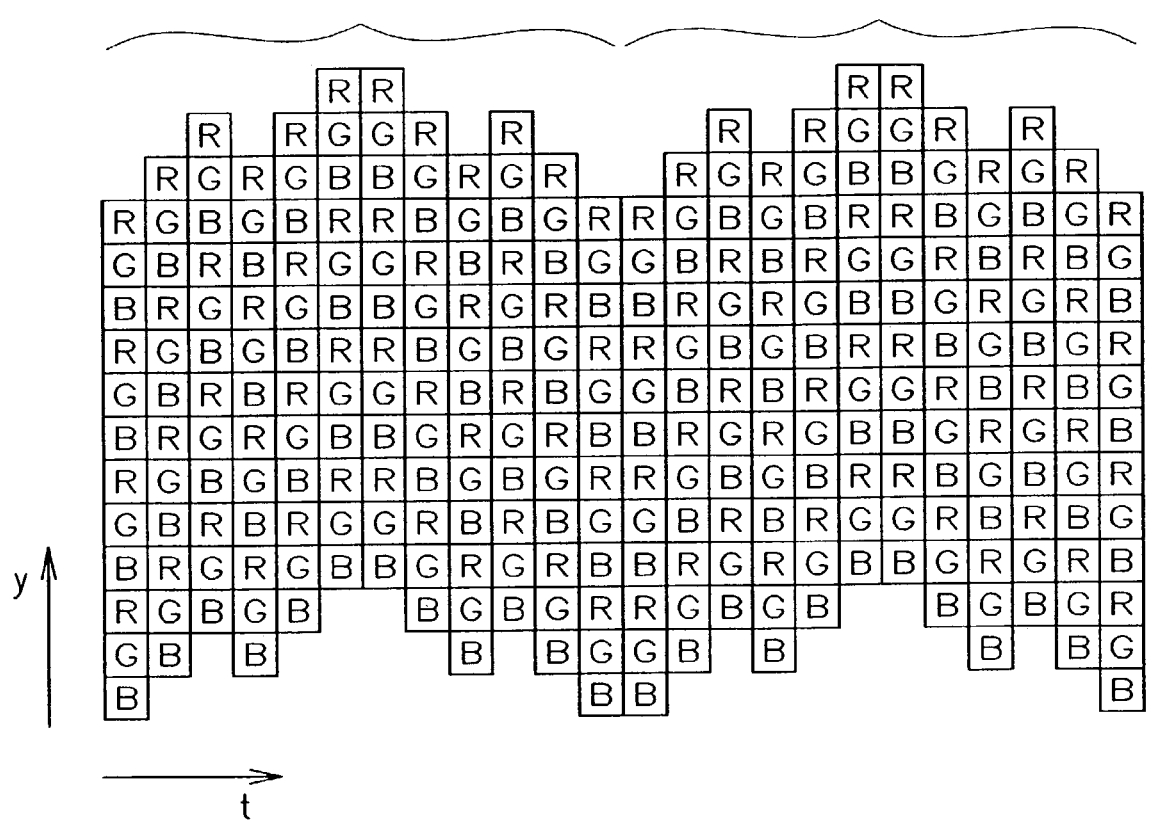
FIG. 64 shows an image subframe shifting pattern which is made up of twelve image subframes (consisting of four subsets) per period and of which the image shift amount is constant.

The image shifter of this embodiment can shift an image subframe pixel by pixel to one of four locations that are arranged in line on the projection plane, and can be used effectively to realize the shifting pattern shown in FIG. 62 or 64. This image shifter is obtained by preparing two pairs of elements such as those shown in FIG. 32 (or FIG. 33), arranging those two pairs of elements in series on the optical path as shown in FIG. 53 and setting two different image shift amounts for the two pairs.

Specifically, in this embodiment, the image shifter is formed by using crystal plates g3 and g4 having birefringence. Accordingly, if the thicknesses of these crystal plates are changed, the image shift amounts thereof can be changed easily. By using this image shifter, one of four different locations on the projection plane can be selected according to the voltage application states of the two liquid crystal layers on the light incoming and outgoing sides on the optical path. One of the four different locations is selected according to a particular combination of the voltage application state (i.e., ON or OFF) of the first liquid crystal layer on the light incoming side and the voltage application state (i.e., ON or OFF) of the second liquid crystal layer on the light outgoing side.

In this case, the mode of shifting changes depending on whether the image shift amount on the light incoming side is larger or smaller than the image shift amount on the light outgoing side. A situation where the image shift amount on the light incoming side is the greater is shown in FIG. 65, while a situation where the image shift amount on the light outgoing side is the greater is shown in FIG. 66. FIGS. 65 and 66 schematically show how the states of the liquid crystal layers on the light incoming and outgoing sides change with the voltages applied. For example, there are two possible states depending on whether or not a voltage is applied to the liquid crystal layer on the light incoming side. Each of these two different states further branches into two according to the voltage application state of the liquid crystal layer on the light outgoing side.

In this case, the direction of polarization plane of the light that is going to enter the liquid crystal layer on the light outgoing side changes 90 degrees with the voltage application state of the liquid crystal layer on the light incoming side. Accordingly, depending on whether or not the voltage is applied to the liquid crystal layer on the light incoming side, the state transition of the liquid crystal layer on the light outgoing side responsive to the voltage applied becomes one of two opposite ones. Thus, there are two possible sets of state transitions according to the particular combination of voltage application states of the liquid crystal layers on the light incoming and outgoing sides as shown at the top and bottom of FIG. 65 or 66.

These two sets of combinations will be herein referred to as "Type A" and "Type B", respectively, and the four different locations of image subframes will be herein identified by States A, B, C and D, respectively. Furthermore, to represent the voltage application states of the two liquid crystal layers, a situation where the voltage application state of the liquid crystal layer on the light incoming side is ON and that of the liquid crystal layer on the light outgoing side is OFF will be herein denoted by "ON•OFF", for example.

In that case, according to Type A shown in FIG. 65, "OFF•ON" results in State A, "OFF•OFF" results in State B, "ON•OFF" results in State C, and "ON•ON" results in State D. According to Type B on the other hand, "OFF•OFF" results in State A, "OFF•ON" results in State B, "ON•ON" results in State C, and "ON•OFF" results in State D. It should be noted that each of these States A, B, C and D may be associated with any of the four different locations that are arranged in line on the projection plane. The same statement is also applicable to the example shown in FIG. 66.

Take a state transition from "ON•OFF" into "OFF•ON" or from "OFF•ON" into "ON•OFF" as an example. In the example shown in FIG. 65, the "ON•OFF"→"OFF•ON" or "OFF•ON"→"ON•OFF" state transition corresponds to a transition between States A and C in Type A. In Type B on the other hand, this state transition corresponds to a transition between States B and D. In the same way, in the example shown in FIG. 66, the state transition corresponds to a transition between States A and B in Type A and to a transition between States C and D in Type B, respectively.

In view of these considerations, it can be seen that the "ON•OFF"→"OFF•ON" or "OFF•ON"→"ON•OFF" state transition results in two-pixel shifting in the example shown in FIG. 65. In the example shown in FIG. 66 on the other hand, the "ON•OFF"→"OFF•ON" or "OFF•ON"→"ON•OFF" state transition results in one-pixel shifting.

The shifting patterns shown in FIGS. 62 and 64 have an image shift amount of one pixel. Thus, according to the state transition patterns shown in FIG. 65, neither the "ON•OFF"→"OFF•ON" state transition nor the "OFF•ON"→"ON•OFF" state transition occurs. As a result, the problem with the image shifter due to the delayed response can be avoided.

In the image shifter shown in FIG. 53, if the crystal plates g3 and g4 on the light incoming and outgoing sides have positive birefringence and negative birefringence, respectively, then Type A is realized. That is to say, when the light ray is shifted in the same direction between the light incoming side (i.e., on the left-hand side) and the light outgoing side (i.e., on the right-hand side) as shown in FIG. 59, the light ray shifted on the light outgoing side preferably has a polarization direction that defines an angle of 90 degrees with that of the light ray shifted on the light incoming side. On the other hand, if the orientations of the crystal plates g3 and g4 on the light incoming and outgoing sides are aligned with each other, then Type B is realized.

Furthermore, if the ratio of the thickness of the crystal plate g3 to that of the crystal plate g4 is set to 2:1, then the image shifters including these crystal plates will have an image shift amount ratio of 2:1. In that case, the shift locations A, B, C and D shown in FIGS. 65 and 66 will be arranged at regular intervals and shifting can be carried out at one pixel pitch.

Embodiment 20

As in the sixteenth embodiment described above, the image shifter of this embodiment is also obtained by preparing two pairs of elements such as those shown in FIG. 36 and arranging those two pairs of elements as shown in FIG. 54.

The image shifter of this embodiment is similar to the image shifter of the fifteenth embodiment in that the image shifting direction is determined by the ON/OFF states of the voltages to be applied to the respective liquid crystal layers. The features of this embodiment will be described with reference to FIGS. 67 and 68.

FIG. 67 schematically shows how the states of the liquid crystal layers on the light incoming and outgoing sides change with the voltages applied. For example, there are two possible states depending on whether or not a voltage is applied to the liquid crystal layer on the light incoming side. Each of these two different states further branches into two according to the voltage application state of the liquid crystal layer on the light outgoing side.

Take a state transition from "ON•OFF" into "OFF•ON" or from "OFF•ON" into "ON•OFF" as an example. In the example shown in FIG. 67, the "ON•OFF"→"OFF•ON" or "OFF•ON"→"ON•OFF" state transition corresponds to a transition between States B and C in Type A. In Type B on the other hand, this state transition corresponds to a transition between States A and D. In the same way, in the example shown in FIG. 68, the state transition corresponds to a transition between States B and C in Type A and to a transition between States A and D in Type B, respectively.

Figure 68:
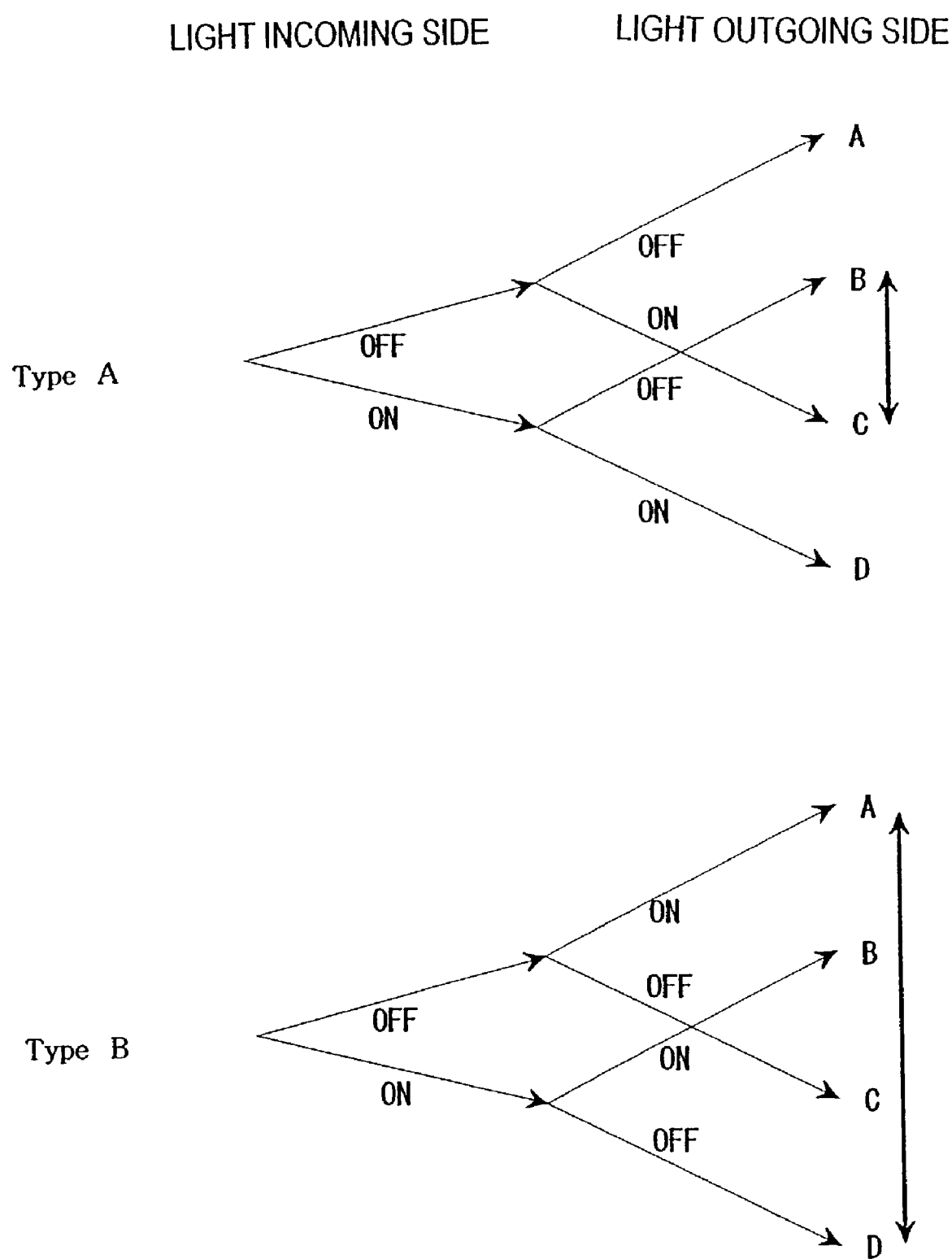
FIG. 68 shows how state transitions may occur in the image shifter that is obtained by further modifying the image shifter shown in FIG. 54.

As can be seen from these results, in the examples shown in FIGS. 67 and 68, when one-pixel shifting is carried out, the "ON•OFF"→"OFF•ON" or "OFF•ON"→"ON•OFF" state transition may occur according to Type A. According to Type B, however, only when three-pixel shifting is carried out, the "ON•OFF"→"OFF•ON" or "OFF•ON"→"ON•OFF" state transition may occur.

When the shifting pattern shown in FIG. 62 or 64 is adopted, the image shift amount is one pixel. Accordingly, if the Type B arrangement is adopted, no different state will appear during any state transition and deterioration of image quality is avoidable.

Various embodiments of the present invention described above relate to a projection type image display device that uses a liquid crystal display (LCD) as an image display panel. However, the present invention is not limited to these specific embodiments. Alternatively, the present invention is also applicable to a projection type image display device that uses a non-LCD display (e.g., digital micro-mirror device (DMD)) as its image display panel.

Furthermore, the present invention is also applicable to a direct viewing type image display device. In that case, an image display panel that conducts a display operation in full colors by using color filters may be used. A normal direct viewing type that uses no optical systems for imaging purposes needs no projection plane such as a screen. However, in a direct viewing type that makes the viewer look at an image through an eyepiece, the retinas of his or her eyes function as the image projection plane.

Furthermore, the present invention is also applicable to a direct viewing or projection type image display device that uses, as an image display panel, a self-emitting image display that needs no separate light source.

Also, the image shifter according to the embodiments described above gets the optical path displaced periodically by a refracting member. Alternatively, the optical path may also be displaced by moving at least a portion of the light source or the optical system. For example, image shifting may also be carried out by vibrating the projection lens 11 shown in FIG. 1.

Embodiment 21

In the system configuration of the projection type image display device according to the eleventh embodiment, the three subframe memories store data about the three colors, respectively. In the eleventh embodiment, even if one frame is made up of two subframes, the three-color image data are always stored in frame memories. For that reason, three subframe memories are necessary. This embodiment adopts a system that can utilize the memories more efficiently when one frame is made up of two subframes.

Next, an exemplary system configuration for a projection type image display device according to the present invention will be described with reference to FIG. 69.

The system of this embodiment also includes a video signal processor 100, an illumination optical system (such as a light source) 102, an image display panel (e.g., an LCD panel) 104, an image shifter 106, an image shifter controller 108 and a projection lens 110 as its main components.

The illumination optical system 102, image display panel 104, image shifter 106 and projection lens 110 have already been described above. The relationship between these components, as well as the functions of the video signal processor 100 and the image shifter controller 108, is the same as that of the eleventh embodiment.

In this embodiment, the video signal processor 100 includes an input signal selector 120, a video demodulator 122, a Y/C separator 124, a scaler 126, a frame rate converter 128, a system controller 132, a color signal selector 1340 and a frame memory circuit 1300.

The system controller 132 controls the operations of the input signal selector 120, color signal selector 1340, frame memory 1300 and image shifter controller 108.

In response to the output signal of the system controller 132, the image shifter controller 108 controls the operation of the image shifter 106 such that the image shifter 106 operates synchronously with the display of an image subframe.

The main difference between this and eleventh embodiments lies in the configurations of the frame memory circuit 1300 and color signal selector 1340. Thus, the following description will be focused on this difference.

Figure 69:
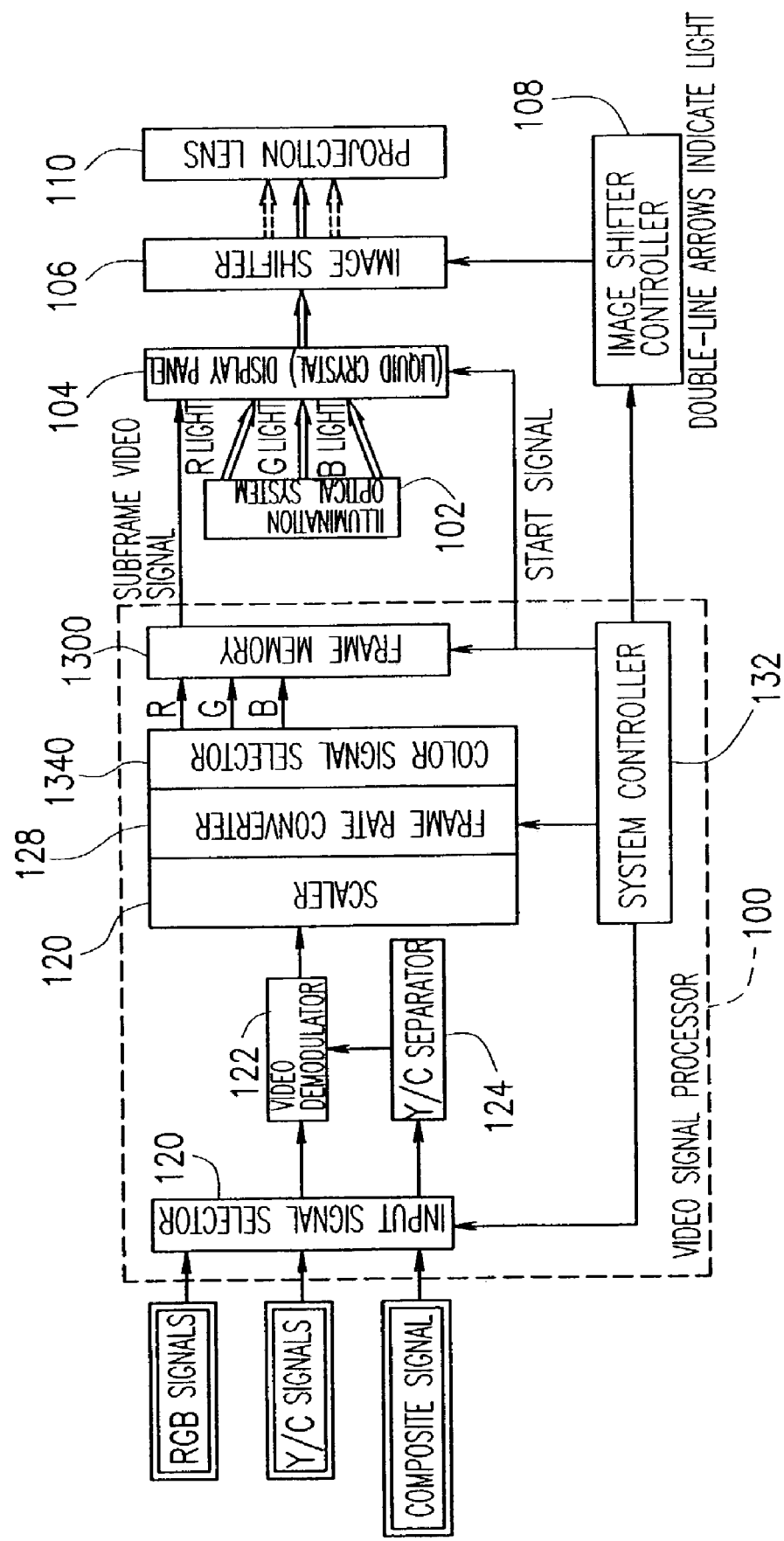
FIG. 69 is a block diagram showing another exemplary system configuration for a projection type image display device according to the present invention.

Specifically, in this embodiment, the color signal selector 1340 shown in FIG. 69 stores the R, G and B signals in the frame memory circuit 1300 in an appropriate order. The image display panel 104 displays an image subframe thereon based on the data that have been supplied from the frame memory circuit 1300.

The rate at which a signal is written on a frame memory (i.e., frequency fin) is changeable with the type of the input signal, while the rate at which a signal is read out from a frame memory (i.e., frequency fout) is defined by the clock frequency of this system. For example, the frequency fin may be 60 hertz (Hz) and the frequency fout may be 180 Hz.

In response to a control signal that has been output from the system controller 132, the R, G and B signals are stored in multiple frame memories one after another. In this case, each frame memory stores the data about one image subframe. Accordingly, in this embodiment, if one frame is made up of two subframes, then just two frame memories are needed and the third frame memory is not necessary.

These signals are read out at the rate fout as described above. In each frame period, the read operation on the respective frame memories is repeatedly performed two or three times.

In the eleventh embodiment described above, the respective color signals are stored in the three frame memories, and then the color signal selector 134 sequentially reads out required signals from the three frame memories, thereby generating each image subframe. In contrast, in this embodiment, the respective color signals are mapped by the color signal selector 1340 onto the frame memory circuit 1300 so that respective image subframes are stored in their associated frame memories. Then, the image subframe data that have been stored in the respective frame memories are read out sequentially.

As described above, even if one frame is made up of two subframes, the system of the eleventh embodiment requires three frame memories for the respective color signals irrespective of the number of subframes included in one frame. This is because the data of each frame should be all stored in the respective frame memories separately. Meanwhile, according to this embodiment, the image subframes are directly mapped onto the frame memories, and therefore, only the data about required image subframes need to be stored in the frame memories. Thus, when one frame consists of two subframes, the number of frame memories or the storage capacity required can be advantageously cut down to two-thirds of the eleventh embodiment described above.

Embodiment 22

Next, a preferred image shifting direction will be described about an exemplary image shifter that includes at least one pair of liquid crystal cell and birefringent element.

In a single-panel projection type display device including a microlens array such as that shown in FIG. 2, the angle of incidence of a light ray on its associated pixel region changes depending on the color of the light ray (i.e., R, G or B). Accordingly, the light ray, which has gone out of the display panel to enter the birefringent element of the image shifter, also has one of three different angles of incidence corresponding to the R, G and B. A birefringent element has an optic axis that tilts from the light incidence plane thereof. Thus, a light ray, which has been vertically incident onto the light incidence plane, shifts parallelly to a plane that includes the optic axis and the optical axis of the incoming light ray (i.e., the principal section). In this case, the image shifting direction is parallel to the principal section of the birefringent element. However, if the R, G and B light rays are incident onto the incidence plane of the birefringent element at mutually different angles, then the light shifting direction or shift amount changes.

First, suppose the RGB color separation direction is aligned with the image shifting direction. In that case, the R, G and B light rays are incident onto the principal section of the birefringent element so as to be parallel to each other. Thus, the light shifting directions are not different but the shift amounts thereof are different among R, G and B. However, the difference in shift amount is slight and negligible.

Next, suppose the RGB color separation direction is not aligned with the image shifting direction. In that case, the image shifting directions corresponding to the R, G and B light rays are misaligned from each other. As a result, the respective color rays are not superimposed one upon the other at the same location. For that reason, the RGB color separation direction is preferably substantially aligned with the image shifting direction.

Figure 70:
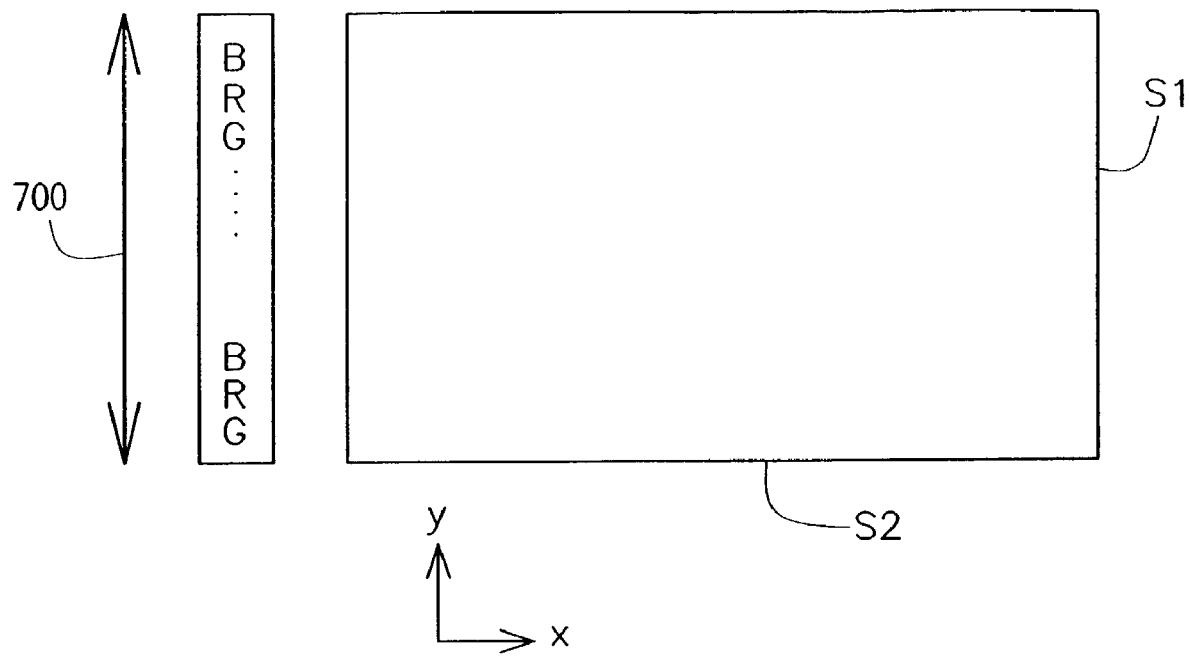
FIG. 70 is a front view showing a relationship between the color separation direction and the screen.

As shown in FIG. 70, a normal display screen has the shape of a rectangle, of which the shorter sides S1 extend vertically (i.e., in y direction) and the longer sides S2 extend horizontally (i.e., in x direction). In a line sequential (or progressive) scanning process, the scan line moves in the shorter side direction (y) of the display screen. Accordingly, if the RGB color separation direction 700 is aligned with the shorter side direction (y) of the display screen, then the RGB color separation direction 700, or the image shifting direction, is aligned with the shorter side direction (y) of the screen. Then, the dichroic mirrors for use in color separation may be designed so as to have a smaller size.

Embodiment 23

Figure 71:
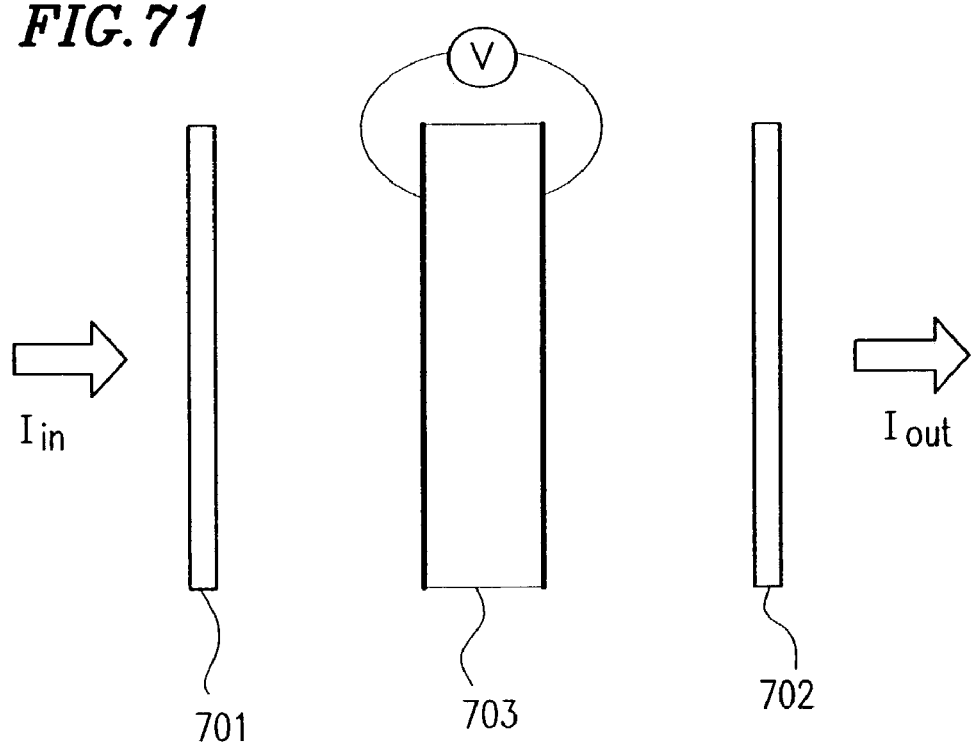
FIG. 71 shows a pair of polarizers disposed as parallel Nicols and a liquid crystal layer sandwiched between the polarizers.
Figure 72:
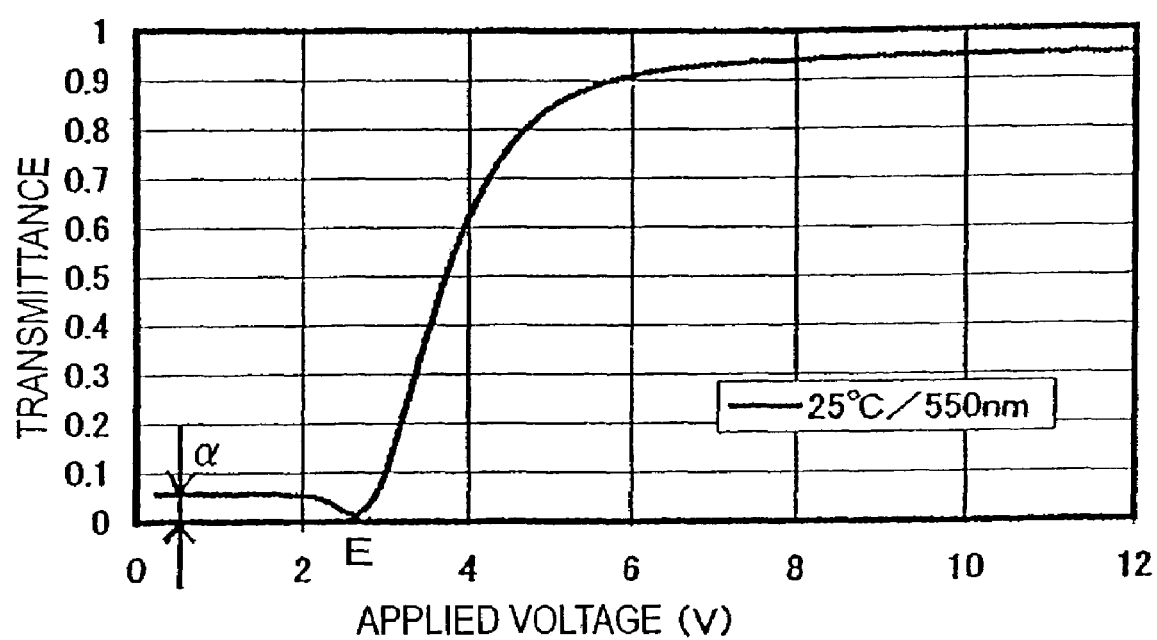
FIG. 72 is a graph showing the voltage-transmittance characteristic of the arrangement shown in FIG. 71.

When a voltage-transmittance characteristic is measured with a TN liquid crystal layer 703 inserted between a pair of polarization plates (i.e., a polarizer and an analyzer) 701 and 702 that are disposed as parallel Nicols as shown in FIG. 71, the results shown in FIG. 72 are obtained. As used herein, the "transmittance" means a ratio of the intensity of outgoing linearly polarized light that has been transmitted through the analyzer 702 to the intensity of incoming linearly polarized light that is going to enter the liquid crystal layer 703.

As can be seen from FIG. 72, even while no voltage is being applied to the TN liquid crystal layer 703, light is transmitted albeit slightly. When a voltage of about several volts is applied to the liquid crystal layer, the transmittance of the light reaches a local minimum. Even when no voltage is applied to the TN liquid crystal layer 703, the leakage of the light occurs because the incoming linearly polarized light that has entered the TN liquid crystal layer 702 is slightly polarized elliptically due to the residual optical rotatory dispersion phenomenon caused by TN liquid crystal molecules. If such polarized light having elliptically polarized components is incident onto a birefringent element, then the incident light is split into an ordinary ray and an extraordinary ray. As a result, a ghost image is produced and the resolution decreases. A problem like this is not unique to the TN liquid crystal material but may happen in any other type of liquid crystal material.

This embodiment is characterized by applying a non-zero offset voltage to the liquid crystal cell of an image shifter even while the liquid crystal cell is in OFF state.

When a voltage is applied to a liquid crystal cell to control the polarization direction, the polarization plane of a light ray going out of the liquid crystal cell may rotate about 90 degrees as compared to the no voltage application state. In that case, the liquid crystal cell is herein regarded as being "in ON state". On the other hand, when another voltage, having a magnitude (or absolute value) sufficiently smaller than that of the voltage to "turn ON" the liquid crystal cell, is applied to the liquid crystal layer of the liquid crystal cell, the polarization plane of a light ray going out of the liquid crystal cell may cross that of the outgoing light ray of the "ON-state" liquid crystal cell substantially at right angles. In that case, the liquid crystal cell is herein regarded as being "in OFF state".

In various embodiments described above, while the liquid crystal cell is "turned OFF", the voltage to be applied to the liquid crystal layer of the liquid crystal cell is set to zero. In contrast, this embodiment is characterized in that even while the liquid crystal cell of an image shifter is "turned OFF", a non-zero voltage (i.e., offset voltage) of 2.5 volts, for example, is applied thereto.

Figure 73:
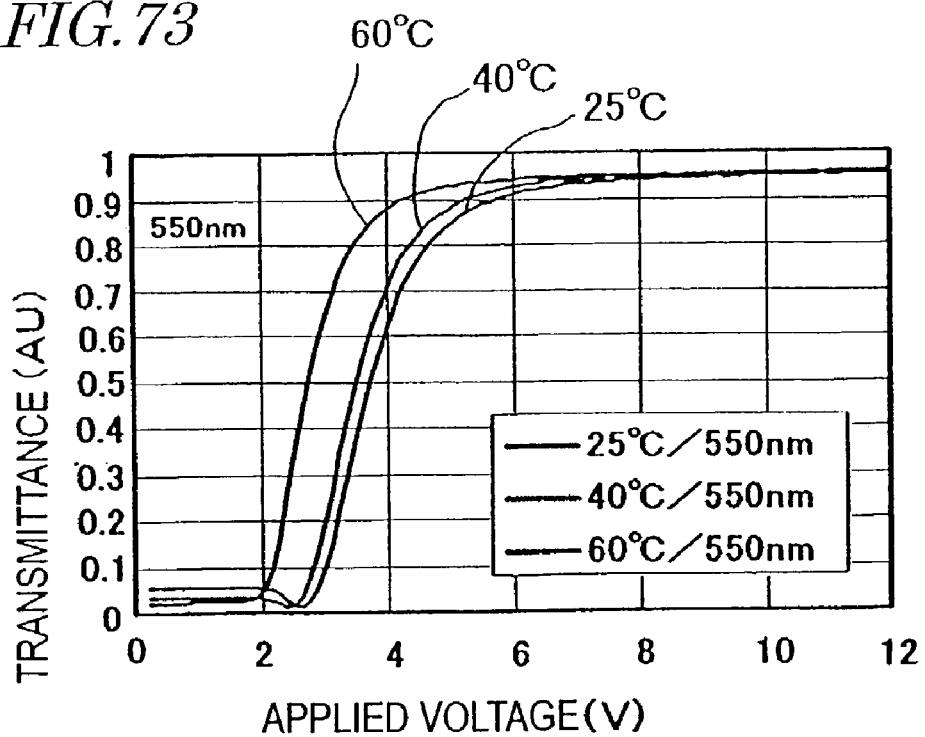
FIG. 73 is a graph showing how the voltage-transmittance characteristic may change with the temperature of the liquid crystal layer.

As shown in FIG. 73, a preferred offset voltage value changes with the temperature of the liquid crystal layer. In a projection type display device, highly intense light is incident onto the image shifter, and the temperature of the liquid crystal layer increases easily. Accordingly, even if an offset voltage, which was optimized at room temperature, is applied to the liquid crystal layer, the rise in temperature of the liquid crystal layer still may produce elliptically polarized components. Thus, the temperature of the liquid crystal cell is preferably measured with a temperature sensor and the magnitude of the offset voltage is preferably controlled appropriately according to the temperature measured.

Figure 74:
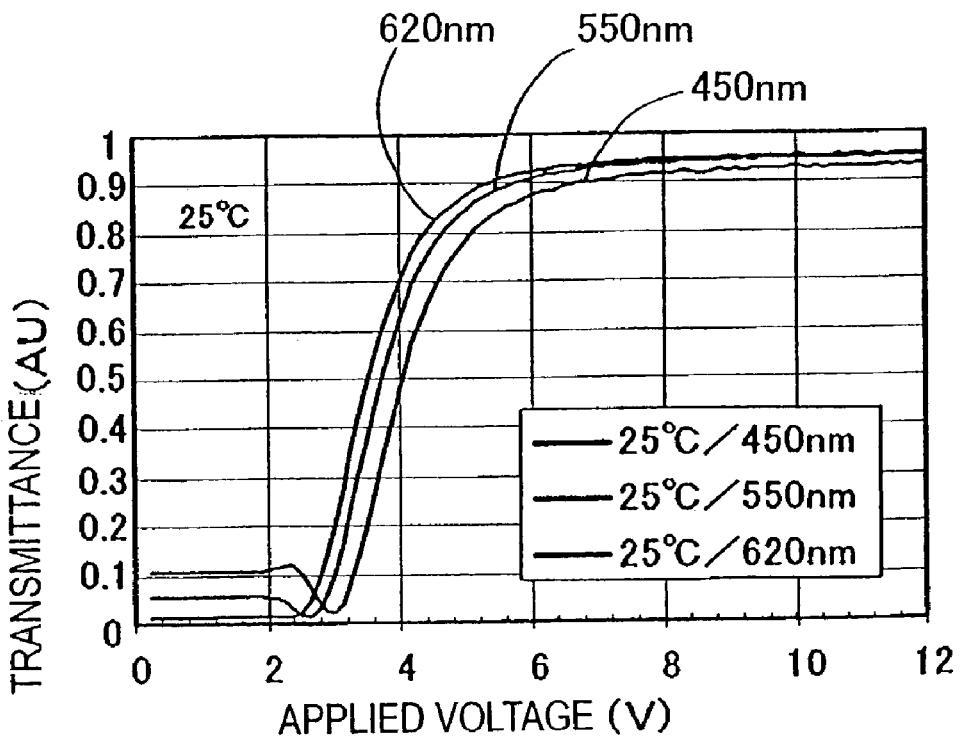
FIG. 74 is a graph showing how the voltage-transmittance characteristic may change with the wavelength of the light.

The preferred offset voltage also changes with the wavelength range of the incoming light as shown in FIG. 74. For that reason, the offset voltage is preferably defined such that the α value for a G light ray, belonging to a wavelength range to which the human visual sense is most sensible, becomes the smallest. Alternatively, the offset voltage may also be defined so as to minimize the difference among the a values of the three primary colors of R, G and B.

If the offset voltage changes with the temperature of the liquid crystal cell, the offset voltage value may be equal to zero in a certain situation. However, the zero voltage applied in such a situation is also herein regarded as an "offset voltage".

Embodiment 24

As described above, a birefringent element can split an incoming light ray into an ordinary ray and an extraordinary ray within its "principal section" including the optic axis thereof. Accordingly, if the polarization direction of the light ray that has been incident onto the birefringent element is vertical to the principal section, then the outgoing light ray consists of ordinary ray components only. On the other hand, if the polarization direction of the light ray that has been incident onto the birefringent element is parallel to the principal section, then the outgoing light ray consists of extraordinary ray components only. Thus, by getting the polarization direction of the incoming light ray switched by a liquid crystal cell, for example, from vertically into horizontally to the principal section of the birefringent element, or vice versa, the incoming light ray can be shifted within the principal section of the birefringent element.

The image shifter according to the ninth embodiment described above can shift an image in a vertical direction of the screen. This image shifter receives an incoming light ray, of which the polarization direction is defined by either vertical or horizontal direction of the screen, and shifts such an incoming light ray.

However, in some display panel, the polarization direction of a light ray that has gone out of the display panel may define not only 0 or 90 degrees with the horizontal direction of the display screen thereof but also 45 degrees with that direction. Particularly in a single-panel display device including a microlens array, a wide viewing angle needs to be realized in the color separation direction. Thus, the polarization direction of a light ray going out of an LCD panel preferably defines an angle of 45 degrees with the horizontal direction of the display screen.

Even if the polarization direction of the light ray that has gone out of the display panel tilts with respect to the horizontal direction of the screen, the image sometimes needs to be shifted in the vertical or horizontal direction of the screen by an image shifter. However, if a light ray, of which the polarization direction tilts from the horizontal direction, is incident onto an image shifter such as that shown in FIG. 32, for example, then the light ray, including both ordinary and extraordinary ray components, is incident onto the birefringent element of the image shifter. As a result, the incoming light ray is split into two rays, which is a problem.

To overcome a problem like this, the light ray that has gone out of the display panel but has not reached the image shifter yet preferably has its polarization direction rotated by a phase plate, for example, such that the polarization direction defines either 0 or 90 degrees with a plane of the birefringent element including the optic axis thereof.

However, if the polarization state is adjusted by a phase plate, then the polarization direction needs to be rotated uniformly either over the entire visible radiation range or over a particular wavelength range. Actually, though, it is difficult for a normal phase plate to rotate the polarization direction uniformly over the entire visible radiation range. Thus, the more distant from the center wavelength the wavelength of an incoming light ray is, the more and more elliptically the light ray is polarized. Thus, both ordinary and extraordinary ray components are incident onto the birefringent element. As a result, a portion of the light ray is shifted in an unwanted direction, a ghost image is produced, and the resolution decreases.

To overcome these problems, the image shifter of this embodiment uses multiple birefringent elements, each shifting the image diagonally, in combination, thereby shifting the image in the vertical direction of the screen eventually.

Figure 75A:
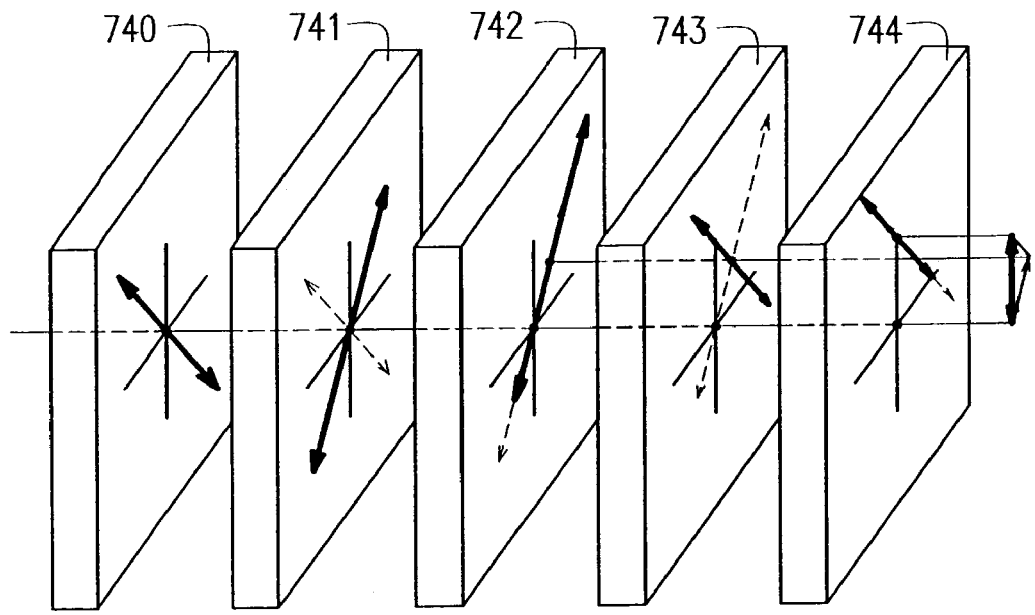
FIG. 75(*a*) is a perspective view schematically illustrating an arrangement for an image shifter that shifts an image in a direction different from the polarization direction of incoming light, FIG. 75(*b*) is a side view thereof, and FIG. 75(*c*) is a schematic representation of a display panel and respective elements of the image shifter as viewed vertically to the optical axis.
Figure 75B:
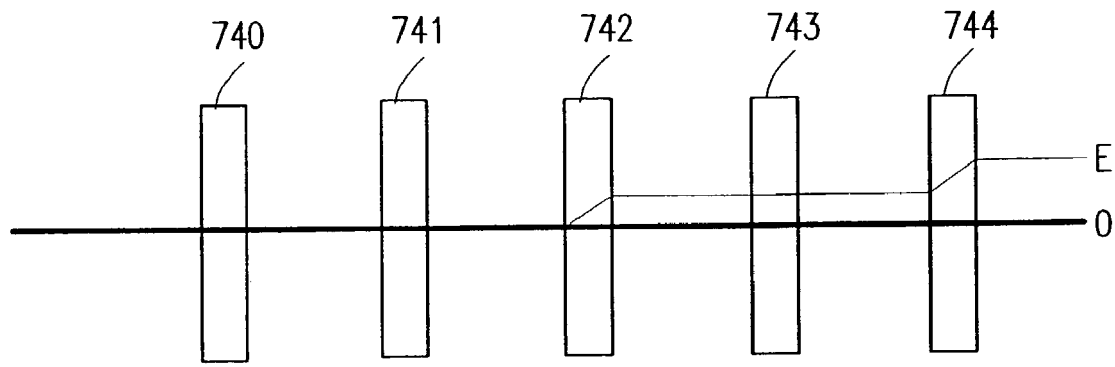
Figure 75C:
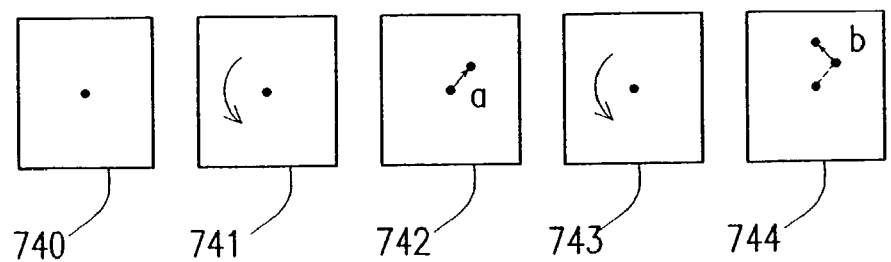
Figure 76:
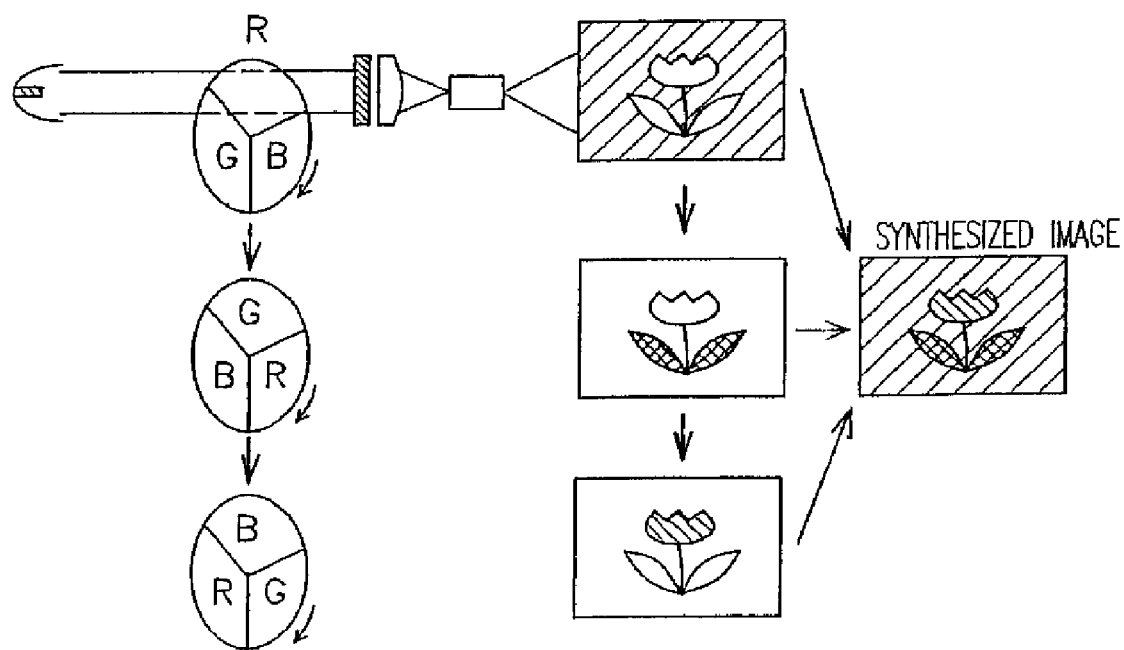
FIG. 76 illustrates a conventional projection type image display device of a field sequential type.

Referring to FIGS. 75(*a*) through 75(*c*), a linearly polarized light ray, of which the polarization direction tilts from the horizontal (or vertical) direction of the screen, goes out of a display panel 740 and then enters a first element (first liquid crystal cell) 741. The first liquid crystal cell 741 switches between the state of rotating the polarization direction of the incoming light ray 90 degrees and the state of not rotating the polarization direction at all in accordance with the voltage applied thereto.

In this embodiment, two birefringent elements 742 and 744, each having an optic axis that is either parallel or vertical to the plane of polarization of the outgoing light ray of the liquid crystal cell 741, are provided, and a second liquid crystal cell 743 is disposed between the two birefringent elements 742 and 744. The second liquid crystal cell 743 also switches between the state of rotating the polarization direction of the incoming light ray 90 degrees and the state of not rotating the polarization direction at all in accordance with the voltage applied thereto.

In this embodiment, the principal section of the birefringent element (i.e., first birefringent element) 742, which is disposed closer to the first liquid crystal cell 741, crosses the principal section of the birefringent element (i.e., second birefringent element) 744, which is disposed more distant from the first liquid crystal cell 741, at right angles. As described above, the principal section is a plane that includes both the optic axis of a birefringent element and the optical axis of an incoming light ray. In other words, the optic axis of the second birefringent element 744 is obtained by rotating the optic axis of the first birefringent element 742 90 degrees (or −90 degrees) around the optical axis of the incoming light ray.

The principal section of the first birefringent element 742 defines an angle of θ degrees with a reference plane (e.g., a "horizontal plane" in this case) and the principal section of the second birefringent element defines an angle of θ' (=θ+90) degrees with the reference plane. Suppose a light ray, of which the polarization direction is parallel to the principal section of the first birefringent element, has been incident onto the birefringent element 742. In that case, the optical axis of this incident light ray is shifted to a direction parallel to the optic axis of the first birefringent element 742 (i.e., θ direction). Next, after the polarization direction of the light ray has been rotated 90 degrees by the second birefringent element 744, the light ray is shifted to a direction parallel to the optic axis of the second birefringent element 744 (i.e., θ' direction).

Suppose the shift amount (i.e., distance of displacement) caused by the first birefringent element 742 is "a" while the shift amount (i.e., distance of displacement) caused by the second birefringent element 744 is "b". In that case, if "a" and "b" satisfy the relationship tan θ=a/b, the direction of eventual shifting caused by the first and second birefringent elements 742 and 744 is aligned with the direction vertical to the reference plane (i.e., the "horizontal plane"). That is to say, the final shifting direction is aligned with the vertical direction of the screen. In this case, the image shift amount in the vertical direction of the screen is equal to the square of ($a^2+b^2$). It should be noted that the distances a and b are proportional to the thicknesses of the first and second birefringent elements 742 and 744, respectively.

In this embodiment, if θ is 45 degrees, θ' is 135 degrees. In this case, the equation tan 45 degrees=a/b=1 should be satisfied. Accordingly, the first and second birefringent elements may be implemented as two birefringent plates that are made of the same material and that have the same thickness.

It should be noted that the first element may be made of not only a TN mode liquid crystal material but also a vertical alignment mode liquid crystal material, an OCB mode liquid crystal material or a ferroelectric liquid crystal material.

On the display panel 740, pixels of the same color (e.g., R pixels) may be arranged obliquely to the horizontal direction of the screen. In that case, the image shifting direction needs to be aligned with a direction vertical to the pixel row of the same color. Such image shifting may be carried out by stacking two birefringent plates (made of the same material and having the same thickness) such that their optic axes are aligned with each other (i.e., θ=θ') and that the direction of the pixel row of the same color is perpendicular to the θ direction and by getting the polarization direction non-switched by the second liquid crystal cell. In this case, only one birefringent element may be used or the second liquid crystal cell 743 may be removed.

INDUSTRIAL APPLICABILITY

In an image display device according to the present invention, a light beam that has been emitted from a light source is split into light rays in the three primary colors of R, G and B, and then the light rays in the respective colors are focused onto their associated pixel regions of an image display panel, thereby getting the R, G and B light rays modulated by the respective pixel regions. Thereafter, the optical paths of light rays going out of the image display panel are switched time-sequentially, while at the same time images to be displayed are switched one after another. In this manner, the optical efficiency can be increased and a high-resolution color image can be displayed.

The invention claimed is:

1. An image shifter for obtaining an optical path of an image subframe, which has been modulated by an image display panel, shifted periodically, thereby selectively displacing the image subframe to one of three or more locations that are arranged in line within a plane and that are spaced apart from each other by at least one pixel pitch, the image shifter comprising:
    a refracting member for refracting and shifting the optical path; and
    a driver for changing periodically the location of the refracting member relative to the optical path,
    wherein the refracting member is made up of multiple regions that shift the optical path in mutually different amounts, and multiple opaque regions, each of which being provided between each of adjacent multiple regions that shift the optical path.

2. The image shifter of claim 1, wherein the refracting member is implemented as a rotational plate including multiple transparent regions that have mutually different refractive indices and/or mutually different thicknesses, and is supported in a rotatable position so as to cross the optical path obliquely, and
    wherein the driver rotates the rotational plate such that the multiple transparent regions of the rotational plate cross the optical path one after another.

3. The image shifter of claim 1, wherein the refracting member is implemented as a transparent plate including multiple transparent regions that have mutually different refractive indices and/or mutually different thicknesses and is supported in a movable position so as to cross the optical path obliquely, and
    wherein the driver moves the transparent plate such that the multiple transparent regions of the transparent plate cross the optical path one after another.

4. An image shifter for obtaining an optical path of an image subframe, which has been modulated by an image display panel, shifted periodically, thereby selectively displacing the image subframe to one of three or more locations that are arranged in line within a plane and that are spaced apart from each other by at least one pixel pitch, the image shifter comprising:
    at least two pairs of first and second elements that are arranged in series on the optical path, each said first element changing the polarization direction of the image subframe that has been modulated by the image display panel, each said second element exhibiting one of mutually different refractive indices according to the polarization direction of incoming light,
    wherein when the image subframe is shifted to an adjacent one of the three or more locations, a voltage application state to be selected for the first element on a light incoming side changes with a direction in which the image subframe is shifted next time.

5. An image shifter for obtaining an optical path of an image subframe, which has been modulated by an image display panel, shifted periodically, thereby selectively displacing the image subframe to one of three or more locations that are arranged in line within a plane and that are spaced apart from each other by at least one pixel pitch, the image shifter comprising:
    at least two pairs of first and second elements that are arranged in series on the optical path, each said first element changing the polarization direction of the image subframe that has been modulated by the image display panel, each said second element exhibiting one of mutually different refractive indices according to the polarization direction of incoming light,
    wherein when the image subframe is shifted to a central one of the three or more locations, a voltage application state of the first element disposed on a light incoming side is the same as a voltage application state of the first element disposed on a light outgoing side.

6. An image shifter for obtaining an optical path of an image subframe, which has been modulated by an image display panel, shifted periodically, thereby selectively displacing the image subframe to one of three or more locations that are arranged in line within a plane and that are spaced apart from each other by at least one pixel pitch, the image shifter comprising:
    first and second image shifting sections that are arranged on the optical path,
    wherein each of the first and second image shifting sections includes: a first element for changing the polarization direction of the image subframe that has been modulated by the image display panel; and a second element that exhibits one of mutually different refractive indices according to the polarization direction of incoming light, and wherein the image subframe is shifted by the first and second image shifting elements in mutually different amounts.

7. The image shifter of claim 6, wherein the amount in which the image subframe is shifted by one of the two image shifting sections that is located at such a position on the optical path as to receive the incoming light earlier than the other image shifting section is twice as much as the amount in which the image subframe is shifted by the other image shifting section that is located at such a position on the optical path as to receive the incoming light later than the former image shifting section.

8. The image shifter of claim 6 or 7, wherein no combination of voltages to be applied to drive the elements includes an ON-to-OFF transition and an OFF-to-ON transition at the same time.

9. An image shifter for obtaining an optical path of an image subframe, which has been modulated by an image display panel, shifted periodically, thereby selectively displacing the image subframe to one of multiple locations that are arranged in line within a plane and that are spaced apart from each other by at least one pixel pitch, the image shifter comprising:
 a first element for changing the polarization direction of the image subframe that has been modulated by the image display panel; and
 a second element that exhibits one of mutually different refractive indices according to the polarization direction of incoming light,
 wherein the first element includes a liquid crystal cell that is able to switch polarization states of the light in response to a voltage applied thereto, and
 wherein the second element includes a light birefringent element that shifts the optical axis of the light according to the polarization state thereof, and
 wherein each of multiple levels of voltages to be applied to the liquid crystal cell to switch the polarization states of the light has a non-zero value.

10. The image shifter of claim 9, wherein upon the application of a first one of the multiple levels of voltages, the liquid crystal cell outputs first polarized light, and
 wherein upon the application of a second one of the multiple levels of voltages, the liquid crystal cell outputs second polarized light with a plane of polarization that has rotated 90 degrees from that of the first polarized light.

11. The image shifter of claim 10, wherein the first voltage has an offset value to be controlled in accordance with the temperature of the liquid crystal cell.

12. The image shifter of claim 10 or 11, wherein the first voltage has an offset value that is defined by a voltage-transmittance characteristic of visible radiation to be transmitted through the liquid crystal cell.

13. The image shifter of claim 10 or 11, wherein the first voltage has an offset value that is defined by a voltage-transmittance characteristic of a green light ray to be transmitted through the liquid crystal cell.

14. The image shifter of claim 10 or 11, wherein the first voltage has an offset value that is optimized by voltage-transmittance characteristics of red, green and blue light rays to be transmitted through the liquid crystal cell.

15. An image shifter for obtaining an optical path of an image subframe, which has been modulated by an image display panel, shifted periodically, thereby selectively displacing the image subframe to one of multiple locations that are arranged in line within a plane and that are spaced apart from each other by at least one pixel pitch, the image shifter comprising:
 a first type of elements for changing the polarization direction of the image subframe that has been modulated by the image display panel; and
 a second type of elements that exhibit one of mutually different refractive indices according to the polarization direction of incoming light,
 wherein the first type of elements include a first polarization modulator and a second polarization modulator while the second type of elements include a first birefringent element and a second birefringent element, and
 wherein the first polarization modulator outputs an ordinary ray or an extraordinary ray to the first birefringent element, and
 wherein the second polarization modulator outputs an ordinary ray or an extraordinary ray to the second birefringent element, and
 wherein the first birefringent element shifts the image for a distance "a" in a direction that defines an angle of θ degrees with a reference plane including the optical axis, and
 wherein the second birefringent element shifts the image for a distance "b" in a direction that defines an angle of θ' degrees with the reference plane, and
 wherein tan θ=a/b is satisfied.

16. The image shifter of claim 15, wherein θ' degrees=θ degrees+90 degrees is satisfied.

17. The image shifter of claim 15, wherein θ degrees=θ degrees is satisfied.

18. The image shifter of claim 16 or 17, wherein θ is 45.

19. An image shifter for obtaining an optical path of an image subframe, which has been modulated by an image display panel, shifted periodically, thereby selectively displacing the image subframe to one of three or more locations that are arranged in line within a plane and that are spaced apart from each other by at least one pixel pitch, the image shifter comprising:
 a liquid crystal layer that exhibits two or more different refractive indices against polarized light; and
 two substrates that sandwich the liquid crystal layer,
 wherein a micro prism or diffraction grating is provided on one surface of one of the two surfaces so as to face the liquid crystal layer.

20. The image shifter of claim 19, wherein the micro prism or the diffraction grating is made of a material having a refractive index that is substantially equal to at least one of the two or more refractive indices.

21. The image shifter of claim 19, wherein the image shifter comprises not only the liquid crystal layer and the two substrates as a set but also at least one more liquid crystal layer and at least two more substrates as another set, these sets being arranged in series on the optical path, and
 wherein the image subframe is shifted to an adjacent one of the three or more locations just by selecting a voltage to be applied to the image shifter that is disposed on a light outgoing side.

22. An image shifter comprising:
 at least two image shifting sets that are arranged in series on an optical path, wherein each said image shifting set includes two displacing elements, and wherein each said displacing element includes: a liquid crystal layer that exhibits two or more different refractive indices against polarized light; and two substrates that sandwich the liquid crystal layer, a micro prism or a diffraction grating being provided on one surface of one of the two substrates so as to face the liquid crystal layer, and wherein the micro prisms or the diffraction gratings that are provided for the substrates belonging to the same set have the same angle of refraction, and wherein the angle of refraction, which is caused by the micro prisms or the diffraction gratings that are provided for the substrates belonging to one of the two sets that is located at such a position on the optical path as to receive incoming light earlier than the other set, is twice as great as the angle of refraction, which is caused by the micro prisms or the diffraction gratings that are provided for the substrates belonging to the other set that is located at such a position on the optical path as to receive the incoming light later than the former set.

23. An image shifter comprising:

at least two image shifting sets that are arranged in series on an optical path, wherein each said image shifting set includes two displacing elements, and wherein each said displacing element includes: a liquid crystal layer that exhibits two or more different refractive indices against polarized light; and two substrates that sandwich the liquid crystal layer, a micro prism or a diffraction grating being provided on one surface of one of the two substrates so as to face the liquid crystal layer, and wherein the micro prisms or the diffraction gratings that are provided for the substrates belonging to the same set have the same angle of refraction, and wherein a distance between the substrates belonging to one of the two sets that is located at such a position on the optical path as to receive incoming light earlier than the other set is twice as long as a distance between the substrates belonging to the other set that is located at such a position on the optical path as to receive the incoming light later than the former set.

24. An image shifter for obtaining an optical path of an image subframe, which has been modulated by an image display panel, shifted periodically, thereby selectively displacing the image subframe to one of four locations that are arranged in line within a plane and that are spaced apart from each other by at least one pixel pitch, the image shifter comprising:

a first shifting element and a second shifting element that are arranged in series on the optical path, wherein the amount in which the image subframe is shifted by the first shifting element is defined to be twice as much as the amount in which the image subframe is shifted by the second shifting element.

* * * * *